(12) United States Patent
Green

(10) Patent No.: US 11,624,535 B2
(45) Date of Patent: Apr. 11, 2023

(54) REFRIGERANT METERING SYSTEM AND METHOD

(71) Applicant: Kenneth Ray Green, Aubrey, TX (US)

(72) Inventor: Kenneth Ray Green, Aubrey, TX (US)

( * ) Notice: Subject to any disclaimer, the term of this patent is extended or adjusted under 35 U.S.C. 154(b) by 0 days.

(21) Appl. No.: 17/894,613

(22) Filed: Aug. 24, 2022

(65) Prior Publication Data
US 2022/0412614 A1 Dec. 29, 2022

Related U.S. Application Data

(62) Division of application No. 16/747,422, filed on Jan. 20, 2020, now Pat. No. 11,428,448.

(51) Int. Cl.
| | |
|---|---|
| *F25B 41/31* | (2021.01) |
| *F25B 41/20* | (2021.01) |
| *F25B 41/40* | (2021.01) |
| *F25B 45/00* | (2006.01) |
| *F25B 41/24* | (2021.01) |
| *F25B 41/22* | (2021.01) |

(52) U.S. Cl.
CPC .............. *F25B 41/31* (2021.01); *F25B 41/20* (2021.01); *F25B 41/24* (2021.01); *F25B 41/40* (2021.01); *F25B 45/00* (2013.01); *F25B 41/22* (2021.01); *F25B 2341/06* (2013.01); *F25B 2345/001* (2013.01); *F25B 2345/002* (2013.01); *F25B 2345/006* (2013.01); *F25B 2500/06* (2013.01); *F25B 2600/2515* (2013.01); *F25B 2600/2519* (2013.01)

(58) Field of Classification Search
CPC .......... F25B 41/20; F25B 41/24; F25B 41/31; F25B 41/40; F25B 2341/06; F25B 2600/2515; F25B 2600/2519
See application file for complete search history.

(56) References Cited

U.S. PATENT DOCUMENTS

2015/0267818 A1 * 9/2015 Rahman .................... F16K 1/54
137/862

* cited by examiner

*Primary Examiner* — Jonathan Bradford
(74) *Attorney, Agent, or Firm* — Kevin Mark Klughart

(57) ABSTRACT

A refrigerant metering system/method incorporating a manual expansion valve (MEV), condenser isolation valve (CIV), flow isolation valve (FIV), and evaporator isolation valve (EIV) is disclosed. The MEV is configured to replace a conventional automated expansion valve (AEV) that controls a refrigerant flow valve (RFV) that is positioned in a heating, ventilation, and air conditioning (HVAC) system between a refrigerant condenser coil (RCC) and a refrigerant evaporator coil (REC) and permits manual metering of refrigerant by the RFV from the RCC to the REC and also allows complete shutoff of refrigerant flow by the RFV from the RCC to the REC. The MEV allows rapid HVAC repair and restoration of service where a replacement AEV is not readily available. The CIV/FIV/EIV are positioned in the refrigerant flow lines to permit the AEV and/or REC to be isolated from HVAC refrigerant flow for repairs to the AEV and/or REC.

5 Claims, 64 Drawing Sheets

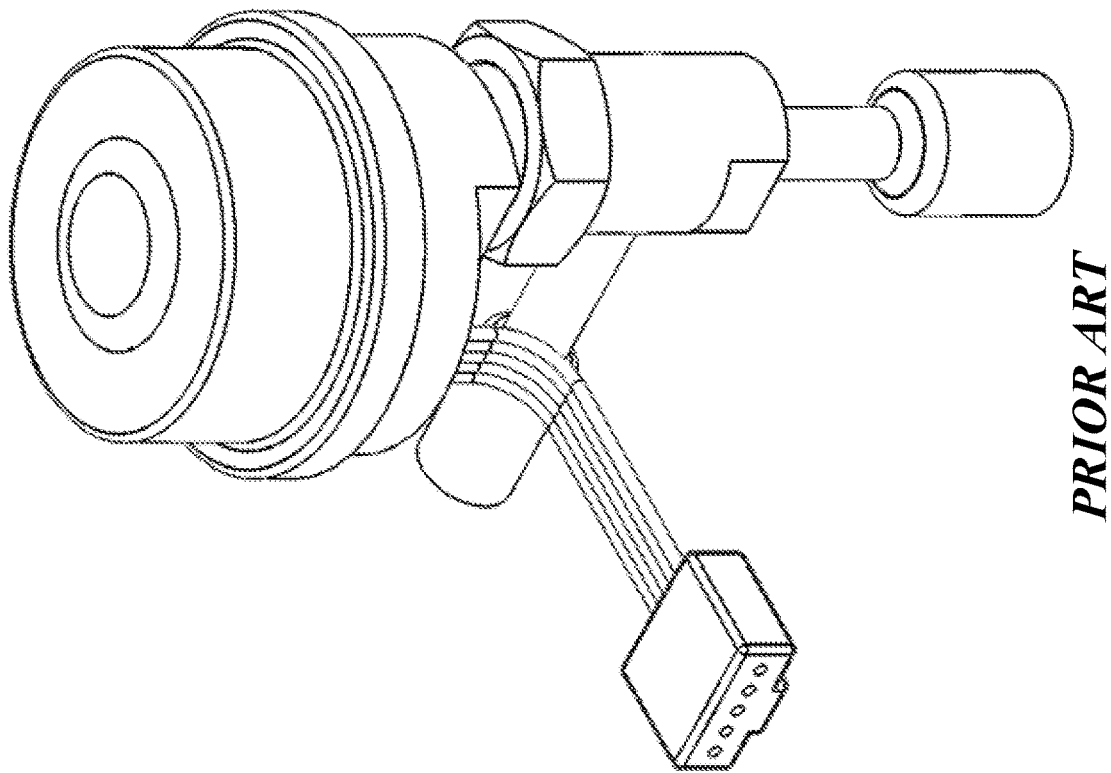
FIG. 17
PRIOR ART

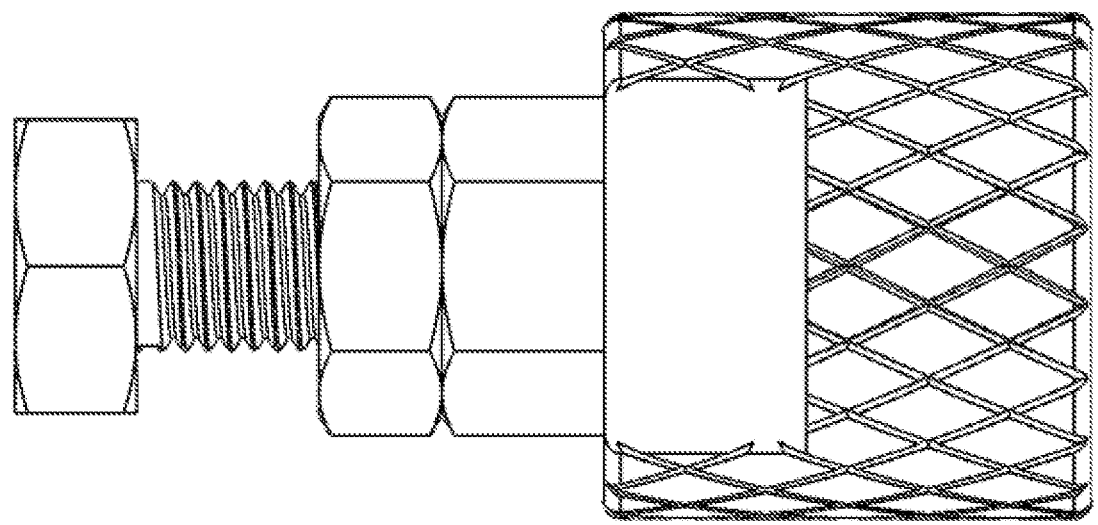
FIG. 34

3500

3600

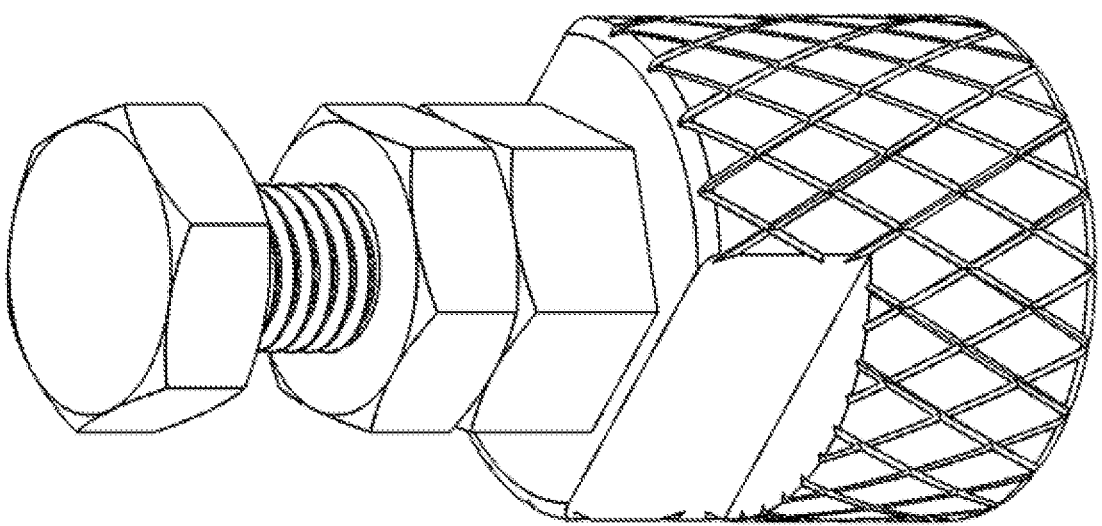
FIG. 41

4300

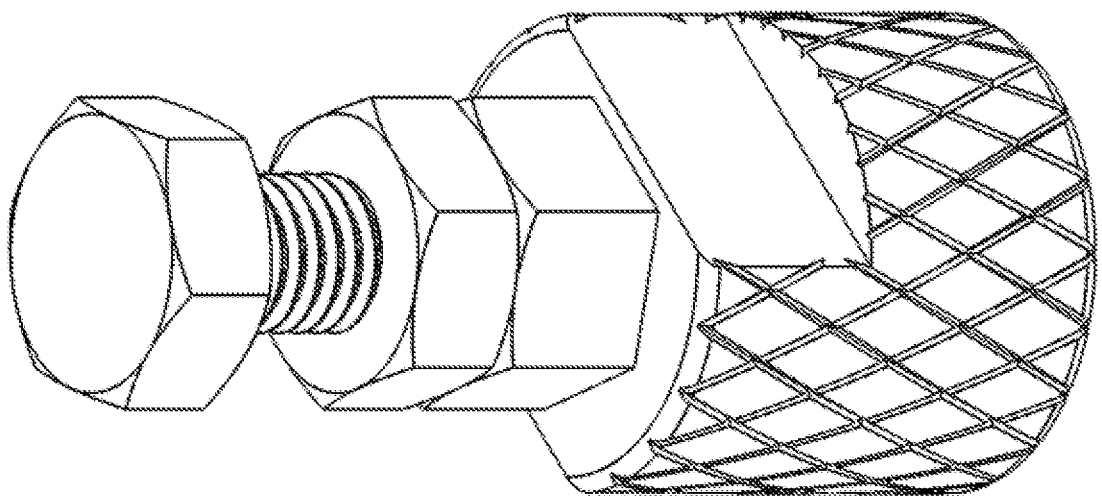
FIG. 44

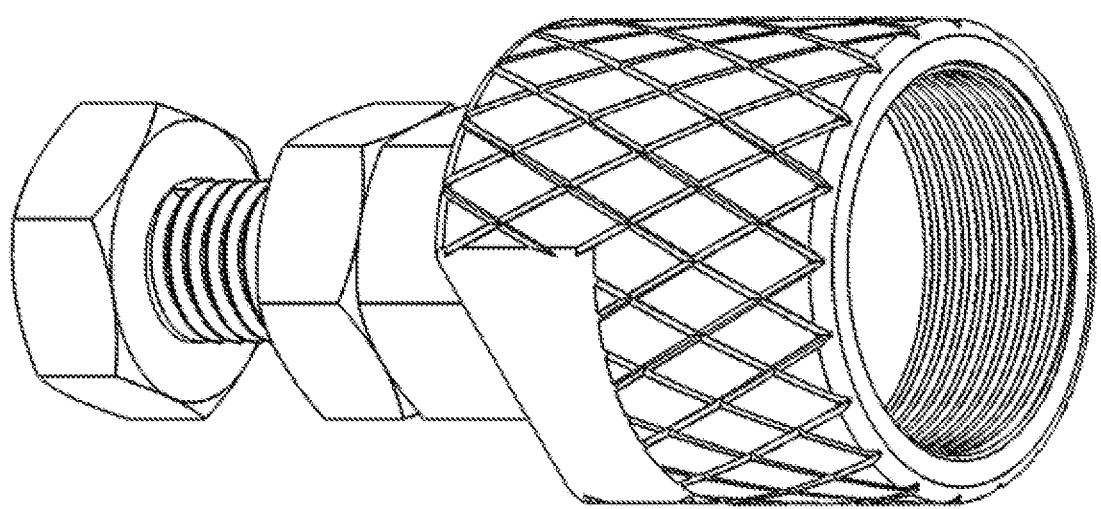
FIG. 45

4700

4800

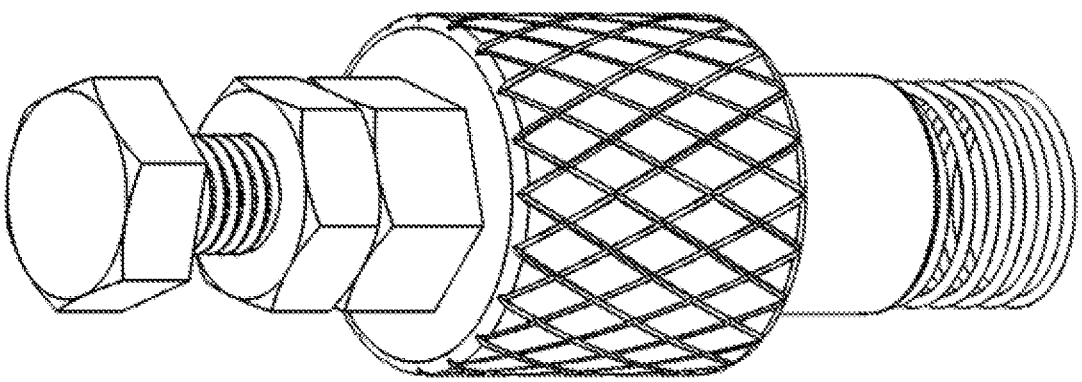
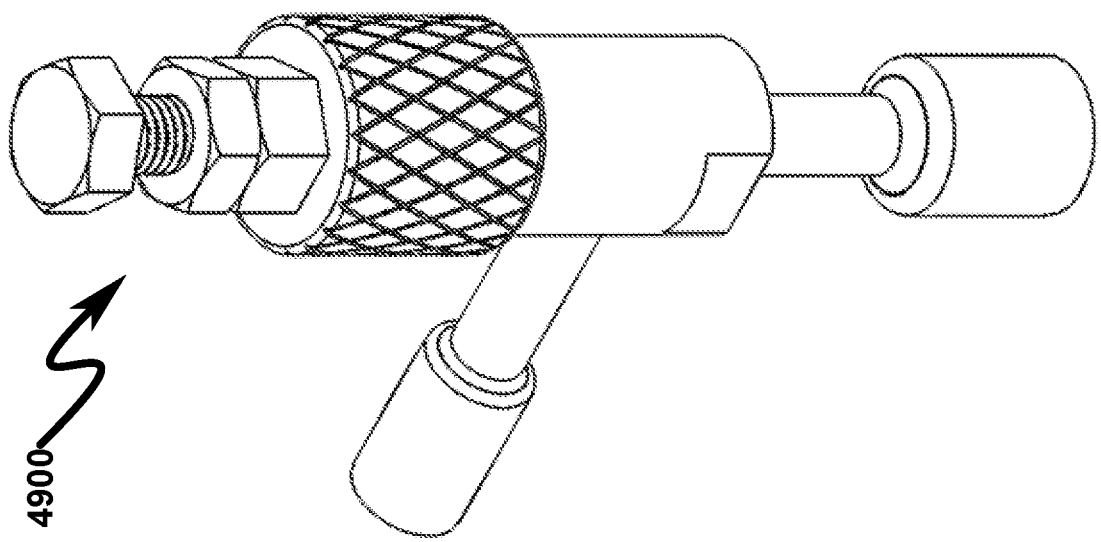
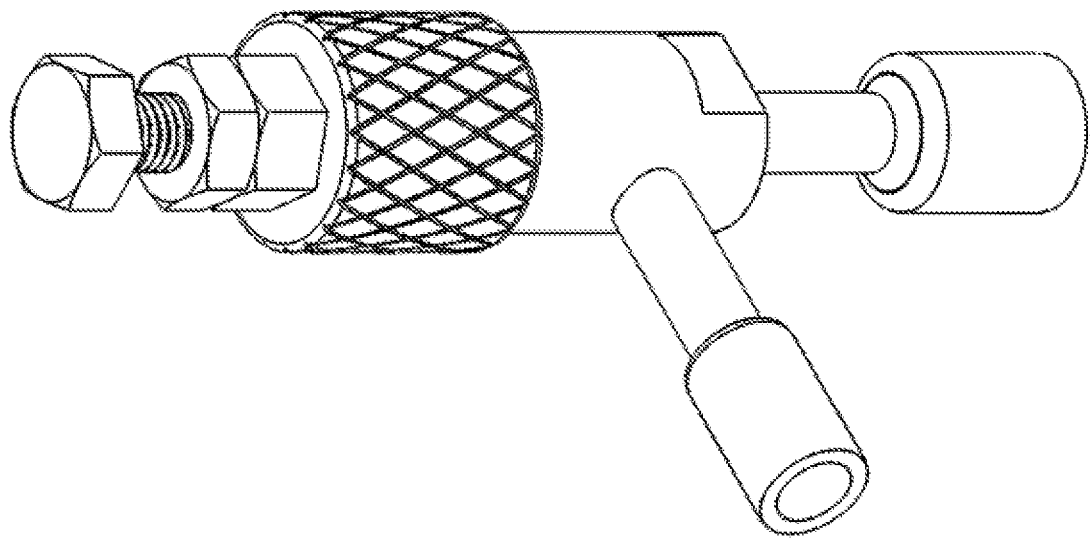
FIG. 49

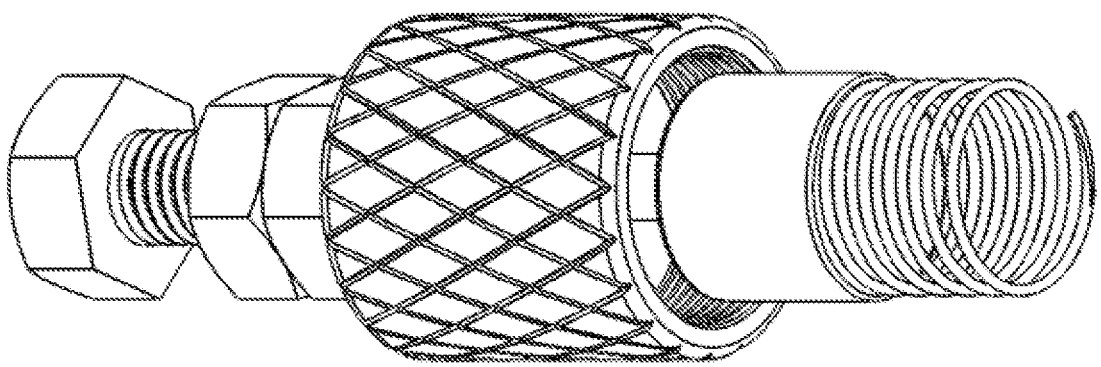
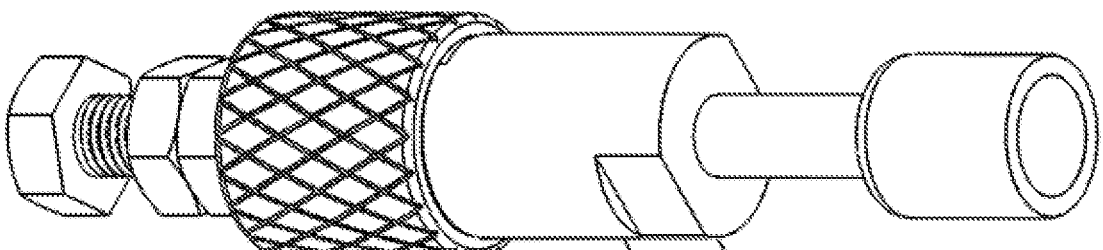
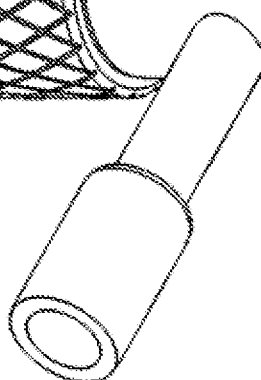
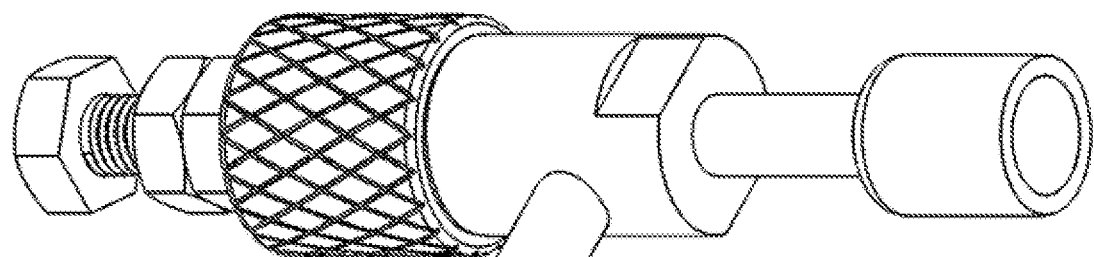
FIG. 50

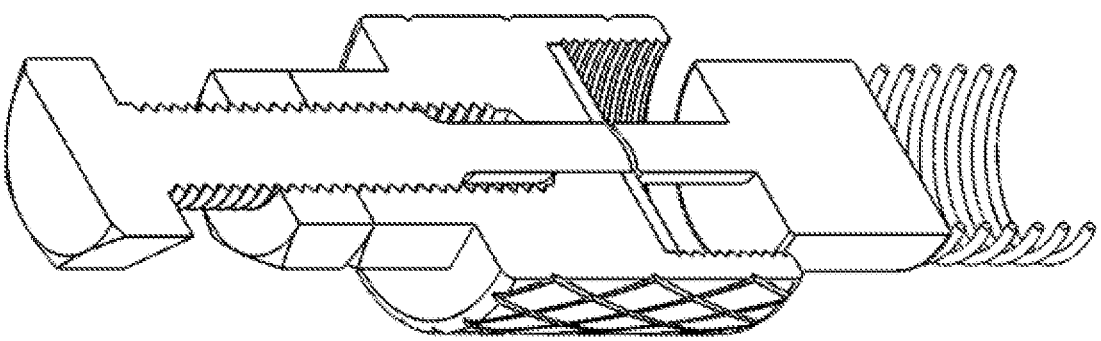
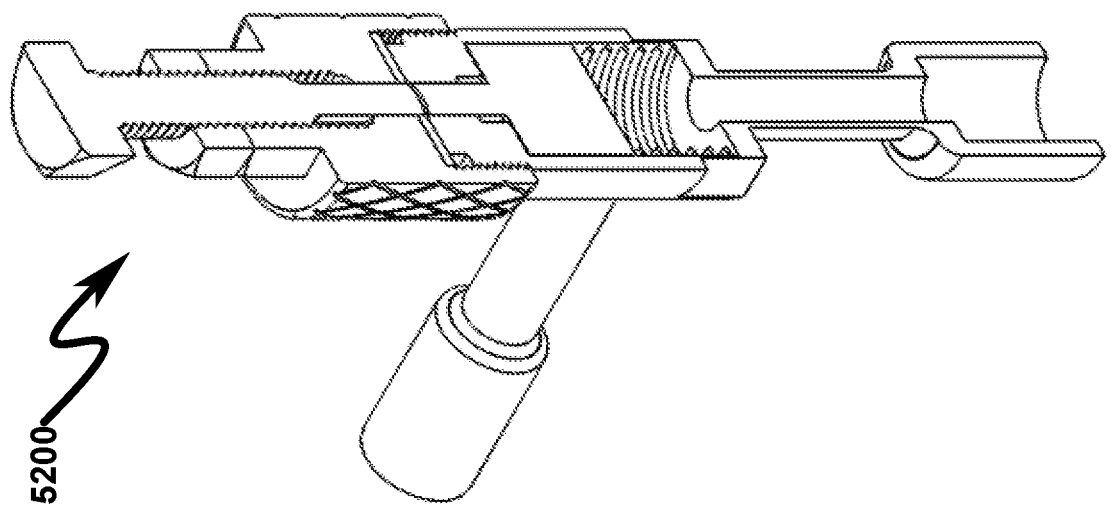
FIG. 52
5200
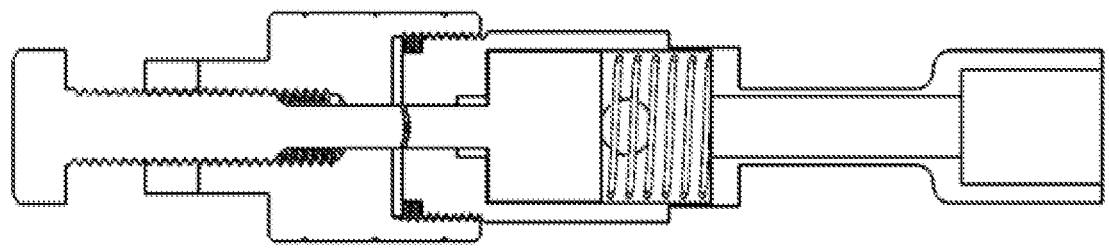

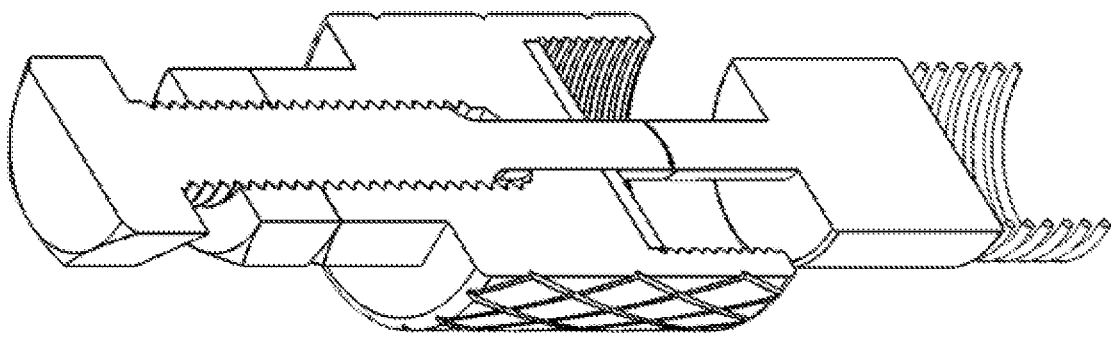
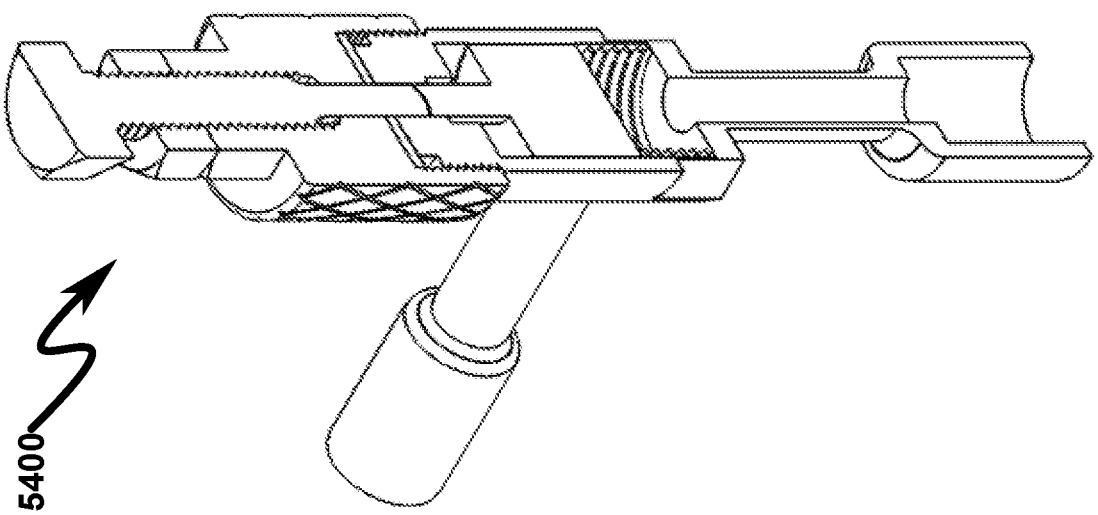
FIG. 54
5400
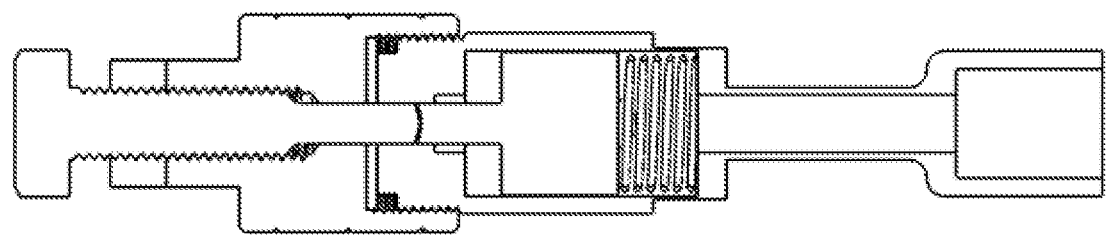

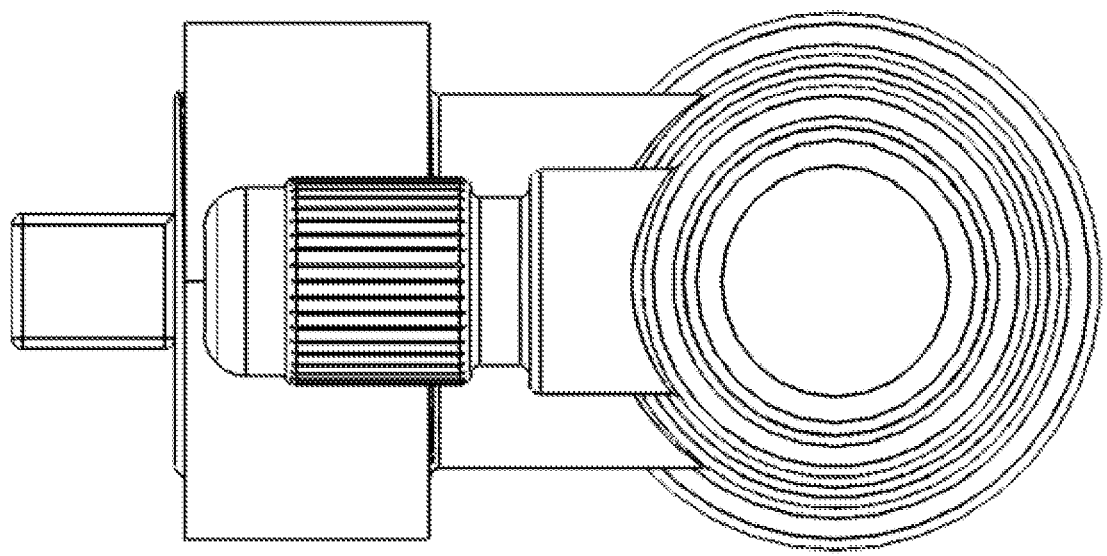
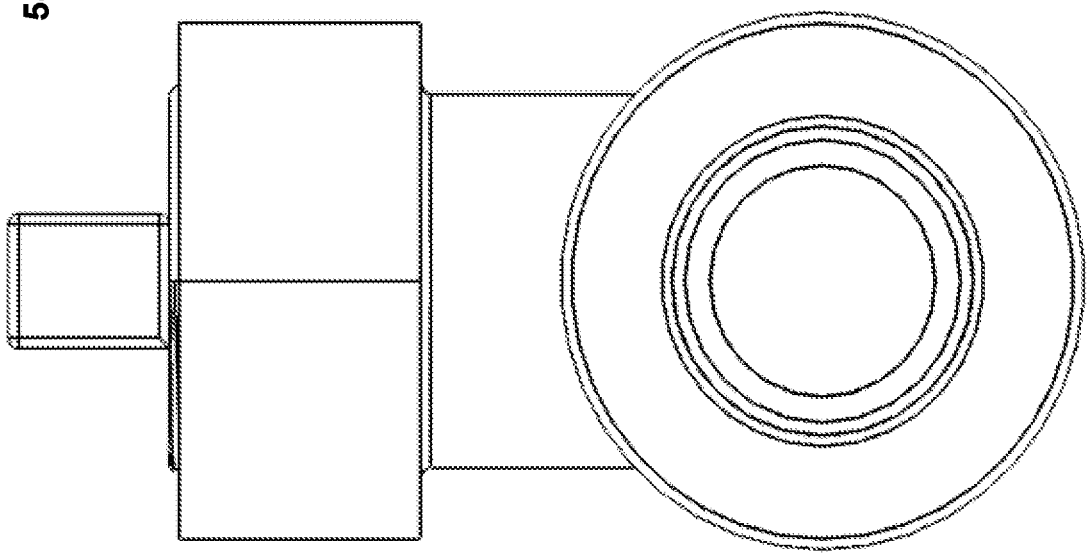
FIG. 58

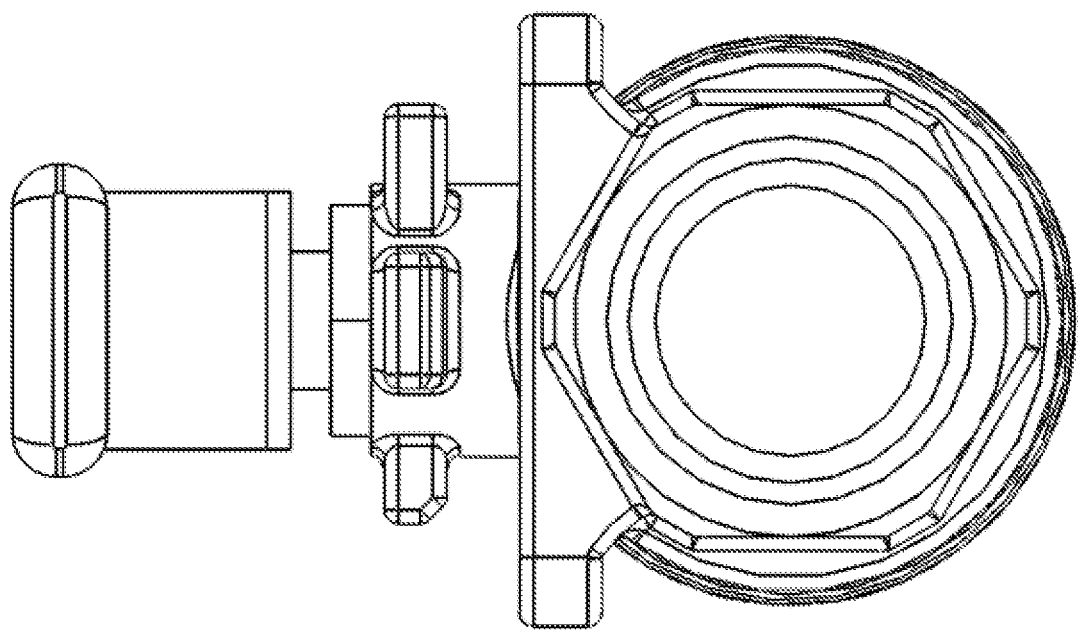
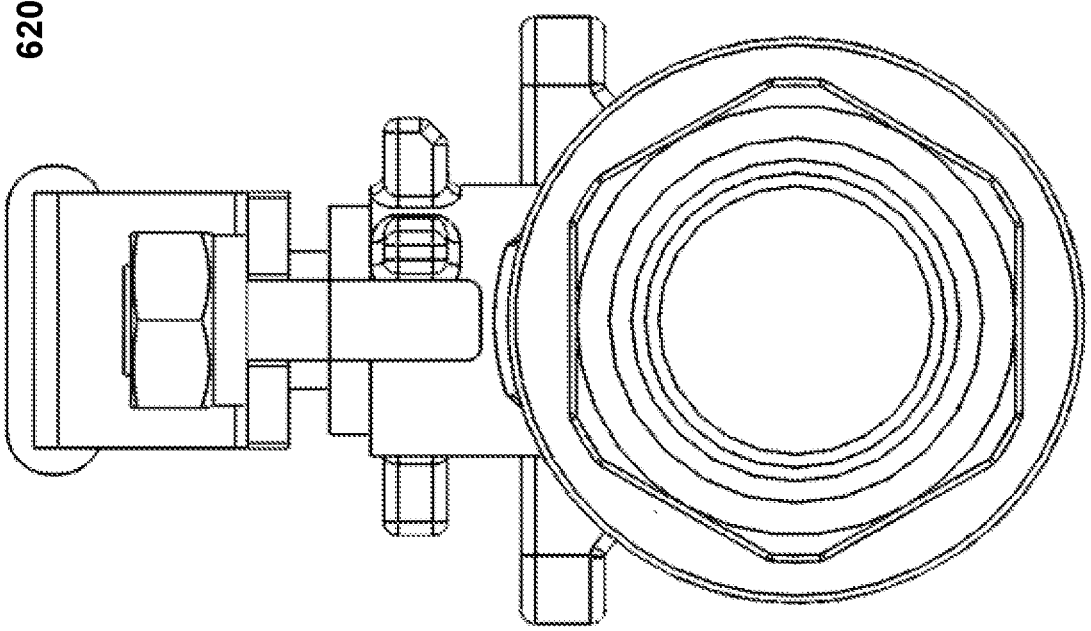
FIG. 62

REFRIGERANT METERING SYSTEM AND METHOD

CROSS REFERENCE TO RELATED APPLICATIONS DIVISIONAL PATENT APPLICATION (DPA)

This is a divisional patent application (DPA) of and incorporates by reference United States Utility Patent Application for REFRIGERANT METERING SYSTEM AND METHOD by inventor Kenneth Ray Green, filed electronically with the USPTO on 2020 Jan. 20, with Ser. No. 16/747,422, EFS ID 38342840, confirmation number 1232, issued as U.S. Pat. No. 11,428,448 on 2022 Aug. 30.

UTILITY PATENT APPLICATIONS

This patent application claims benefit under 35 U.S.C. § 120 and incorporates by reference United States Utility Patent Application for REFRIGERANT METERING SYSTEM AND METHOD by inventor Kenneth Ray Green, filed electronically with the USPTO on 2020 Jan. 20, with Ser. No. 16/747,422, EFS ID 38342840, confirmation number 1232, issued as U.S. Pat. No. 11,428,448 on 2022 Aug. 30.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the metering of refrigerant within these HVAC systems. Without limitation, the present invention may have application in which an existing linear expansion valve (LEV), electronic expansion valve (EEV), or thermal expansion valve (TEV) (collectively referred to herein as automated expansion valve (AEV)) in a HVAC system is replaced or augmented with a manual expansion valve (MEV) in conjunction with optional condenser isolation valve (CIV), flow isolation valve (FIV), and/or evaporator isolation valve (EIV) in order to accommodate: (a) failure of an existing linear expansion valve (LEV), an electronic expansion valve (EEV), a thermal expansion valve (TEV), or an automated expansion valve (AEV) in the HVAC system, and (b) isolation of refrigerant to a refrigerant condenser coil (RCC) or a refrigerant evaporator coil (REC) in the event of a RCC/REC failure or other refrigerant line failure in the HVAC system.

BACKGROUND AND PRIOR ART

Linear Expansion Valve (LEV) Prior Art (0100)

A conventional prior art HVAC system incorporating linear expansion valve (LEV) refrigerant metering is generally depicted in FIG. 1 (0100). Here the refrigerant compressor (RFC) (0110) compresses refrigerant and emits same to a high side (0101) output that is fed into a refrigerant condenser coil (RCC) (0120). A refrigerant condenser fan (RCF) (0130) generates an input air flow (0131) across the RCC (0120) and transfers heat to (from) the RCC (0120) (depending on the heating or (cooling) operation of the overall HVAC system) to generate an outside air flow (OAF) (0132) that is cooler (warmer) than the input air flow (0131) temperature. The heated (cooled) refrigerant is then transferred from the RCC (0120) via a refrigerant line (0102) to a refrigerant flow valve (RFV) (0140) mechanically controlled by a linear expansion valve (LEV) (0150) that meters refrigerant via RFV (0140) and transfers this metered refrigerant flow via a refrigerant line (0103) to a refrigerant evaporator coil (REC) (0160). A refrigerant evaporator fan (REF) (0170) takes unconditioned inside air (0171) and forces this across the REC (0160) to generate a conditioned inside air flow (0172). Refrigerant emitted from the REC (0160) is transferred via a refrigerant line (0104) to the RFC (0110) to complete the refrigerant flow within the HVAC system.

In the event of a failure of the LEV (0150) to properly operate or meter refrigerant via the RFV (0140), the failing LEV (0150) must be replaced. This may present problems in the field where a suitable LEV replacement part is unavailable but the HVAC system must be promptly restored to service. Furthermore, any refrigerant leakage associated with the REC (0160) or the incoming (0103) or outgoing (0104) refrigerant lines requires that the entire refrigerant system be purged, repaired, and reloaded with refrigerant. Since it is common for the REC (0160) to incur pinhole leaks, this failure mechanism may result in refrigerant being dumped into the inside air flow (0172) causing a potential health risk to inhabitants of the building or structure.

Electronic Expansion Valve (EEV) Prior Art (0200)

A conventional prior art HVAC system incorporating electronic expansion valve (EEV) refrigerant metering is generally depicted in FIG. 2 (0200). Here the refrigerant compressor (RFC) (0210) compresses refrigerant and emits same to a high side (0201) output that is fed into a refrigerant condenser coil (RCC) (0220). A refrigerant condenser fan (RCF) (0230) generates an input air flow (0231) across the RCC (0220) and transfers heat to (from) the RCC (0220) (depending on the heating or (cooling) operation of the overall HVAC system) to generate an outside air flow (OAF) (0232) that is cooler (warmer) than the input air flow (0231) temperature. The heated (cooled) refrigerant is then transferred from the RCC (0220) via a refrigerant line (0202) to a refrigerant flow valve (RFV) (0240) mechanically controlled by an electronic expansion valve (EEV) (0250) that meters refrigerant via RFV (0240) and transfers this metered refrigerant flow via a refrigerant line (0203) to a refrigerant evaporator coil (REC) (0260). A refrigerant evaporator fan (REF) (0270) takes unconditioned inside air (0271) and forces this across the REC (0260) to generate a conditioned inside air flow (0272). Refrigerant emitted from the REC (0260) is transferred via a refrigerant line (0204) to the RFC (0210) to complete the refrigerant flow within the HVAC system.

In the event of a failure of the EEV (0250) to properly operate or meter refrigerant via the RFV (0240), the failing EEV (0250) must be replaced. This may present problems in the field where a suitable EEV replacement part is unavailable but the HVAC system must be promptly restored to service. Furthermore, any refrigerant leakage associated with the REC (0260) or the incoming (0203) or outgoing (0204) refrigerant lines requires that the entire refrigerant system be purged, repaired, and reloaded with refrigerant. Since it is common for the REC (0260) to incur pinhole leaks, this failure mechanism may result in refrigerant being dumped into the inside air flow (0272) causing a potential health risk to inhabitants of the building or structure.

Failure Mechanisms Common

The failure mechanisms associated with LEV/EEV systems as generally depicted in FIG. 1 (0100) and FIG. 2 (0200) are commonly experienced in the field. As such, these failures result in costly repairs as there is no mechanism in the field to quickly bypass the LEV/EEV and/or replace the REC. To date there is a long felt need for some mechanism to supplant a failing LEV/EEV and also provide some methodology of servicing a HVAC system in which the LEV/EEV has failed and/or the REC has incurred a refrigerant leakage failure.

It should be noted that in some circumstances it is not the LEV/EEV that has failed, but rather some other component associated with the HVAC system, such as a temperature sensor or other control circuitry associated with the LEV/EEV. In these circumstances it may not be possible to quickly obtain replacement parts in order to return the HVAC system to service. As such, there is a long-felt need for a repair methodology that can provide some recovery of HVAC service until repair parts become available for a more complete service repair of the HVAC system.

To generalize the prior art failure mechanisms, it can be seen that any number of automated expansion valves (AEV) (that can include LEV/EEV or equivalent thermal expansion valves (TEV)) can fail in a HVAC system and as such there is a long-felt need for a universal replacement for these devices that can be quickly installed to restore the HVAC system to some level of suitable operation while a suitable AEV replacement part can be located and secured.

Typical Mechanical Construction (0300)-(2400)

An example of the prior art as embodied using an EEV is generally depicted in FIG. 3 (0300)-FIG. 8 (0800) in which a refrigerant evaporator coil (REC) assembly (0360) is shown having coil fins (0361) through which refrigerant lines are coiled (0362), refrigerant input manifold (0363) supplying refrigerant input lines (0364), and refrigerant output manifold (0365) retrieving refrigerant from refrigerant output lines (0366). Refrigerant flow in this evaporator system starts from the refrigerant compressor (RFC) (not shown) (0301), flows through the evaporator system (0360), and is then transported via the refrigerant output manifold (0365) and then taken up by the refrigerant compressor (RFC) (not shown) (0302). Refrigerant flow is controlled by a refrigerant flow valve (RFV) (0340) that is controlled by an automated expansion valve (AEV) that in this example is depicted as an electronic expansion valve (EEV) (0350) with electrical connector (0351) that is connected electrically to an electronic control system (ECC) (not shown) that electrically controls the operation of the EEV (0350) that in turn controls the mechanical operation of the RFV (0340).

Additional detail of the RFV (0340) and EEV (0350) from FIG. 3 (0300)-FIG. 8 (0800) are depicted in FIG. 9 (0900)-FIG. 24 (2400). Here it can be seen that the RFV (0940, 1540, 1640) and EEV (0950, 1550) are separate components with the RFV (0940, 1540, 1640) having depicted valve input connection port (VIP) (0941, 1541, 1641) and valve output connection port (VOP) (0945, 1545, 1645) respectively and a threaded valve control port (VCP) (1549, 1649) to which the EEV (0950, 1550) is mated via a valve threaded fastener (VTF) (1559).

Operation of the RFV (1640) as generally depicted in FIG. 16 (1600) will now be discussed. Refrigerant enters the RFV (1640) via the valve input connection port (VIP) (1641), routed through the input routing port (IRP) (1642), the valve transfer port (VTP) (1643), the output routing port (ORP) (1644), and exits the valve output connection port (VOP) (1645). The VTP (1643) comprises a chamber in the RFV (1640) in which a valve metering piston (VMP) (1646) meters refrigerant flow from the VIP (1641), through the IRP (1642), the VTP (1643), the ORP (1644), and to the VOP (1645). The VMP (1646) comprises a valve control rod (VCR) (1647) that enables external control and movement of the VMP (1646) to overcome pressure applied to the VMP (1646) by a valve spring control (VSC) (1648).

In the configuration shown, the RFV (1640) is normally open, allowing refrigerant to flow from the VIP (1641) through the VTP (1643) and to the VOP (1645). Connection to the EEV is accomplished using a threaded port connection (TPC) (1649) on the RFV (1640) in which a seating plane (1651) mates to a corresponding plane on the EEV. A projection on the EEV exerts pressure on the VCR (1647) in order to overcome spring pressure on the VMP (1646) in order to meter refrigerant flow from the VIP (1641) to the VOP (1645). As shown, the typical RFV (1640) may be considered a unitary valve containment structure (VCS) combining the VIP (1641), the VTP (1643), and the VOP (1645), in which the VMP (1646), VCR (1647), and VSC (1648) are positioned and in which the VCR (1647) is positioned within a control rod port (CRP) (1652) within the RFV (1640) that allows movement of the VMP (1646) and VCR (1647) to meter refrigerant flow from the VIP (1641) to the VOP (1645). Additionally, it can be seen that the CRP is contained within the perimeter of the threaded valve control port (VCP).

BRIEF SUMMARY OF THE INVENTION

The present invention pertains to a system and method wherein a HVAC system having a failing LEV/EEV/TEV/AEV may be quickly repaired and brought back to service while suitable replacement parts are obtained. The present invention makes use of a manual expansion valve (MEV) that can replace a failing LEV/EEV/TEV/AEV and permit manual control of refrigerant metering between the RCC and REC.

A condenser isolation valve (CIV) and flow isolation valve (FIV) that straddle flow through the refrigerant flow valve (RFV) allow the RFV and attached LEV/EEV/TEV/AEV to be isolated for replacement of the LEV/EEV/TEV/AEV in situations where evacuation of the HVAC system is inconvenient or not possible.

Furthermore, the REC may be isolated from the HVAC system in situations where the REC is failing or must be replaced. This ability to isolate REC may be implemented with the use of a flow isolation valve (FIV) between the RFV and the REC and an evaporator isolation valve (EIV) between the REC and the refrigerant compressor (RFC) such that closing the FIV and EIV isolates the REC from the RFV/RFC and permits the REC to be replaced with a new REC and then evacuated and recharged with refrigerant without the need for a complete evacuation of the entire HVAC system.

BRIEF DESCRIPTION OF THE DRAWINGS

For a fuller understanding of the advantages provided by the invention, reference should be made to the following detailed description together with the accompanying drawings wherein:

FIG. 17 illustrates a top right front perspective view of a conventional prior art refrigerant flow valve (RFV) controlled by a prior art electronic expansion valve (EEV);

FIG. 34 illustrates a rear view of a preferred exemplary embodiment of a present invention manual expansion valve (MEV);

FIG. 41 illustrates a top right front perspective view of a preferred exemplary embodiment of a present invention manual expansion valve (MEV);

FIG. 44 illustrates a top left front perspective view of a preferred exemplary embodiment of a present invention manual expansion valve (MEV);

FIG. 45 illustrates a bottom right front perspective view of a preferred exemplary embodiment of a present invention manual expansion valve (MEV);

FIG. 49 illustrates a top left front perspective view, top right front perspective view, and top right perspective view (hiding RFV housing) of a preferred exemplary embodiment of a present invention manual expansion valve (MEV) mated with a conventional refrigerant flow valve (RFV) with the MEV configured for unmetered refrigerant flow;

FIG. 50 illustrates a bottom left front perspective view, bottom right front perspective view, and bottom right front perspective view (hiding RFV housing) of a preferred exemplary embodiment of a present invention manual expansion valve (MEV) mated with a conventional refrigerant flow valve (RFV) with the MEV configured for unmetered refrigerant flow;

FIG. 52 illustrates right side section view, right side section perspective view, and right side section perspective view (hiding RFV housing) of a preferred exemplary embodiment of a present invention manual expansion valve (MEV) mated with a conventional refrigerant flow valve (RFV) with the MEV configured for unmetered refrigerant flow;

FIG. 54 illustrates right side section view, right side section perspective view, and right side section perspective view (hiding RFV housing) of a preferred exemplary embodiment of a present invention manual expansion valve (MEV) mated with a conventional refrigerant flow valve (RFV) with the MEV configured for 50% metered refrigerant flow;

FIG. 58 illustrates left side and right side views of a preferred exemplary embodiment of a present invention evaporator isolation valve (EIV);

FIG. 62 illustrates left side and right side views of an alternate preferred exemplary embodiment of a present invention evaporator isolation valve (EIV);

DESCRIPTION OF THE PRESENTLY PREFERRED EXEMPLARY EMBODIMENTS

Figure 1:
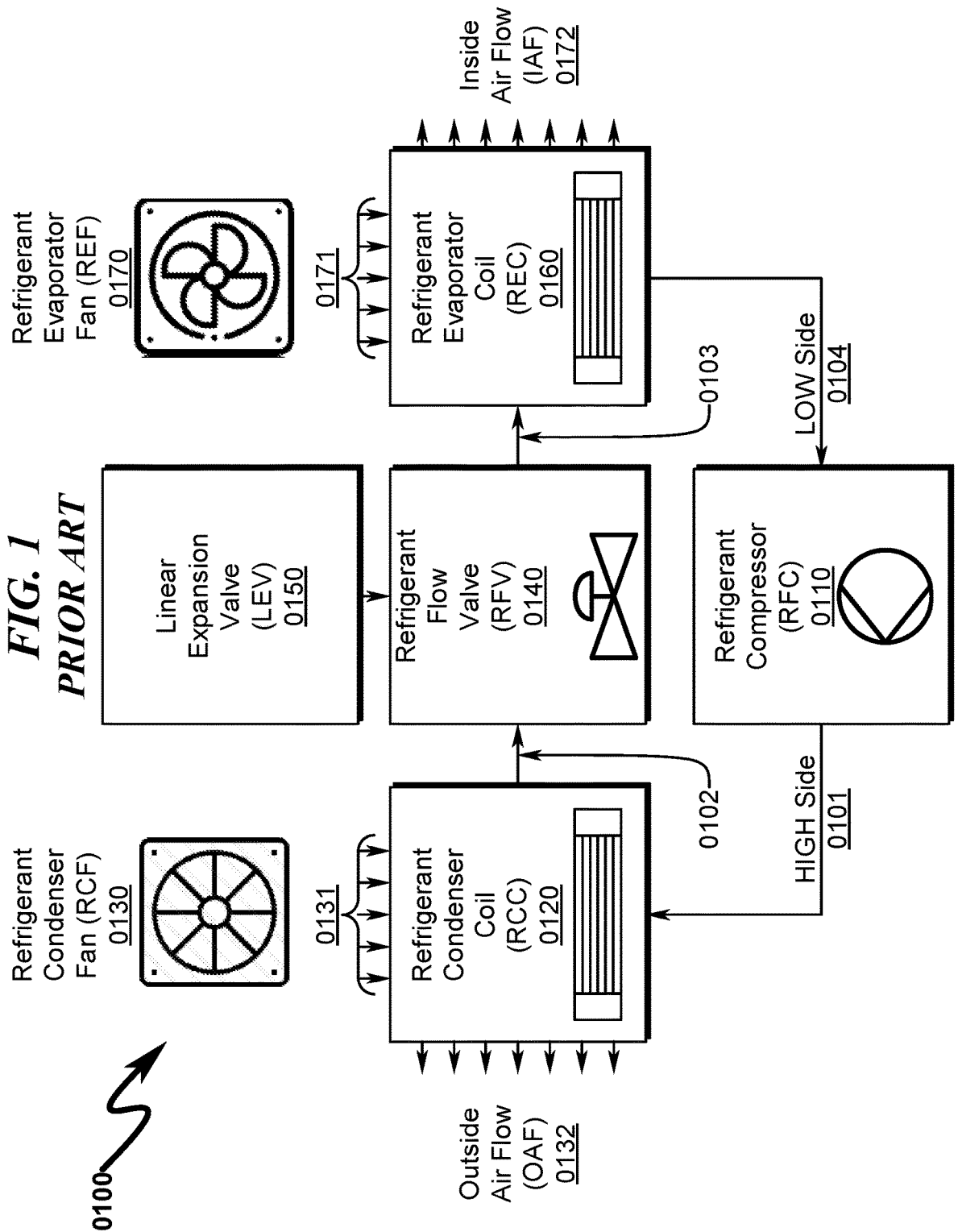
FIG. 1 illustrates a schematic depicting a prior art HVAC system incorporating linear expansion valve (LEV) refrigerant metering.
Figure 2:
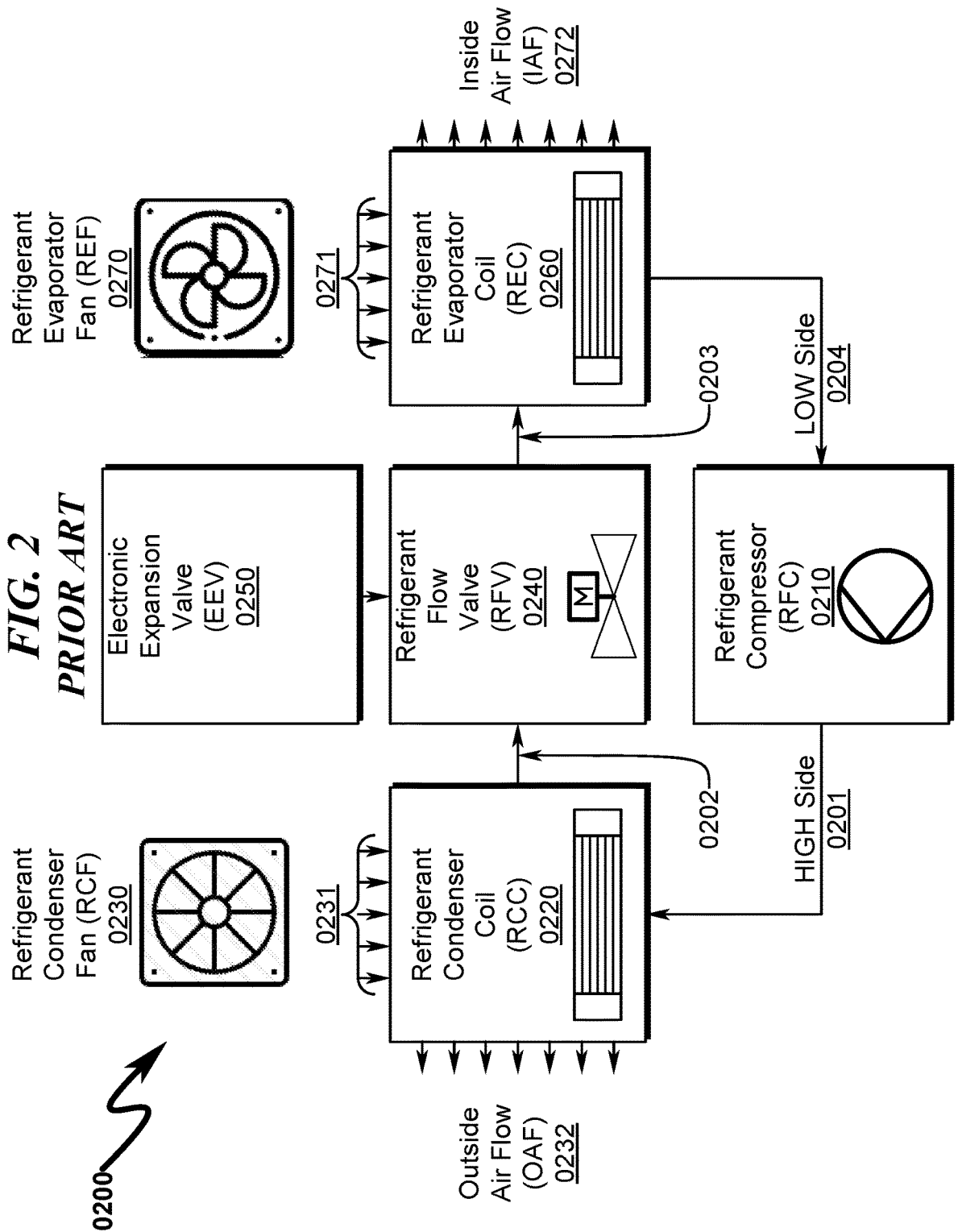
FIG. 2 illustrates a schematic depicting a prior art HVAC system incorporating electronic expansion valve (EEV) refrigerant metering.
Figure 3:
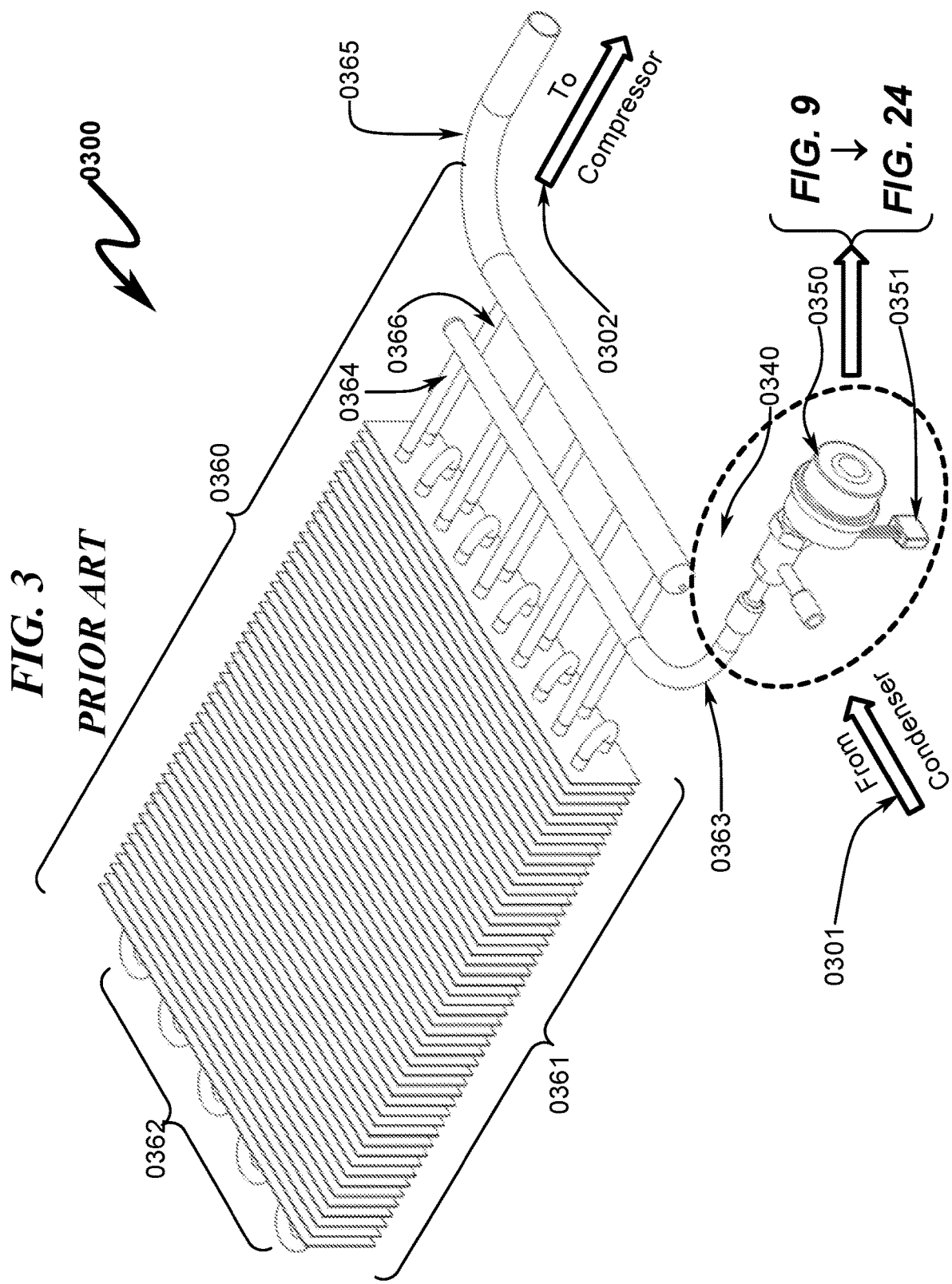
FIG. 3 illustrates a top right front perspective view of a conventional prior art HVAC evaporator coil configured with a prior art refrigerant flow valve (RFV) controlled by a prior art electronic expansion valve (EEV)
Figure 4:
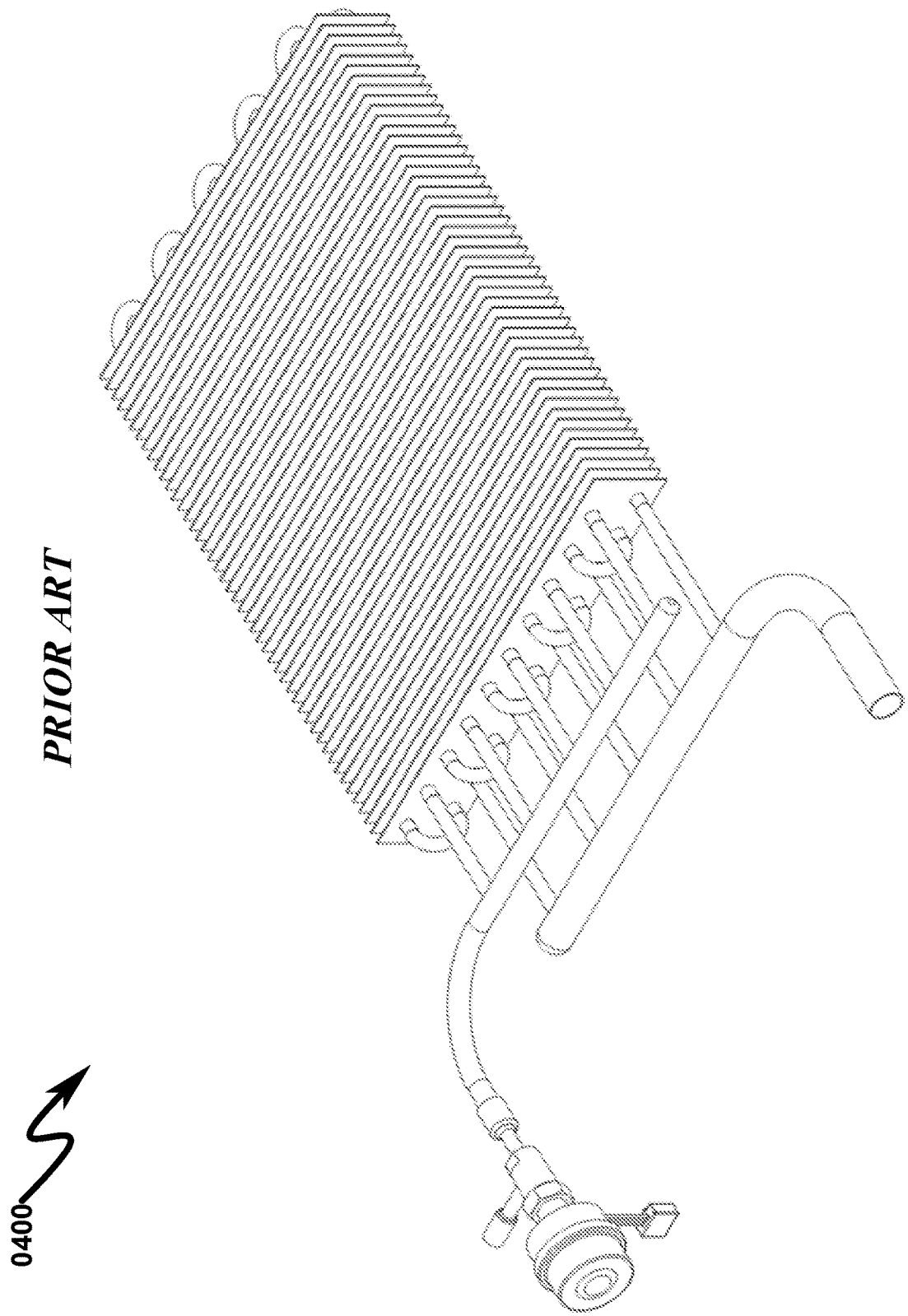
FIG. 4 illustrates a top right rear perspective view of a conventional prior art HVAC evaporator coil configured with a prior art refrigerant flow valve (RFV) controlled by a prior art electronic expansion valve (EEV)
Figure 5:
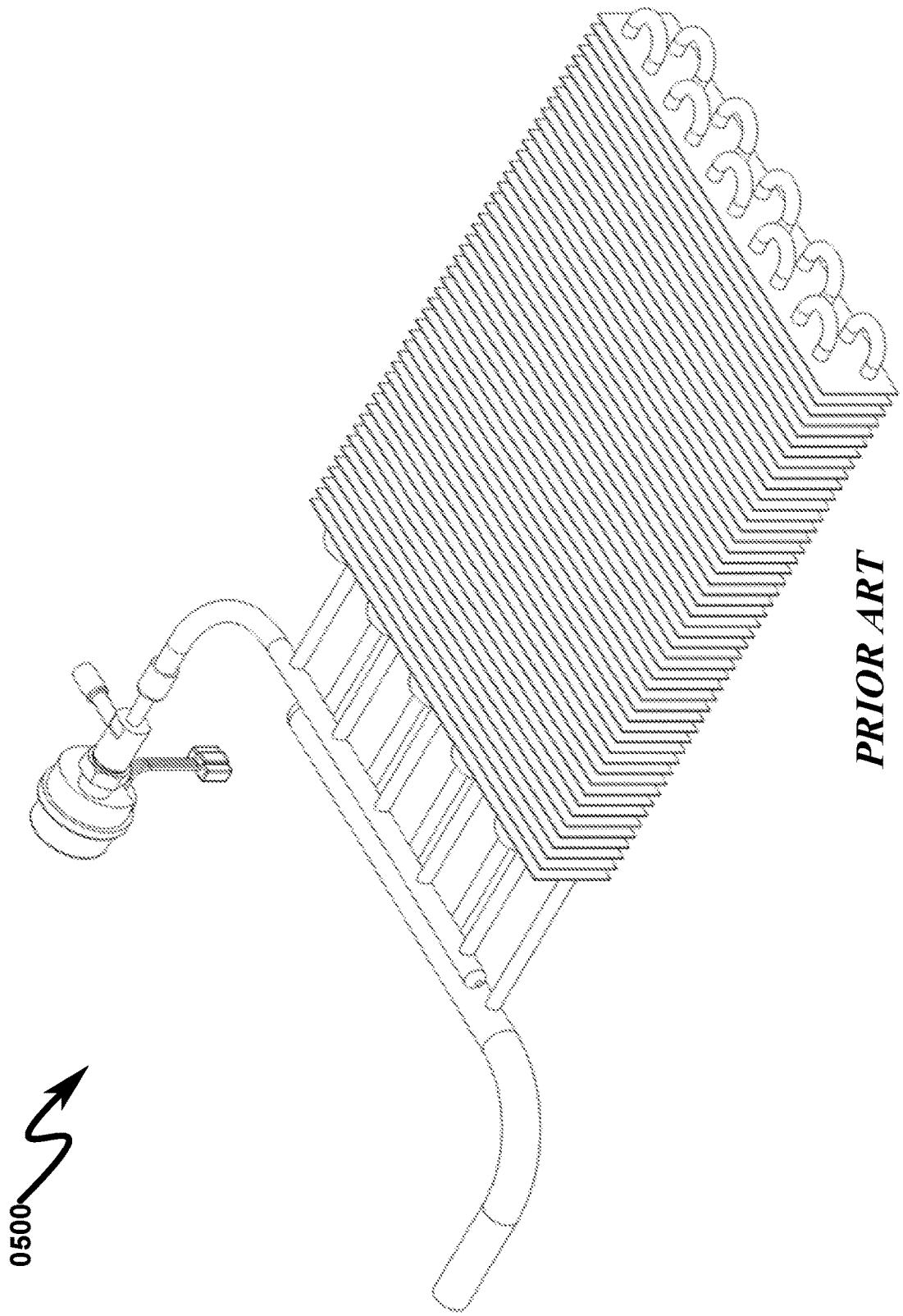
FIG. 5 illustrates a bottom left rear perspective view of a conventional prior art HVAC evaporator coil configured with a prior art refrigerant flow valve (RFV) controlled by a prior art electronic expansion valve (EEV)
Figure 6:
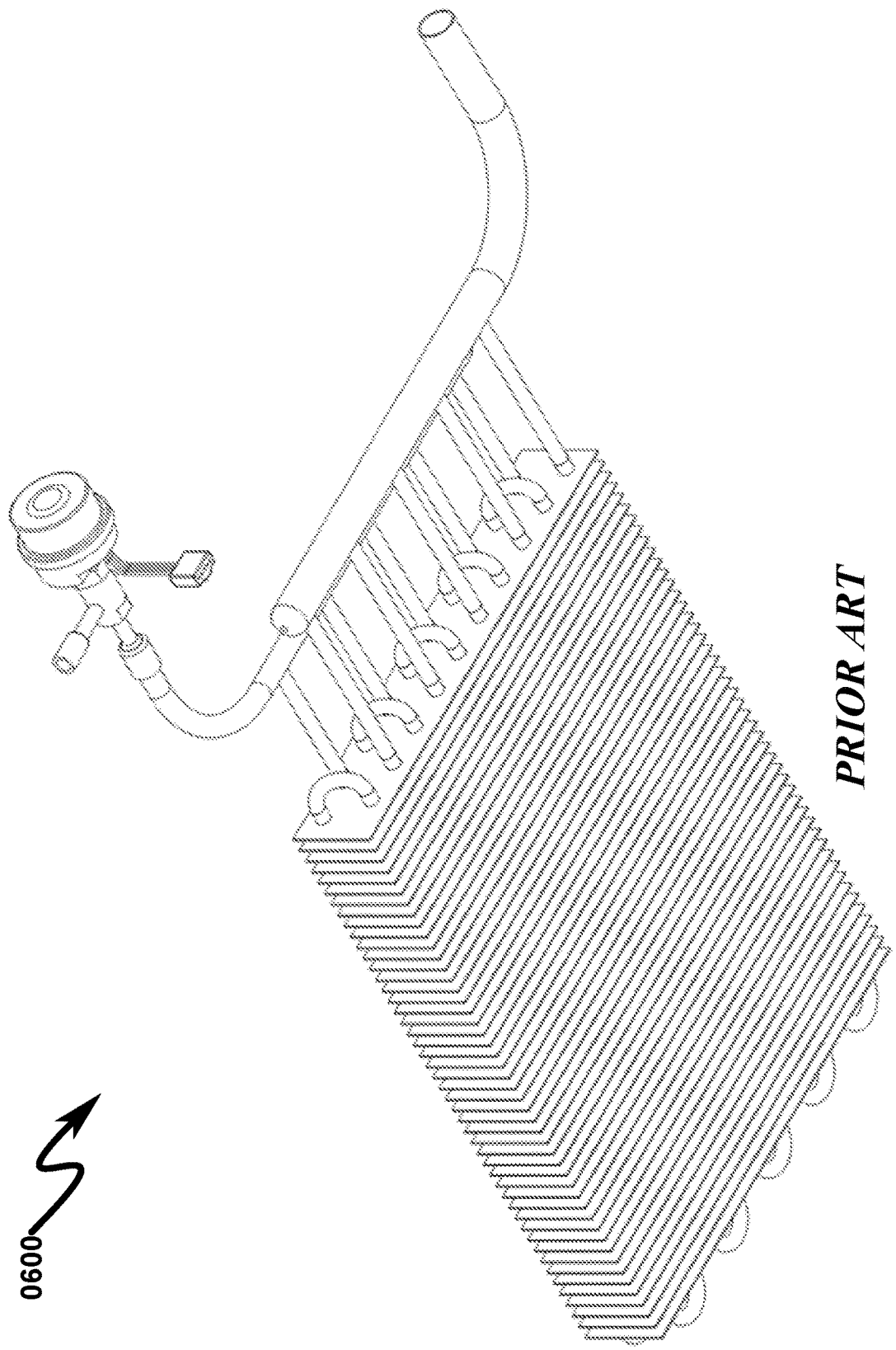
FIG. 6 illustrates a bottom right front perspective view of a conventional prior art HVAC evaporator coil configured with a prior art refrigerant flow valve (RFV) controlled by a prior art electronic expansion valve (EEV)
Figure 7:
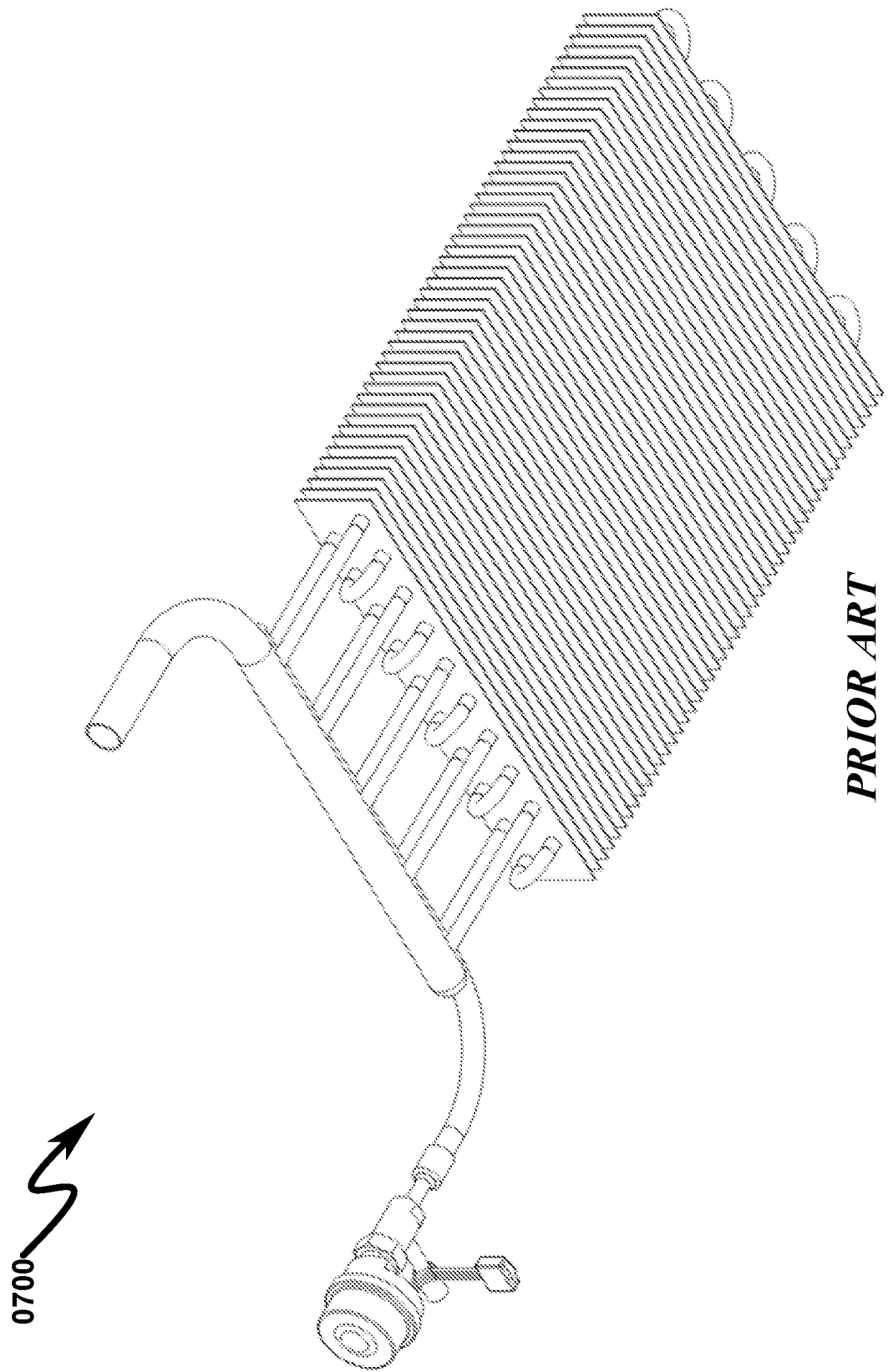
FIG. 7 illustrates a bottom right rear perspective view of a conventional prior art HVAC evaporator coil configured with a prior art refrigerant flow valve (RFV) controlled by a prior art electronic expansion valve (EEV)
Figure 8:
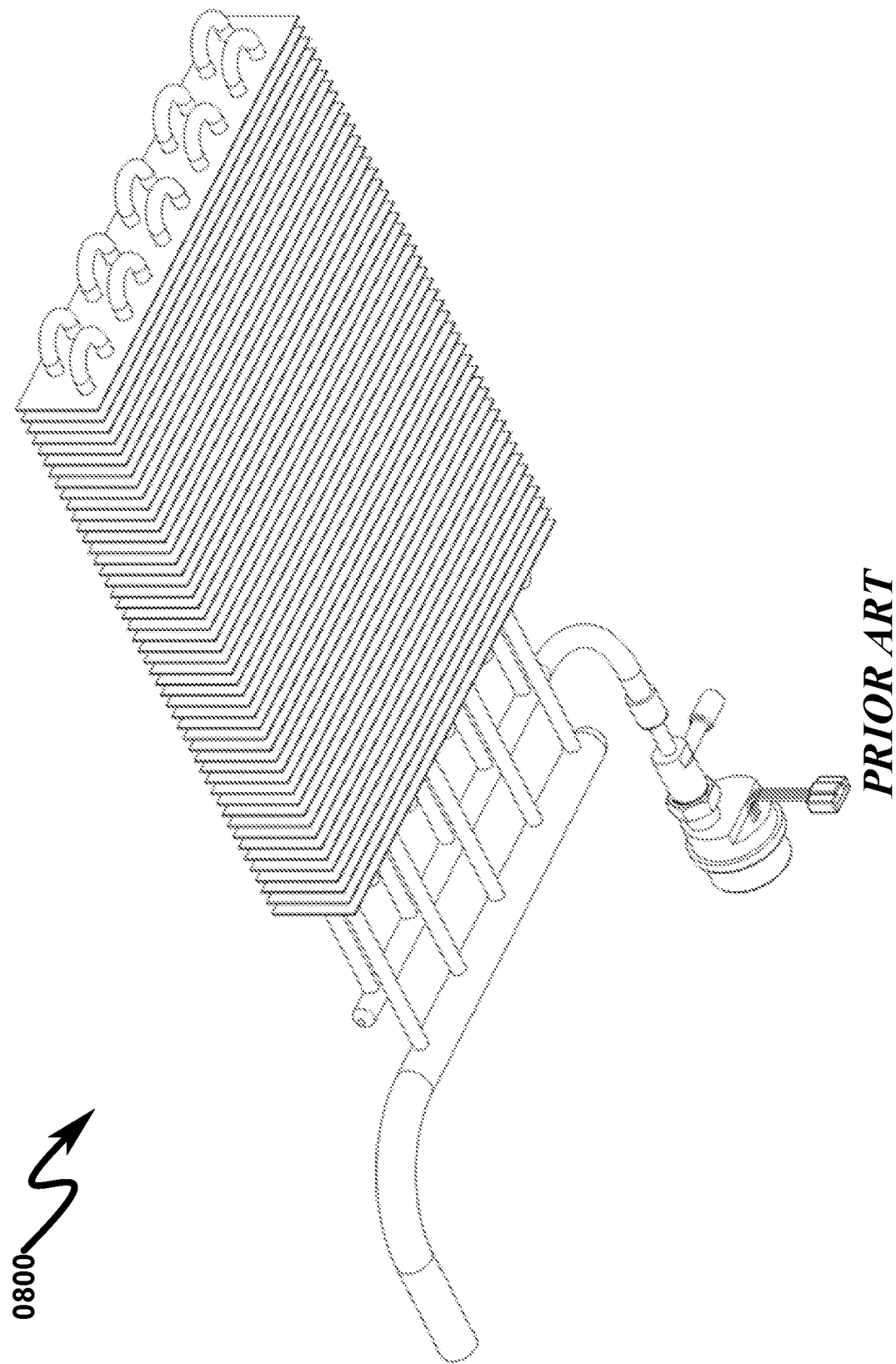
FIG. 8 illustrates a bottom left rear perspective view of a conventional prior art HVAC evaporator coil configured with a prior art refrigerant flow valve (RFV) controlled by a prior art electronic expansion valve (EEV)
Figure 9:
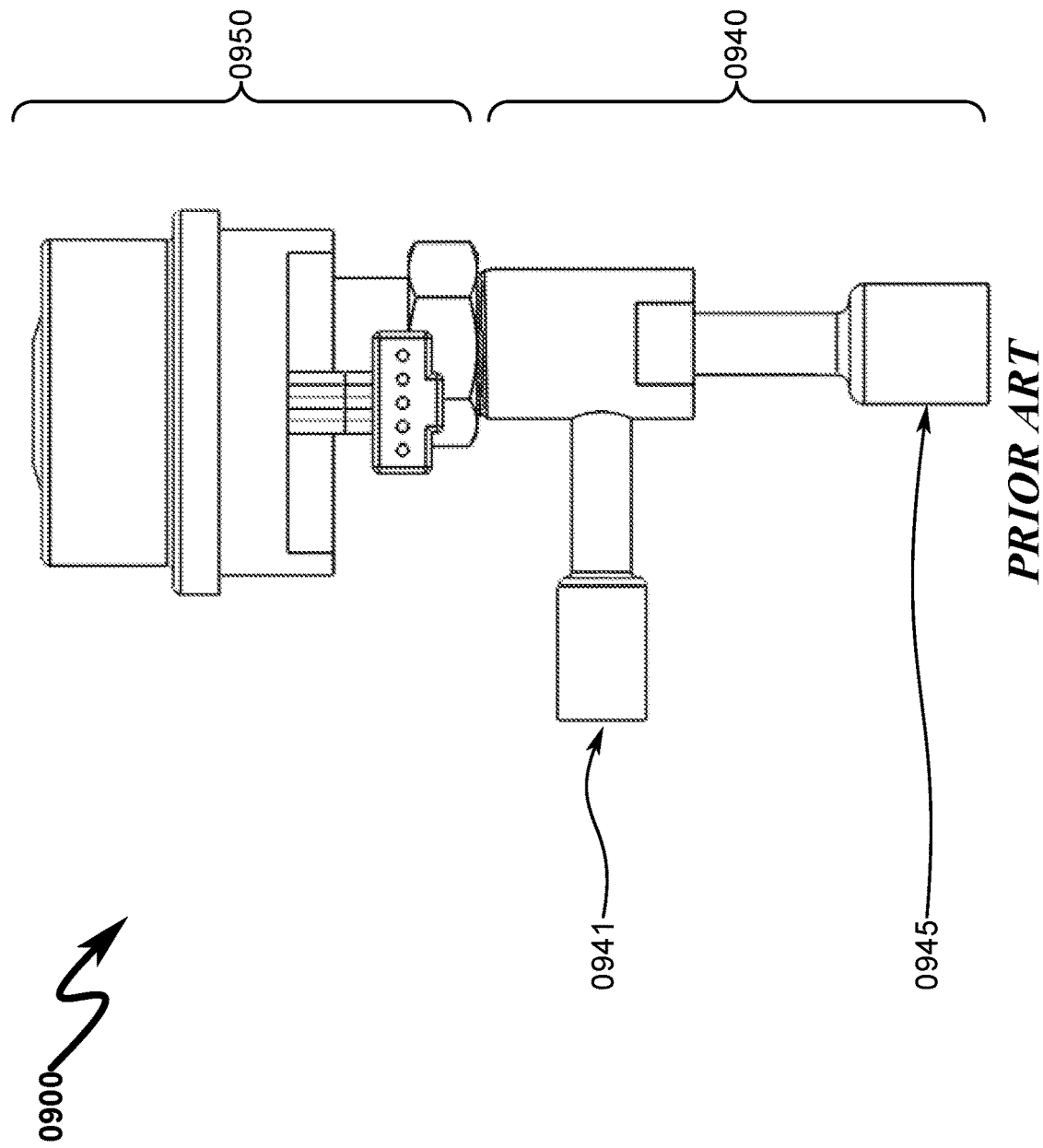
FIG. 9 illustrates a front detail view of a prior art refrigerant flow valve (RFV) controlled by a prior art electronic expansion valve (EEV)
Figure 10:
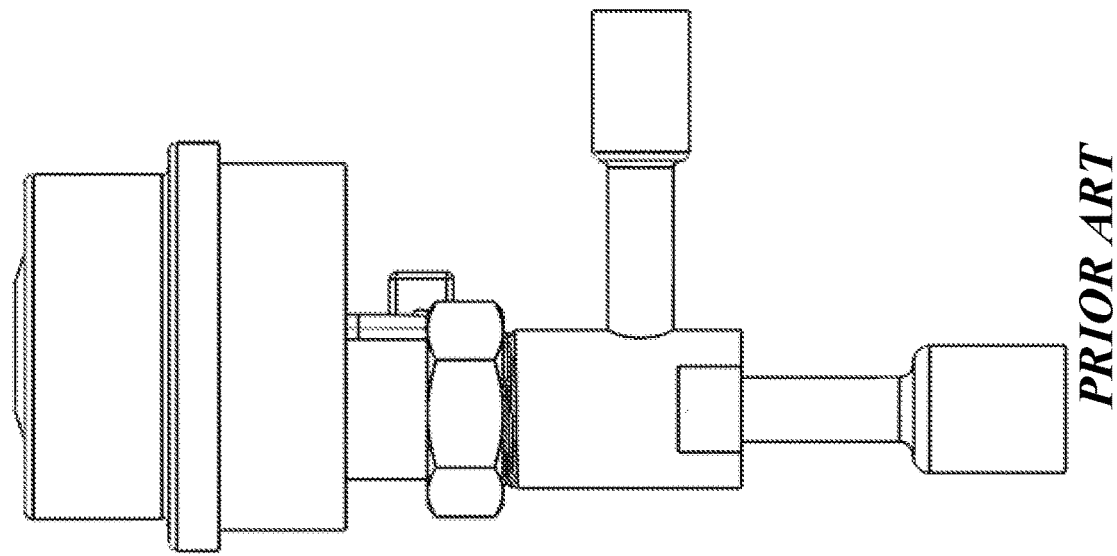
FIG. 10 illustrates a rear detail view of a prior art refrigerant flow valve (RFV) controlled by a prior art electronic expansion valve (EEV)
Figure 11:
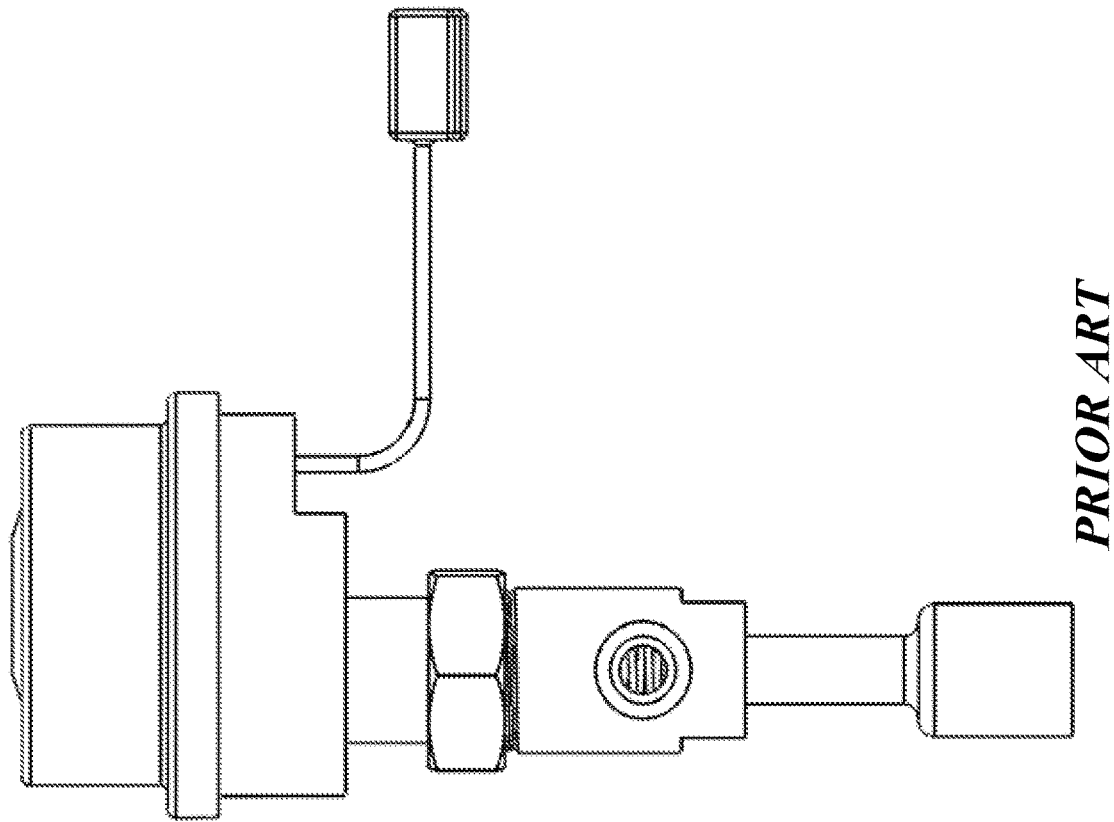
FIG. 11 illustrates a left side detail view of a prior art refrigerant flow valve (RFV) controlled by a prior art electronic expansion valve (EEV)
Figure 12:
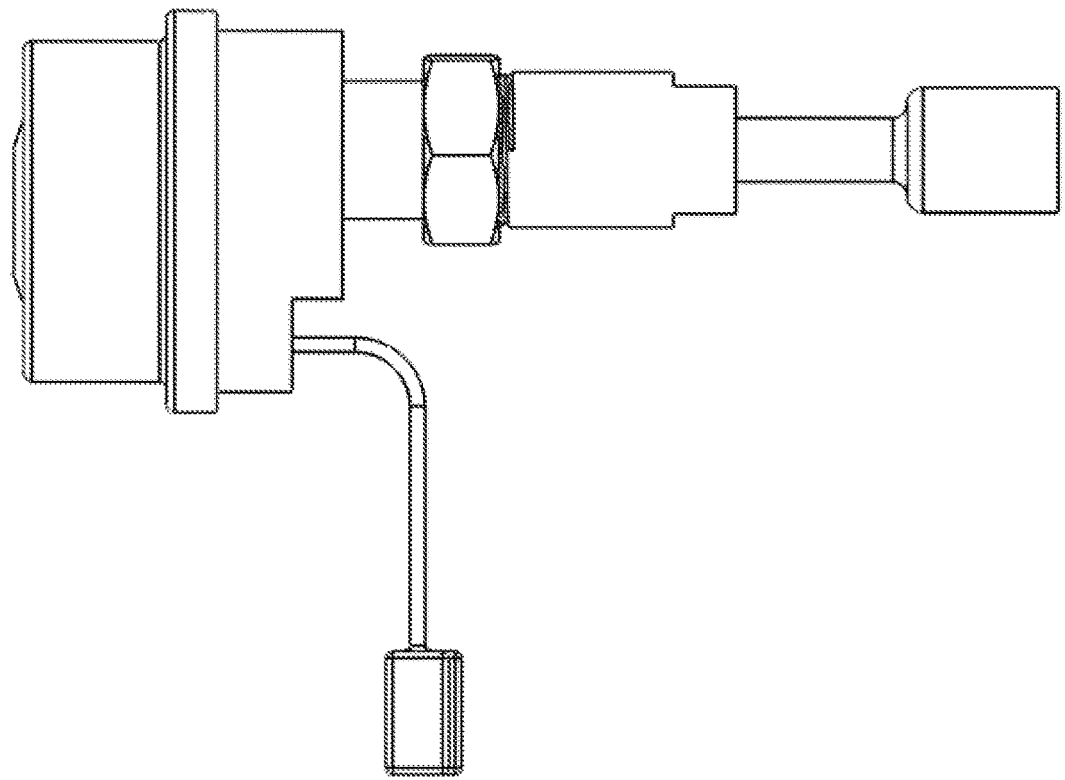
FIG. 12 illustrates a right side detail view of a prior art refrigerant flow valve (RFV) controlled by a prior art electronic expansion valve (EEV)
Figure 13:
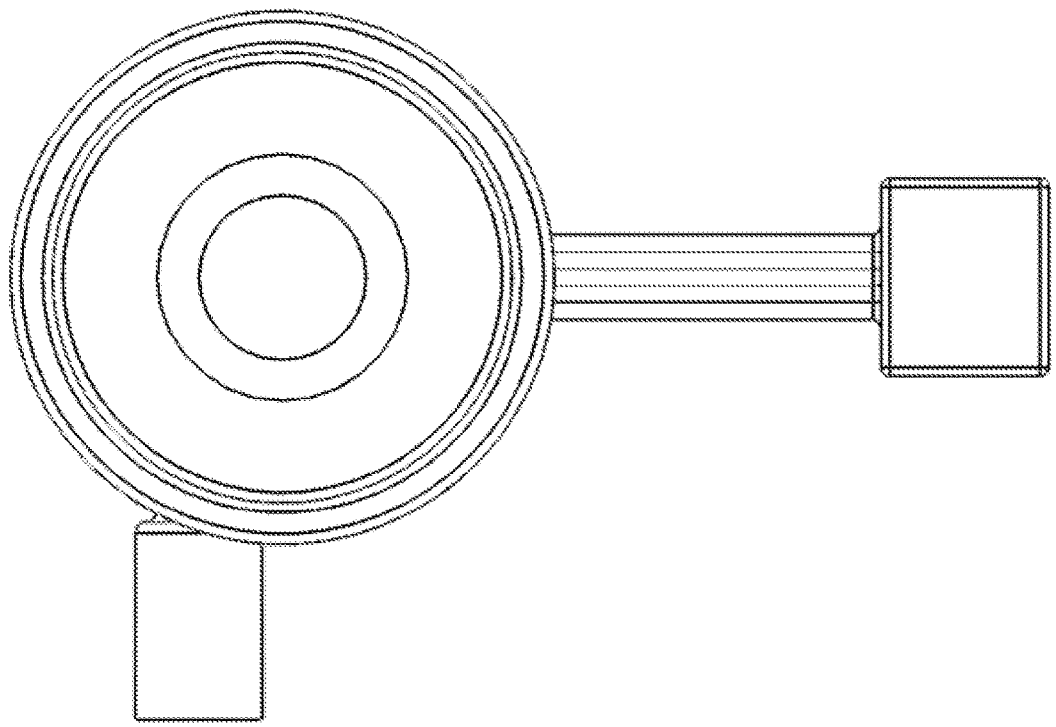
FIG. 13 illustrates a top detail view of a prior art refrigerant flow valve (RFV) controlled by a prior art electronic expansion valve (EEV)
Figure 14:
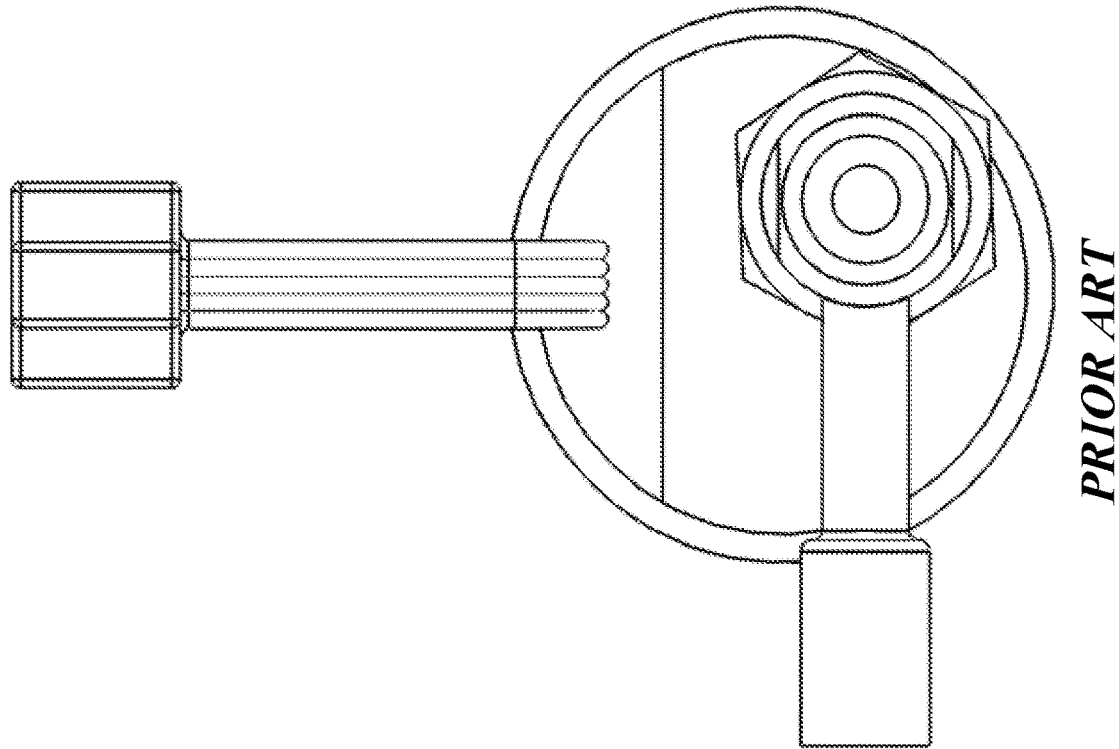
FIG. 14 illustrates a bottom detail view of a prior art refrigerant flow valve (RFV) controlled by a prior art electronic expansion valve (EEV)
Figure 15:
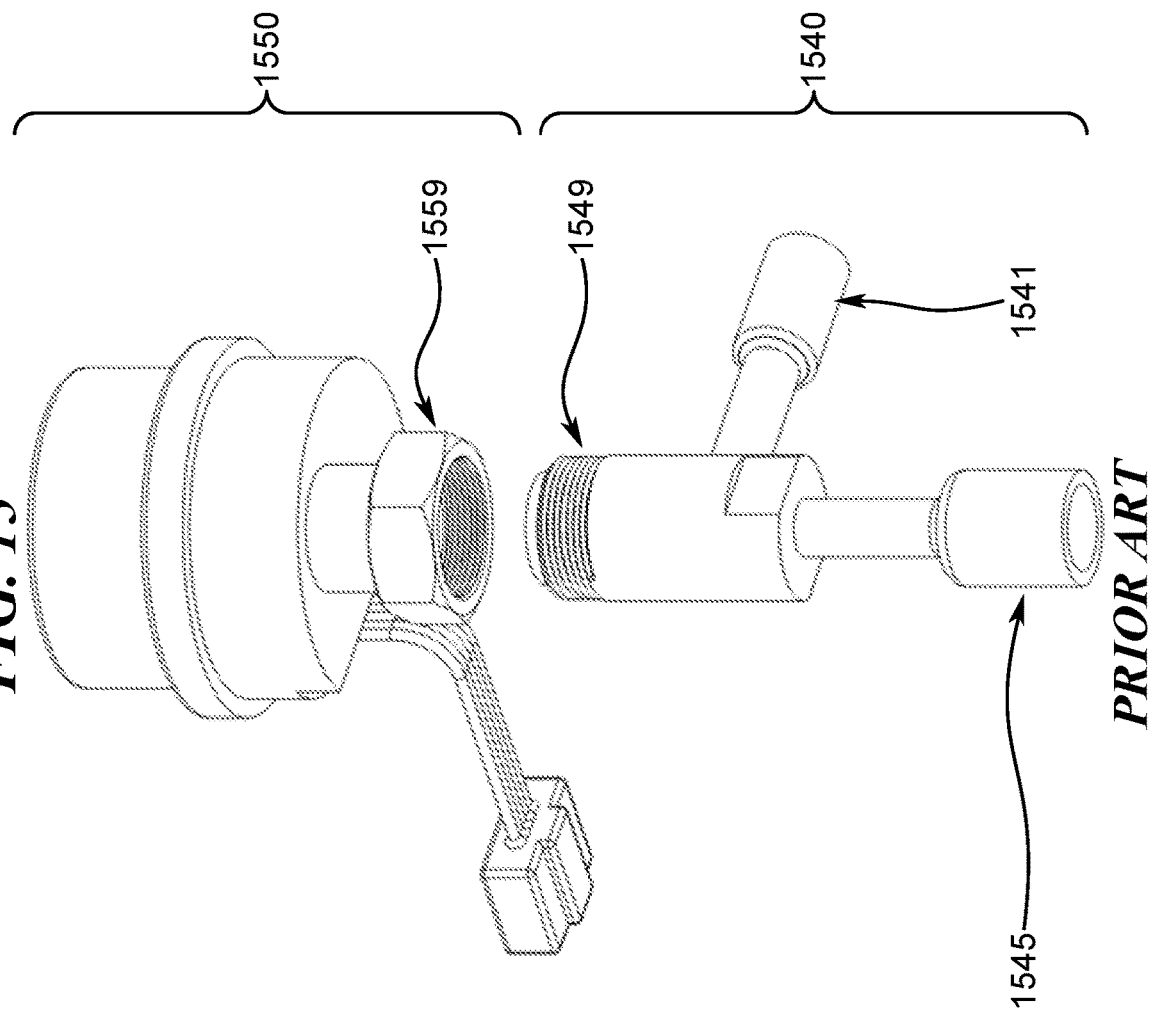
FIG. 15 illustrates an assembly detail view of a prior art refrigerant flow valve (RFV) controlled by a prior art electronic expansion valve (EEV)
Figure 16:
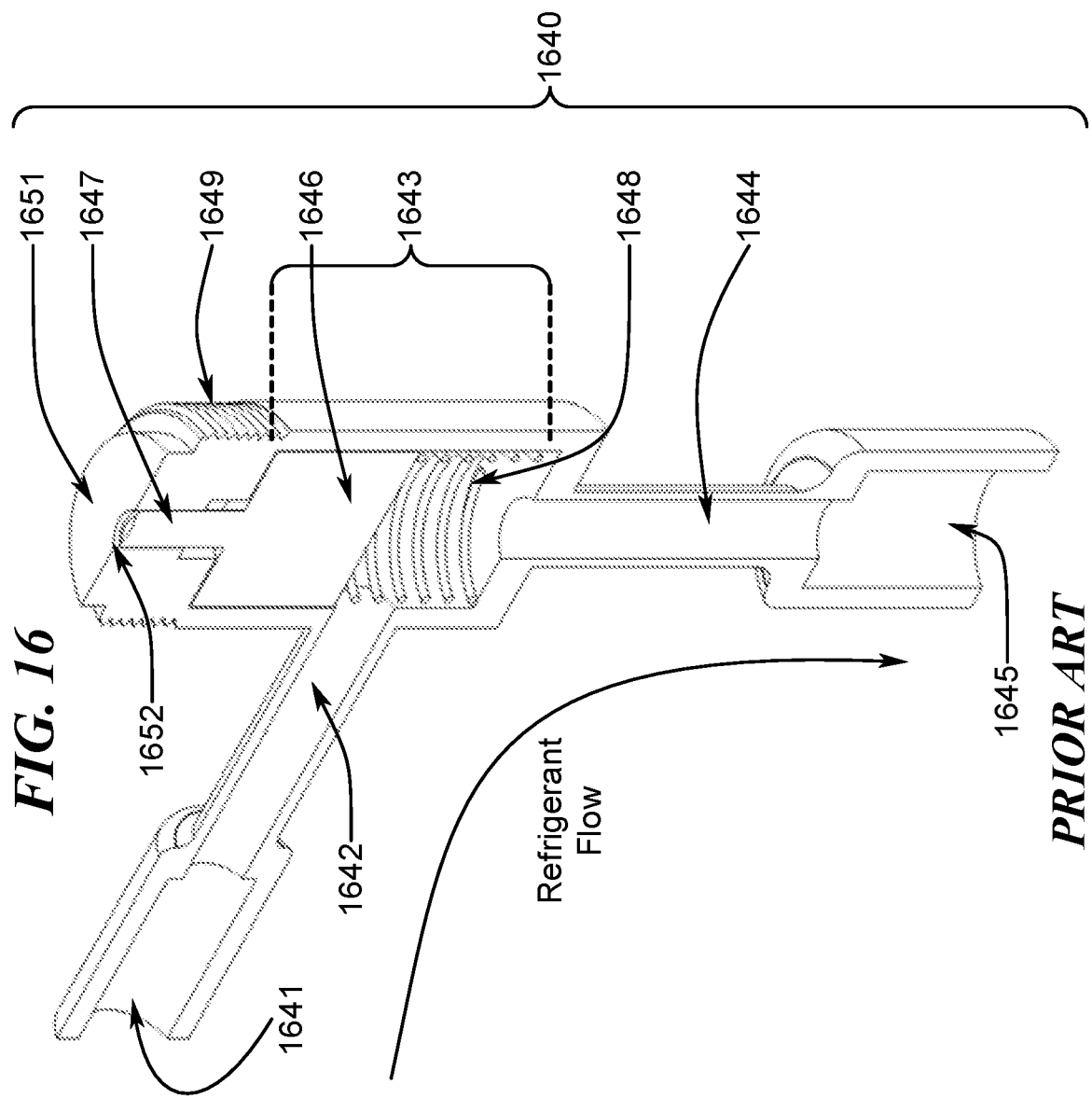
FIG. 16 illustrates a front section perspective view of a prior art refrigerant flow valve (RFV)
Figure 18:
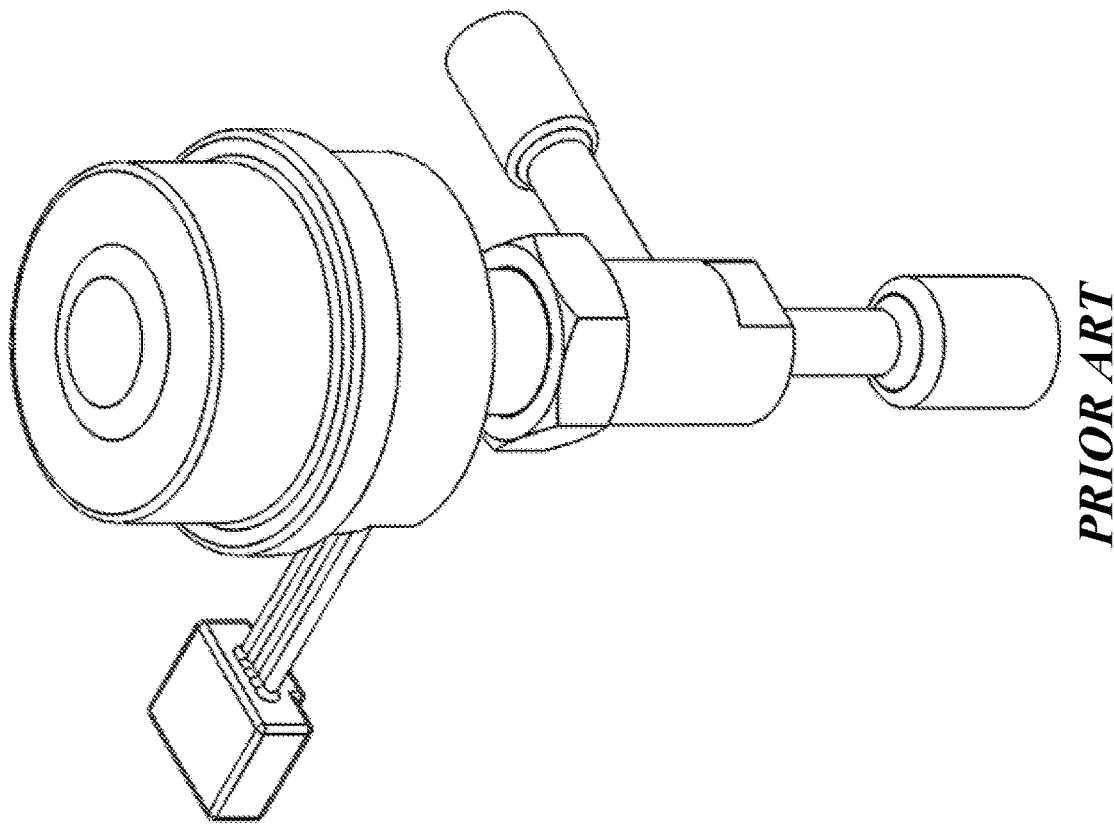
FIG. 18 illustrates a top right rear perspective view of a conventional prior art refrigerant flow valve (RFV) controlled by a prior art electronic expansion valve (EEV)
Figure 19:
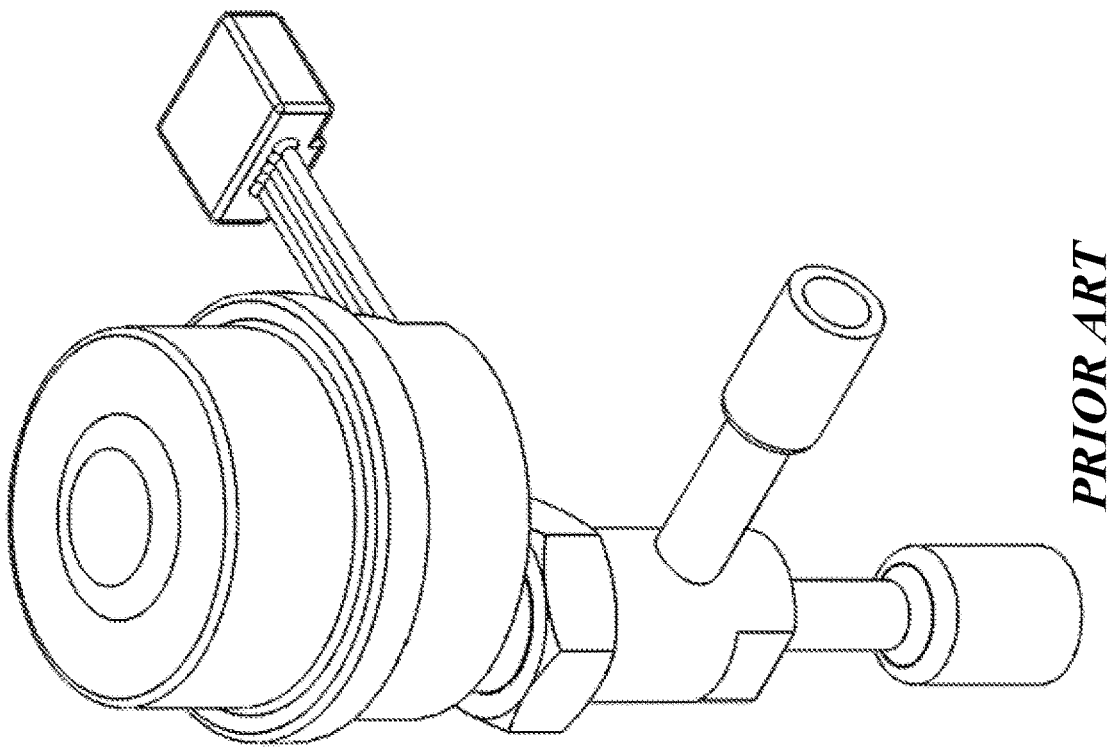
FIG. 19 illustrates a top left rear perspective view of a conventional prior art refrigerant flow valve (RFV) controlled by a prior art electronic expansion valve (EEV)
Figure 20:
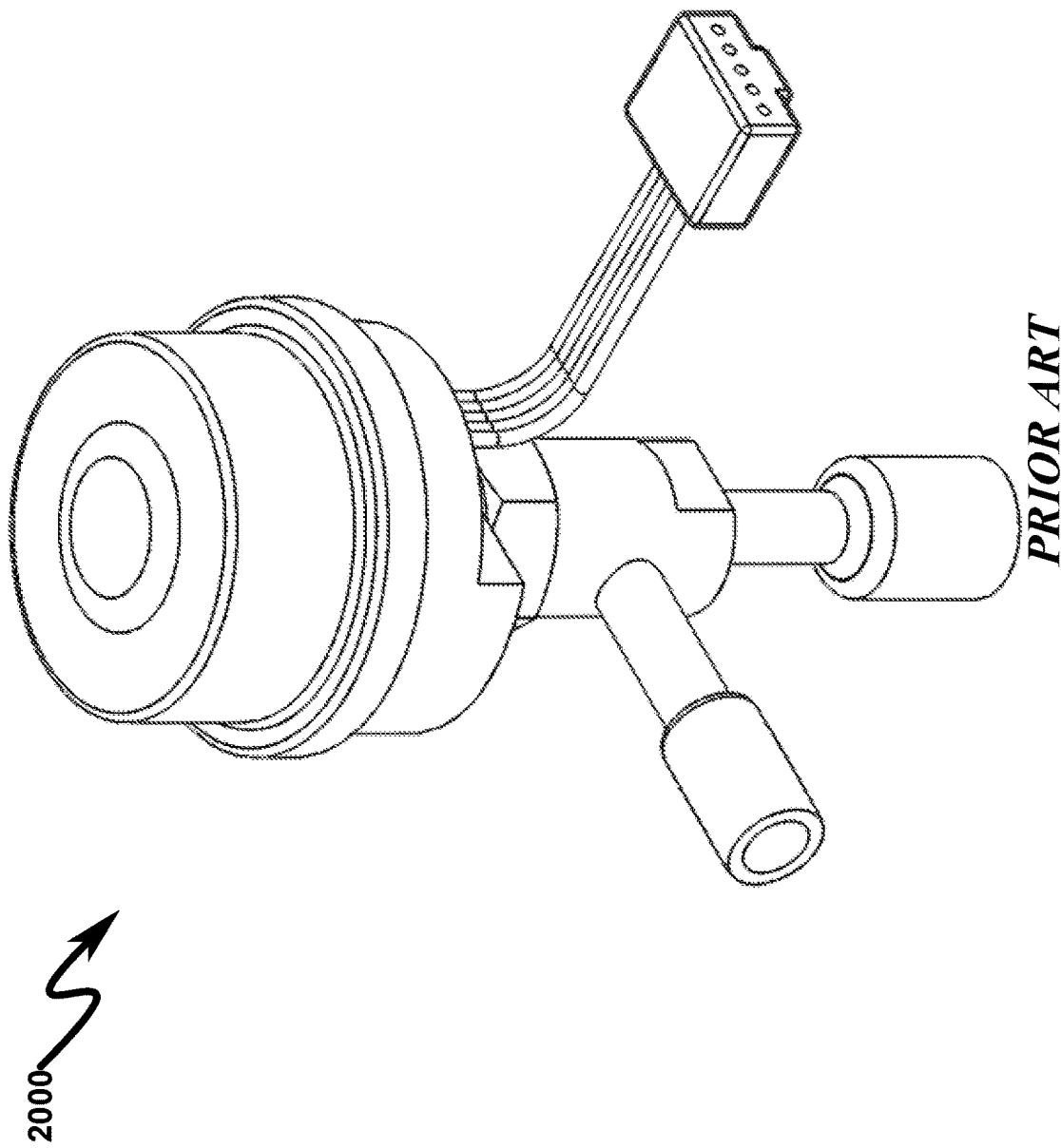
FIG. 20 illustrates a top left front perspective view of a conventional prior art refrigerant flow valve (RFV) controlled by a prior art electronic expansion valve (EEV)
Figure 21:
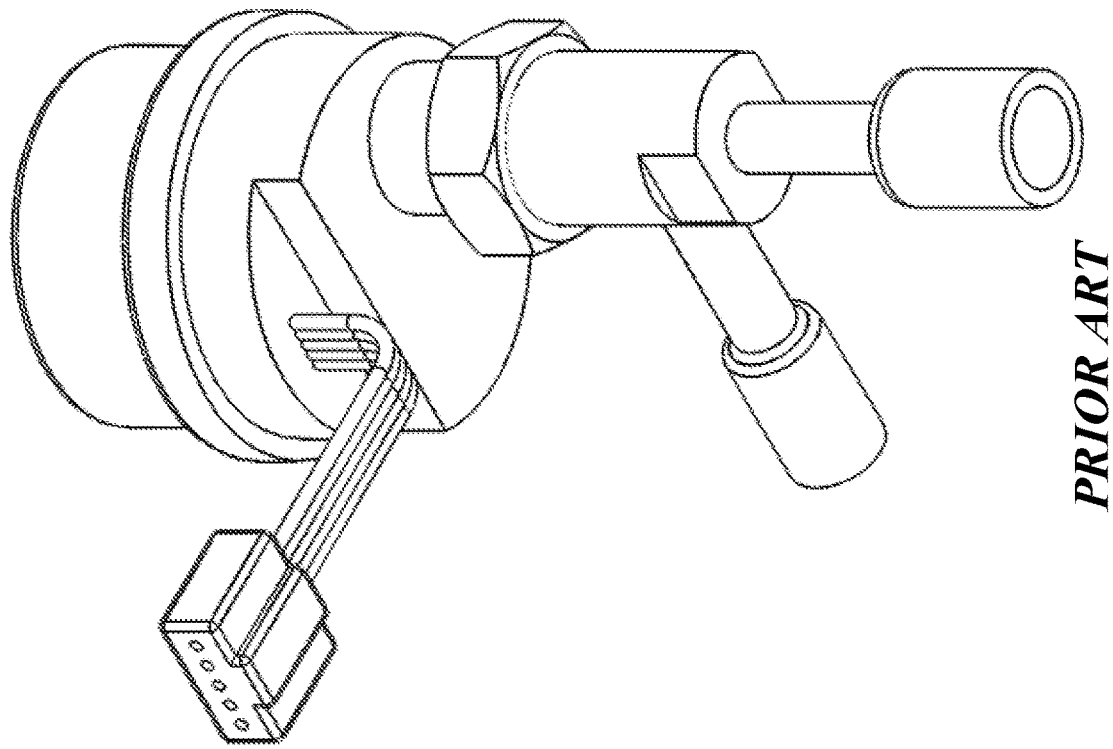
FIG. 21 illustrates a bottom right front perspective view of a conventional prior art refrigerant flow valve (RFV) controlled by a prior art electronic expansion valve (EEV)
Figure 22:
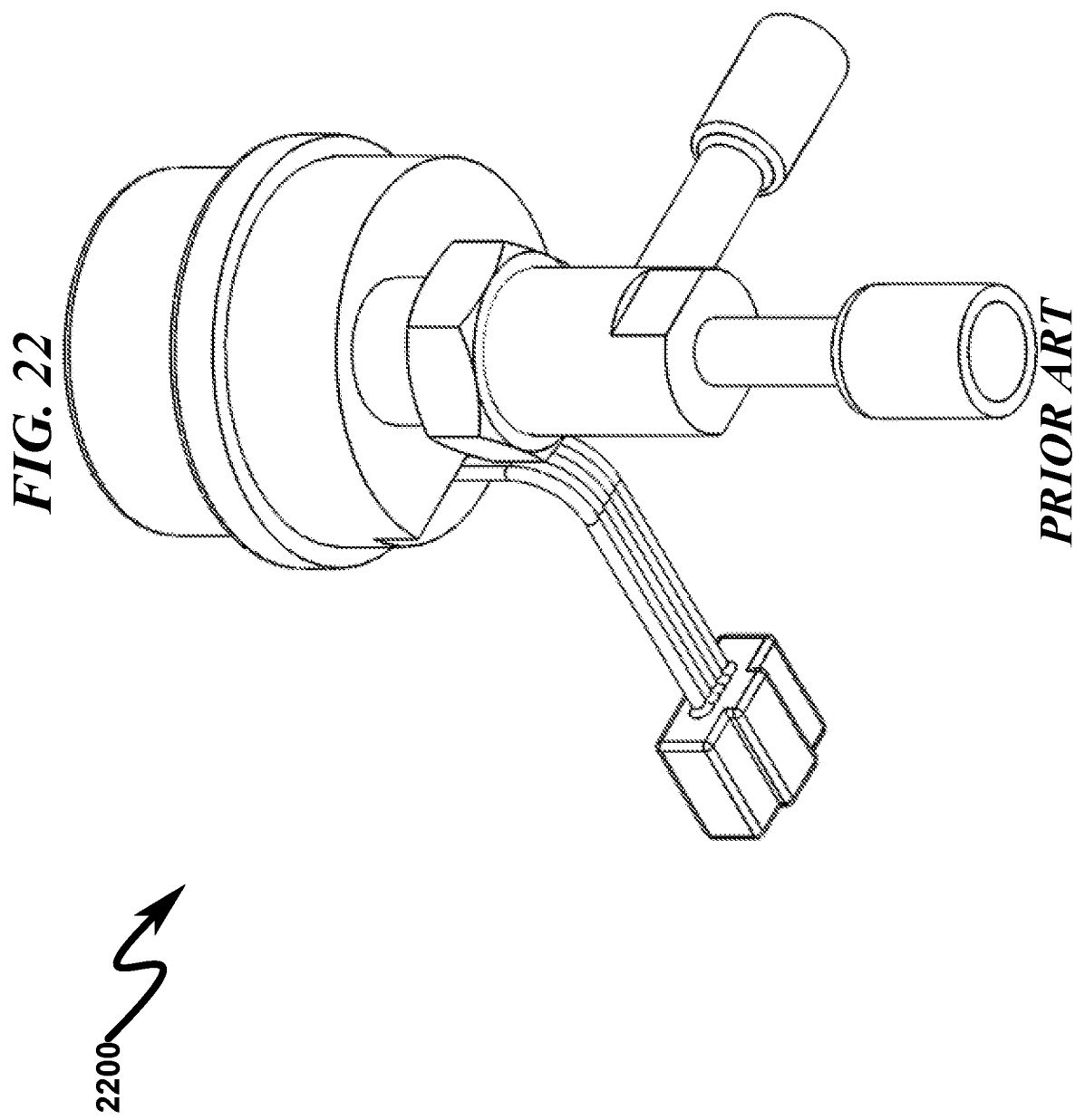
FIG. 22 illustrates a bottom right rear perspective view of a conventional prior art refrigerant flow valve (RFV) controlled by a prior art electronic expansion valve (EEV)
Figure 23:
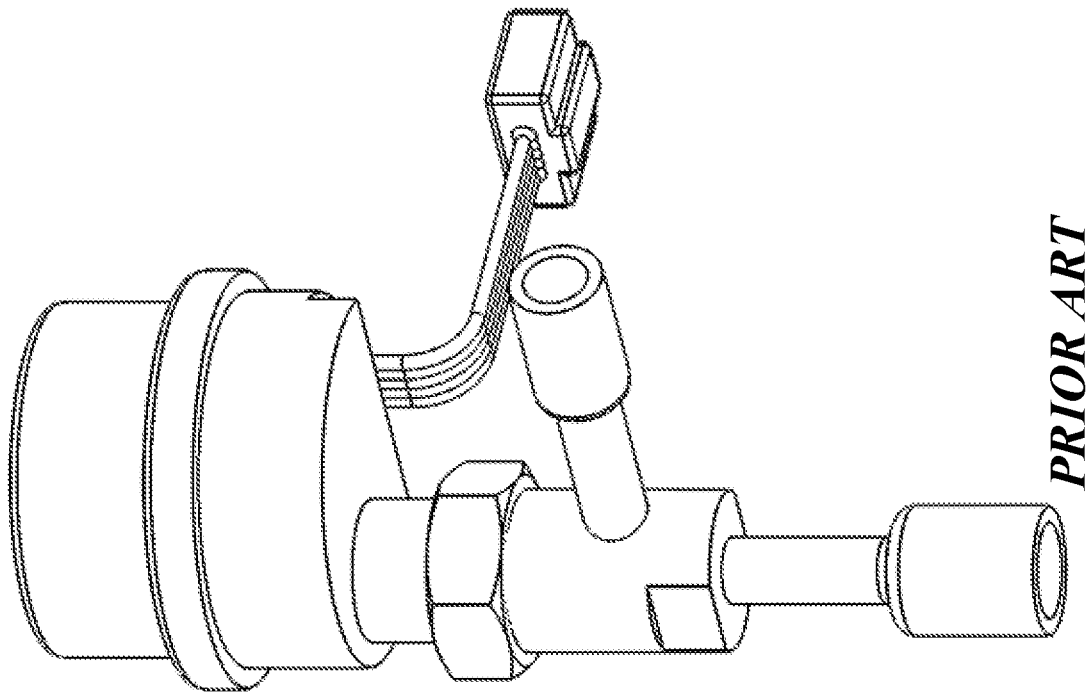
FIG. 23 illustrates a bottom left rear perspective view of a conventional prior art refrigerant flow valve (RFV) controlled by a prior art electronic expansion valve (EEV)
Figure 24:
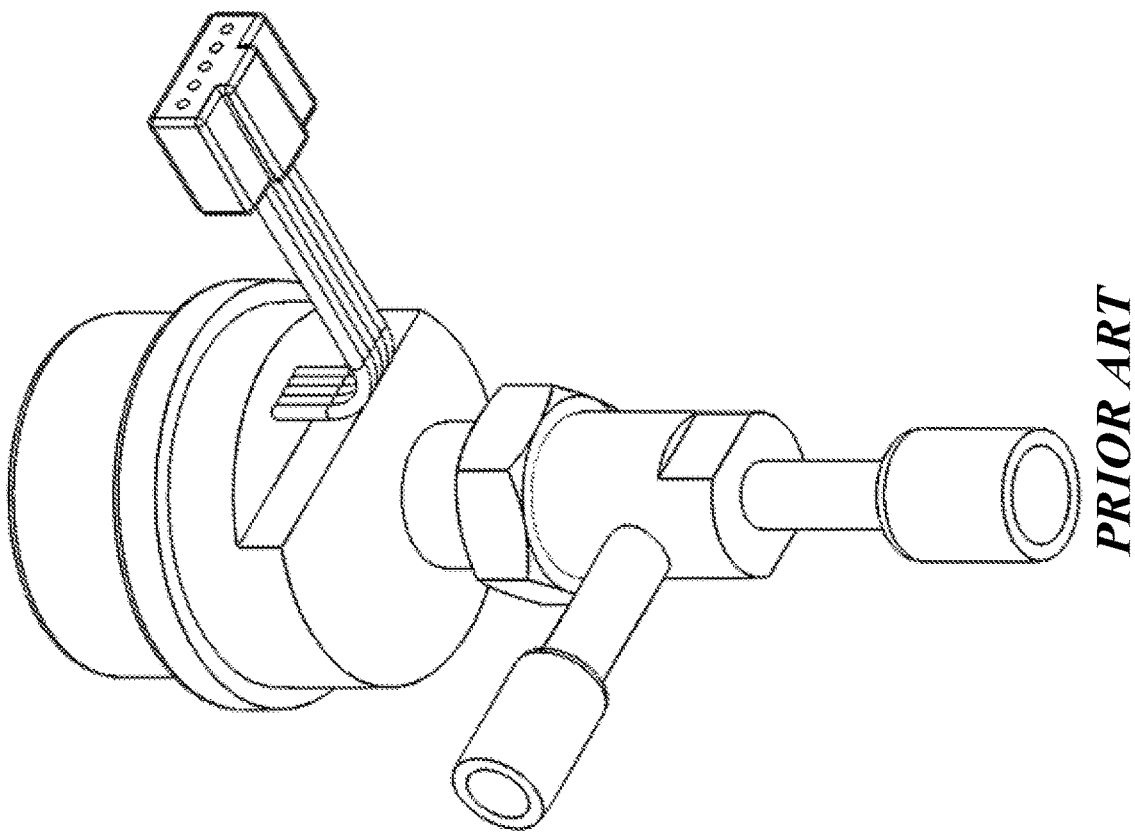
FIG. 24 illustrates a bottom left front perspective view of a conventional prior art refrigerant flow valve (RFV) controlled by a prior art electronic expansion valve (EEV)

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a REFRIGERANT METERING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

HVAC Heating/Cooling Operation Not Limitive

The present invention will be described in terms of a conventional HVAC heating/cooling system. In some application contexts, the system is operated solely as a cooling system. Thus, the present invention is not limited to heating, cooling, or heating/cooling systems, but combinations of these configurations are also anticipated. The present invention may be utilize with heat pumps, heat recovery, refrigeration, and other systems that employ LEV/EEV/TEV/AEV controls and/or REC components. The discussion herein does not limit the type of environment in which the present invention may be applied.

LEV/EEV/TEV/AEV Not Limitive

The present invention will be discussed in terms of replacement of a linear expansion valve (LEV) and an electronic expansion valve (EEV). However, the present invention is not limited to these particular refrigerant metering devices and any thermal expansion valve (TEV) may be substituted using the disclosed invention depending on the particular application context. As such, the examples of LEV/EEV are only exemplary of some situations in which the present invention may be employed. Within the context of this disclosure, the term "automated expansion valve (AEV)" will refer to any number of the above-mentioned refrigerant expansion valves that may be replaced temporarily or permanently by the present invention as described herein.

Connection Fitting Type Not Limitive

While the present invention will be described herein using components that utilize soldered connections, the present invention anticipates that other connection fittings may be utilized on the components with no loss of generality in the invention teachings or claim scope. Specifically, the RFV and EIV described herein may incorporate a wide variety of connection fittings, including but not limited to: soldered; brazed; flared; compression; or national pipe thread (NPT). One skilled in the art will not need additional information to make these substitutions based on specific application context as these connection fittings are standards and well known in the art.

RFV Orientation Not Limitive

The refrigerant flow valve (RFV) depicted herein is configured with an input transfer port that is configured to be perpendicular to a central transfer port and associated output transfer port. The present invention anticipates that a wide variety of input/central/output port configurations may be utilized with the present invention without loss of generality in the invention teachings or claim scope. One skilled in the art will not need additional information to make these substitutions based on specific application context, as variants of these configurations are well known in the art.

Condenser Isolation Valve (CIV) Not Limitive

Some preferred exemplary invention embodiments employ a condenser isolation valve (CIV) to isolate refrigerant flow from the output of the refrigerant condenser coil (RCC) to the refrigerant flow valve (RFV). In many preferred embodiments this CIV is implemented as a ball valve having soldered, brazed, flare, or pipe thread (NPT) fittings. In some preferred embodiments this CIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these CIVs are preferred in many invention embodiments, they are not limitive of the scope of CIV that may be utilized in the present invention.

Flow Isolation Valve (FIV) Not Limitive

Some preferred exemplary invention embodiments employ a flow isolation valve (FIV) to isolate refrigerant flow from the output of the refrigerant flow valve (RFV) to the refrigerant evaporator coil (REC). In many preferred embodiments this FIV is implemented as a ball valve having soldered, brazed, flare, or pipe thread (NPT) fittings. In some preferred embodiments this FIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these FIVs are preferred in many invention embodiments, they are not limitive of the scope of FIV that may be utilized in the present invention.

Evaporator Isolation Valve (EIV) Not Limitive

Some preferred exemplary invention embodiments employ an evaporator isolation valve (EIV) to isolate refrigerant flow from the output of the refrigerant evaporator coil (REC) to the refrigerant compressor (RFC). In many preferred embodiments this EIV is implemented as a ball valve having soldered, brazed, flare, or pipe thread (NPT) fittings. In some preferred embodiments this EIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these EIVs are preferred in many invention embodiments, they are not limitive of the scope of EIV that may be utilized in the present invention.

Isolation Valve Count Not Limitive

While the present invention as discussed herein provides examples of system embodiments wherein a CIV, FIV, and EIV are implemented, the present invention is not limited to these particular configuration and some preferred exemplary system embodiments may have fewer than these three valves or combinations of less than these three valves.

Schrader/American Valve Not Limitive

While many of the CIV/FIV/EIV used in implementing the present invention may incorporate one or more Schrader valves (also called an American valve) between the CIV/FIV/EIV refrigerant input port (RIP) and refrigerant output port (ROP) (between which is positioned the refrigerant control valve (RCV) that allows the CIV/FIV/EIV to halt refrigerant flow from the RIP to the ROP) to allow the refrigerant flow lines and/or REC to be evacuated and filled with refrigerant on one or more sides of the CIV/FIV/EIV valve structure, this is not necessarily a requirement of the CIV/FIV/EIV.

The positioning of the Schrader valve in these implementations is preferred to be between the CIV RIP and the RCC output port, the FIV ROP and the REC input port, and the EIV RIP and the REC output port. This configuration allows isolation of the RFV and/or the REC to affect repair and/or replacement of either of these HVAC system components as well as the AEV. These valves as positioned in the HVAC system allow the REC to be evacuated and filled with refrigerant without impacting the RFV or RCC. These valves as positioned in the HVAC system allow the AEV to be replaced and/or repaired without impacting the RFV, RCC, or REC.

However, some invention embodiments may place the Schrader valve at different positions within the CIV/FIV/EIV, while other embodiments may utilize two Schrader valves, one between the RIP and the RCV, and another between the ROP and the RCV. While the use of Schrader valves is preferred and these valves are well known in the art, the present invention is not limited to this particular type of valve in the implementation.

Drawings Not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

System Overview (2500)

Figure 25:
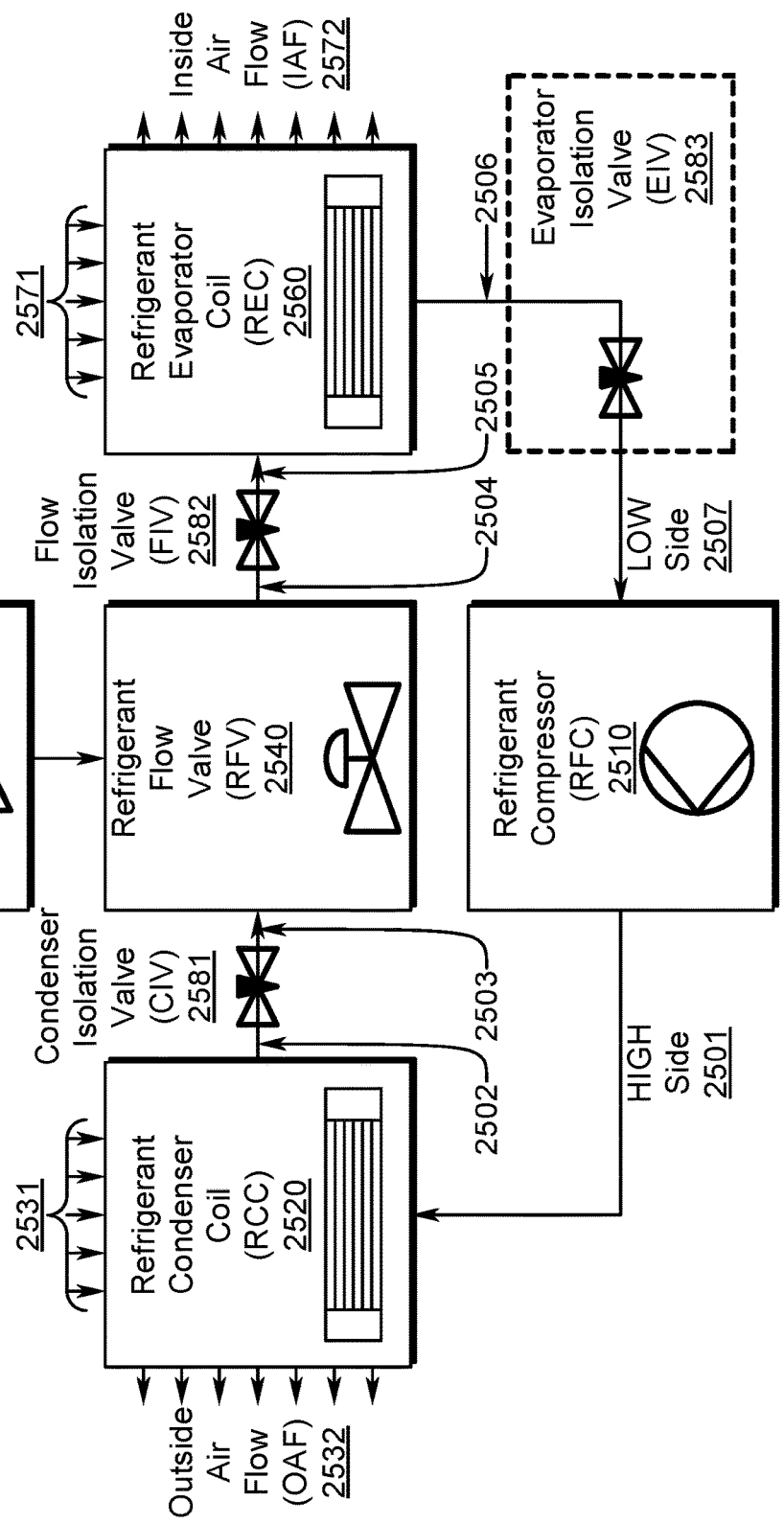
FIG. 25 illustrates a schematic depicting a preferred exemplary embodiment of a present invention system implementing a HVAC system incorporating manual expansion valve (MEV) refrigerant metering with a condenser isolation valve (CIV), flow isolation valve (FIV), and an evaporator isolation valve (EIV)

A system block diagram of a present invention HVAC system incorporating manual expansion valve (MEV) refrigerant metering with a condenser isolation valve (CIV), flow isolation valve (FIV), and evaporator isolation valve (EIV) is generally depicted in FIG. 25 (2500). Here the refrigerant compressor (RFC) (2510) compresses refrigerant and emits same to a high side (2501) output that is fed into a refrigerant condenser coil (RCC) (2520). A refrigerant condenser fan (RCF) (2530) generates an input air flow (2531) across the RCC (2530) and transfers heat to (from) the RCC (2530) (depending on the heating or (cooling) operation of the overall HVAC system) to generate an outside air flow (OAF) (2532) that is cooler (warmer) than the input air flow (2531) temperature. The heated (cooled) refrigerant is then transferred from the RCC (2520) via a refrigerant line (2502) to condenser isolation valve (CIV) (2581) and then via a refrigerant line (2503) to a refrigerant flow valve (RFV) (2540) mechanically controlled by manual expansion valve (MEV) (2550) that meters refrigerant via the RFV (2540) and transfers this metered refrigerant flow via a refrigerant line (2504) to a flow isolation valve (FIV) (2582) and then via a refrigerant line (2505) to a refrigerant evaporator coil (REC) (2560). A refrigerant evaporator fan (REF) (2570) takes unconditioned inside air (2571) and forces this across the REC (2560) to generate a conditioned inside air flow (2572). Refrigerant is emitted from the REC (2560) output port and is transferred via a refrigerant line (2506) to an evaporator isolation valve (EIV) (2583) and a refrigerant line (2507) to the RFC (2510) to complete the refrigerant flow within the HVAC system.

In the event of a failure of a LEV/EEV/AEV in a typical system, this component may be removed and replaced with the MEV (2550) and the MEV (2550) may then be manually adjusted to properly meter the HVAC refrigerant flow to the REC (2560). This replacement can be affected by first closing the CIV (2581) and the FIV (2582) that isolates the RFV from the HVAC refrigerant flow loop. Once this is accomplished, the failing LEV/EEV/AEV may be removed and replaced with a MEV (2550). Once the MEV (2550) is in place, the CIV (2581) and the FIV (2582) are opened and the MEV (2550) is adjusted for a nominal refrigerant flow in order to allow the HVAC system to operate in a nominal fashion until a replacement LEV/EEV/AEV can be obtained. This ability to bring back the HVAC system to a nominal (albeit not optimal) operating point rapidly is a key advantage of the present invention over waiting for a replacement LEV/EEV/AEV component to become available.

Furthermore, any refrigerant leakage associated with the REC (2560) or the REC (2560) incoming (2506) or outgoing (2506) refrigerant lines may be quickly handled by fully closing both the FIV (2582) and the EIV (2583), thus isolating the REC (2560) from the HVAC refrigeration circulation loop. Since it is common for the REC (2560) to incur pinhole leaks, this ability to isolate the REC (2560) from the HVAC refrigeration loop allows this component to be easily replaced without the need for additional inside safety measures to be executed to isolate persons from refrigerant leakage.

Refrigerant Metering AEV Replacement Method (2600)

Figure 26:
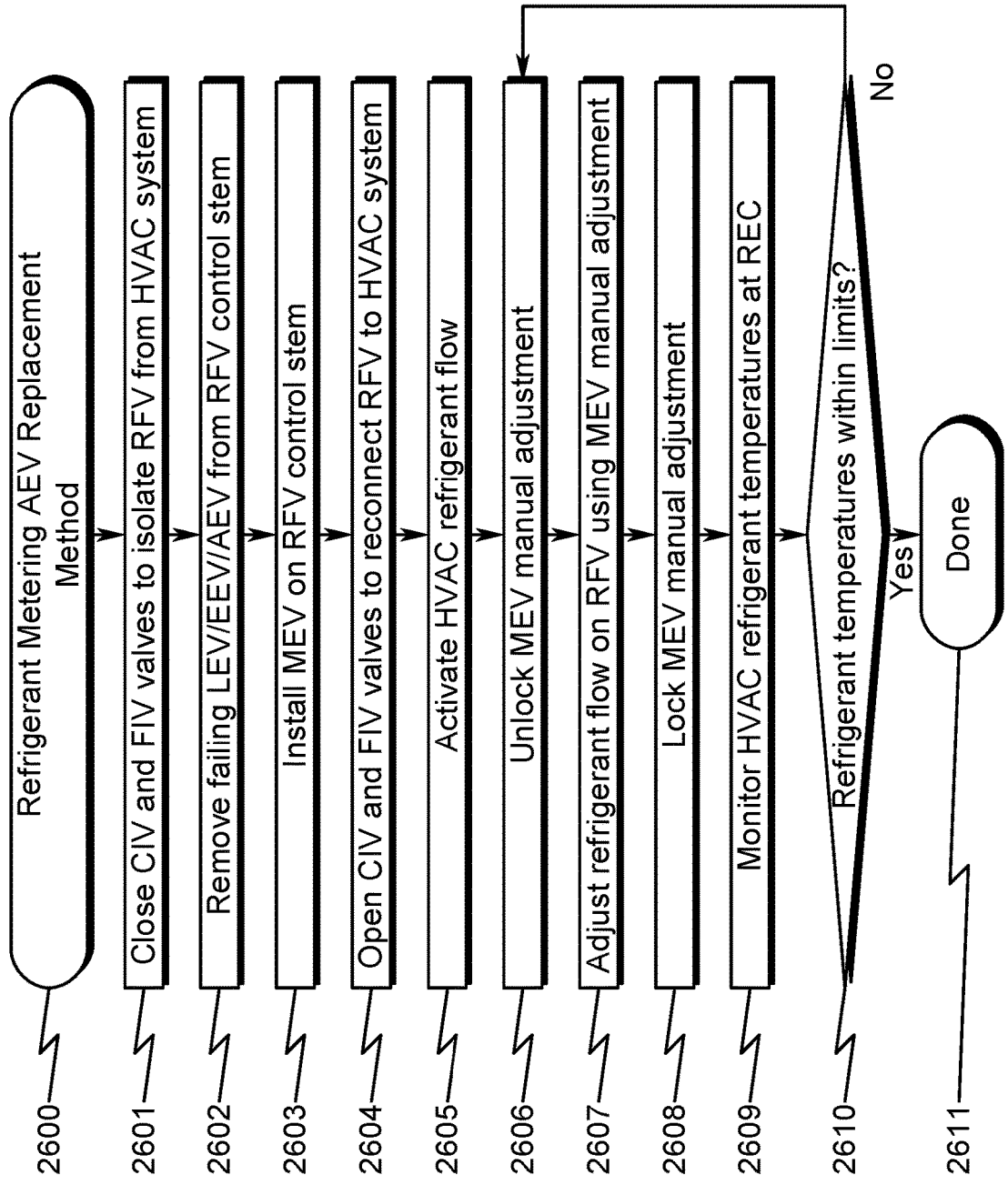
FIG. 26 illustrates a flowchart depicting a preferred exemplary embodiment of a present invention method implementing a refrigerant metering replacement method.

The present invention may implement a method in which a failing LEV/EEV/AEV is replaced in the field with a MEV as described herein in order to implement an immediate HVAC repair where replacement parts may be currently unavailable. Here we assume that the AEV control mechanism has failed but that the RFV is still operational, but there is no access to a suitable AEV replacement and the HVAC system must be made operational before an AEV replacement can be obtained. In this AEV replacement methodology, as generally depicted in FIG. 26 (2600), the present invention may be broadly generalized as a refrigerant metering replacement method comprising:

(1) Closing the CIV and FIV valves to isolate the RFV from the RCC and REC (2601);
(2) Removing the failing LEV/EEV/AEV from the RFV control stem (2602);
(3) Installing the MEV on RFV control stem (2603);
(4) Opening the CIV and FIV valves to connect the RFV to the RCC and REC (2604);
(5) Activating the HVAC refrigerant flow (2605);
(6) Unlocking the MEV manual adjustment (2606);

(7) Adjusting refrigerant flow on the RFV using the MEV manual adjustment (2607);
(8) Locking the MEV manual adjustment (2608);
(9) Monitoring the HVAC refrigerant temperatures at the REC (2609);
(10) Determining if the REC refrigerant temperatures are within limits, and if not, proceeding to step (6) (2610); and
(11) Terminating the refrigerant metering replacement method (2611).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Refrigerant Metering REC Repair Method (2700)

Figure 27:
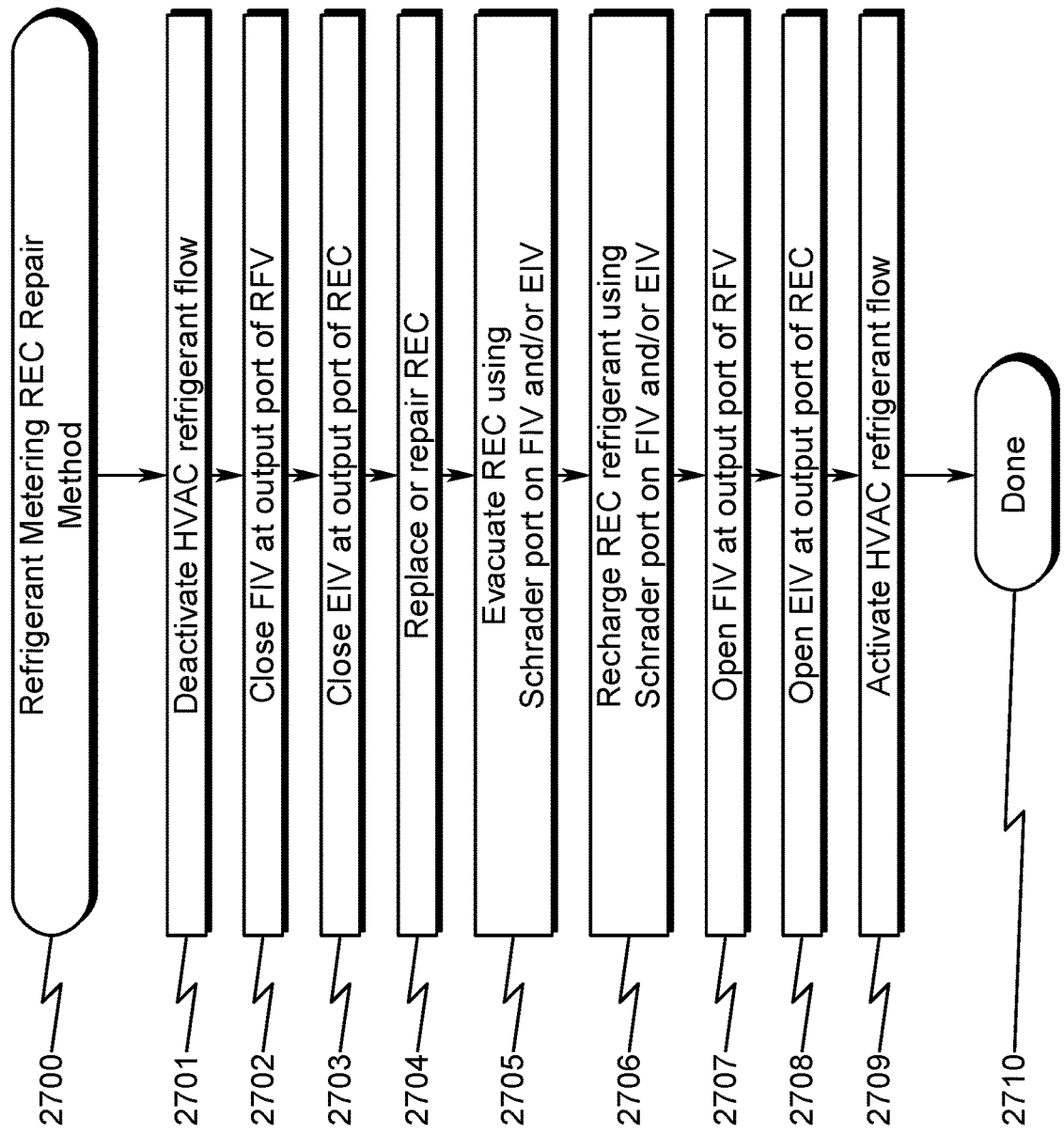
FIG. 27 illustrates a flowchart depicting a preferred exemplary embodiment of a present invention method implementing a refrigerant REC repair method.

The present invention may implement a method in which a failing REC is replaced or repaired in the field using a FIV/EIV valves as described herein in order to isolate the REC for repair. In this REC repair methodology, as generally depicted in FIG. 27 (2700), the present invention may be broadly generalized as a refrigerant metering REC repair method comprising:
(1) Deactivating refrigerant flow in a HVAC system (2701);
(2) Closing a flow isolation valve (FIV) at an output port of a refrigerant flow valve (RFV) in the HVAC system (2702);
(3) Closing an evaporator isolation valve (EIV) at an output port of a refrigerant evaporator coil (REC) in the HVAC system (2703);
(4) Replacing or repairing the REC (2704);
(5) Evacuating the REC using a Schrader port on the FIV and/or the EIV (2705);
(6) Recharging refrigerant in the REC using the Schrader port on the FIV and/or the EIV (2706);
(7) Opening the FIV at the output port of the RFV (2707);
(8) Opening the EIV at the output port of the REC (2708);
(9) Activating refrigerant flow in the HVAC system (2709); and
(10) Terminating the refrigerant metering REC repair method (2710).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Refrigerant Metering Maintenance Method (2800)

Figure 28:
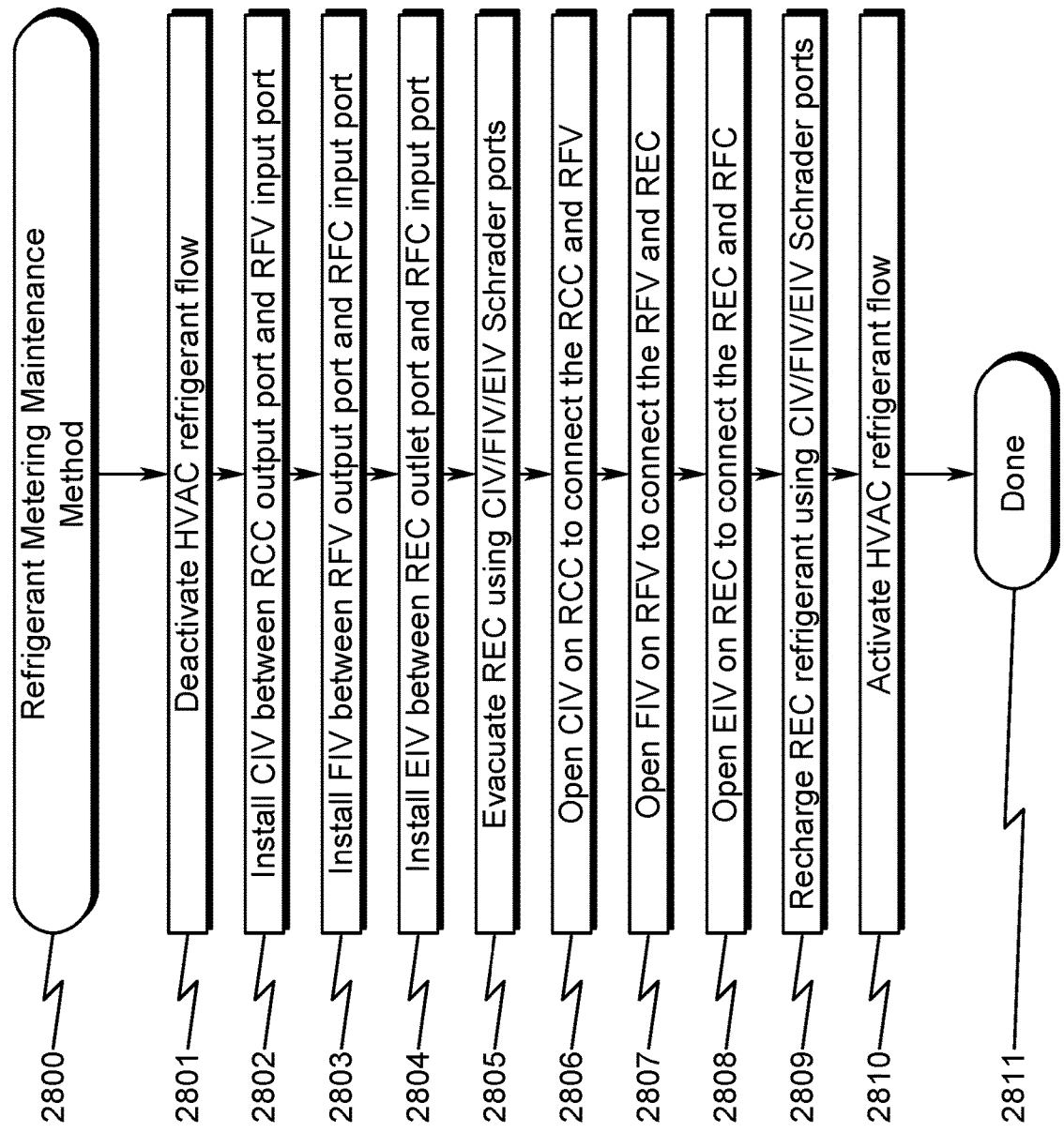
FIG. 28 illustrates a flowchart depicting a preferred exemplary embodiment of a present invention method implementing a refrigerant metering maintenance method.

The present invention may implement a method in which a HVAC is retrofitted for future maintenance by using a MEV to isolate a refrigerant evaporator coil (REC) and installing a condenser isolation valve (CIV) on the output of the refrigerant condenser coil (RCC), a flow isolation valve (FIV) on the output of the refrigerant flow valve (RFV), and an evaporator isolation valve (EIV) on the output of the refrigerant evaporator coil (REC) to allow isolation of the RFV and/or REC from the refrigerant condenser coil (RCC) and the refrigerant compressor (RFC). This procedure allows later replacement of a failing AEV by use of the CIV and the FIV to isolate the RFV, and thus allowing the failing AEV to be repaired or replaced. This procedure also allows later replacement of a leaking REC by use of the FIV and the EIV to isolate the REC, and thus allowing the failing REC to be repaired or replaced. In this maintenance methodology, as generally depicted in FIG. 28 (2800), the present invention may be broadly generalized as a refrigerant metering maintenance method comprising:
(1) Deactivating HVAC system refrigerant flow (2801);
(2) Installing the CIV between the RCC refrigerant outlet port and refrigerant flow valve (RFV) (2802);
(3) Installing the FIV between the RFV refrigerant outlet port and refrigerant evaporator coil (REC) input port (2803);
(4) Installing the EIV between the REC refrigerant outlet port and refrigerant compressor (RFC) (2804);
(5) Evacuating refrigerant from the REC using the Schrader ports on the CIV and/or the FIV and/or the EIV (2805);
(6) Opening the CIV on the RCC to connect the RCC to the RFV (2806);
(7) Opening the FIV on the RFV to connect the RFV to the REC (2807);
(8) Opening the EIV on the REC to connect the REC to the RFC (2808);
(9) Recharging the REC with refrigerant using the Schrader ports on the CIV and/or FIV and/or EIV (2809);
(10) Activating HVAC refrigerant flow (2810); and
(11) Terminating the refrigerant metering maintenance method (2811).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Typical System Application Context (2900)-(3200)

Figure 29:
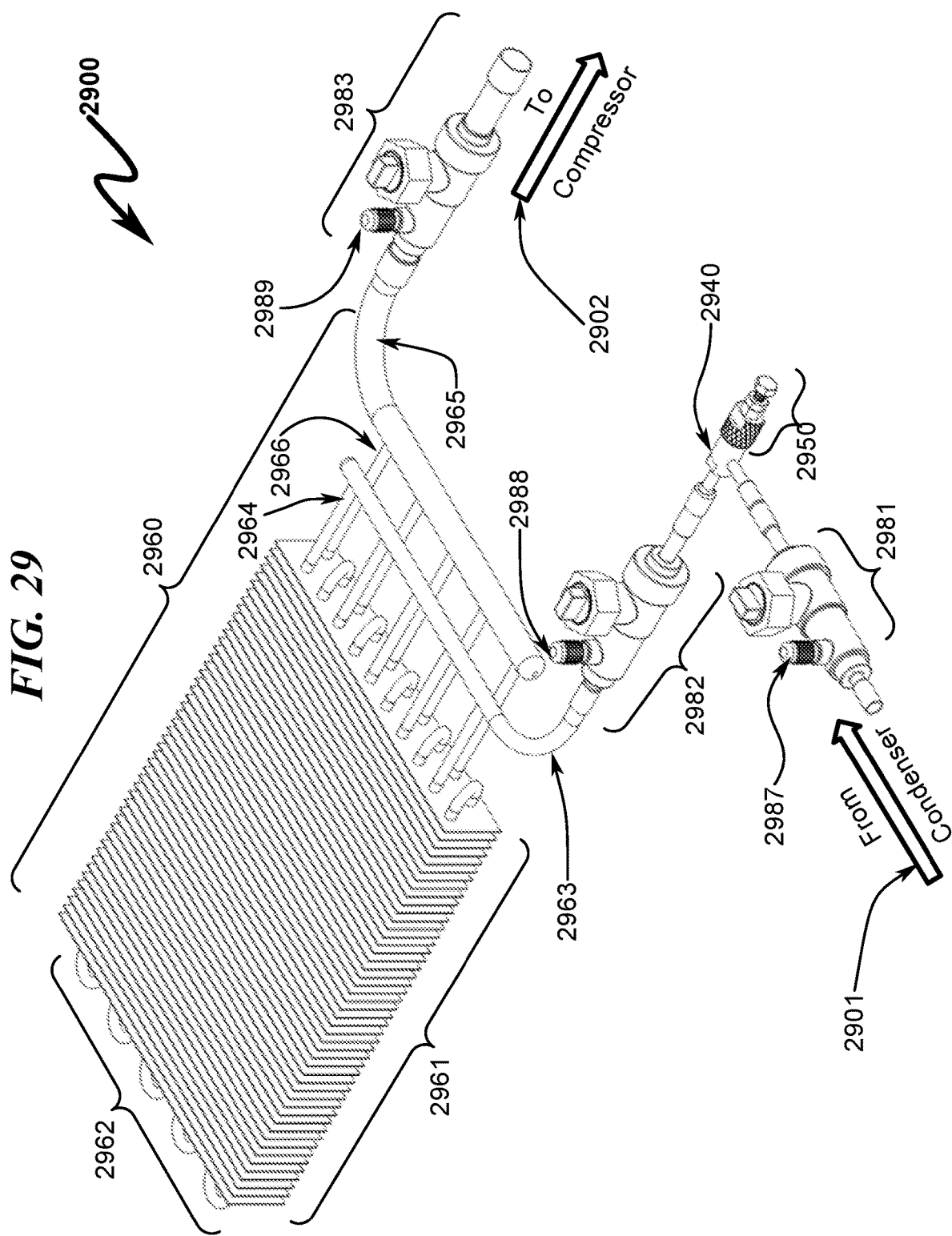
FIG. 29 illustrates a top right front perspective view of a preferred exemplary embodiment of a present invention system in which a HVAC evaporator coil is configured with a refrigerant flow valve (RFV) controlled by a present invention manual expansion valve (MEV) and a present invention evaporator isolation valve (EIV)
Figure 30:
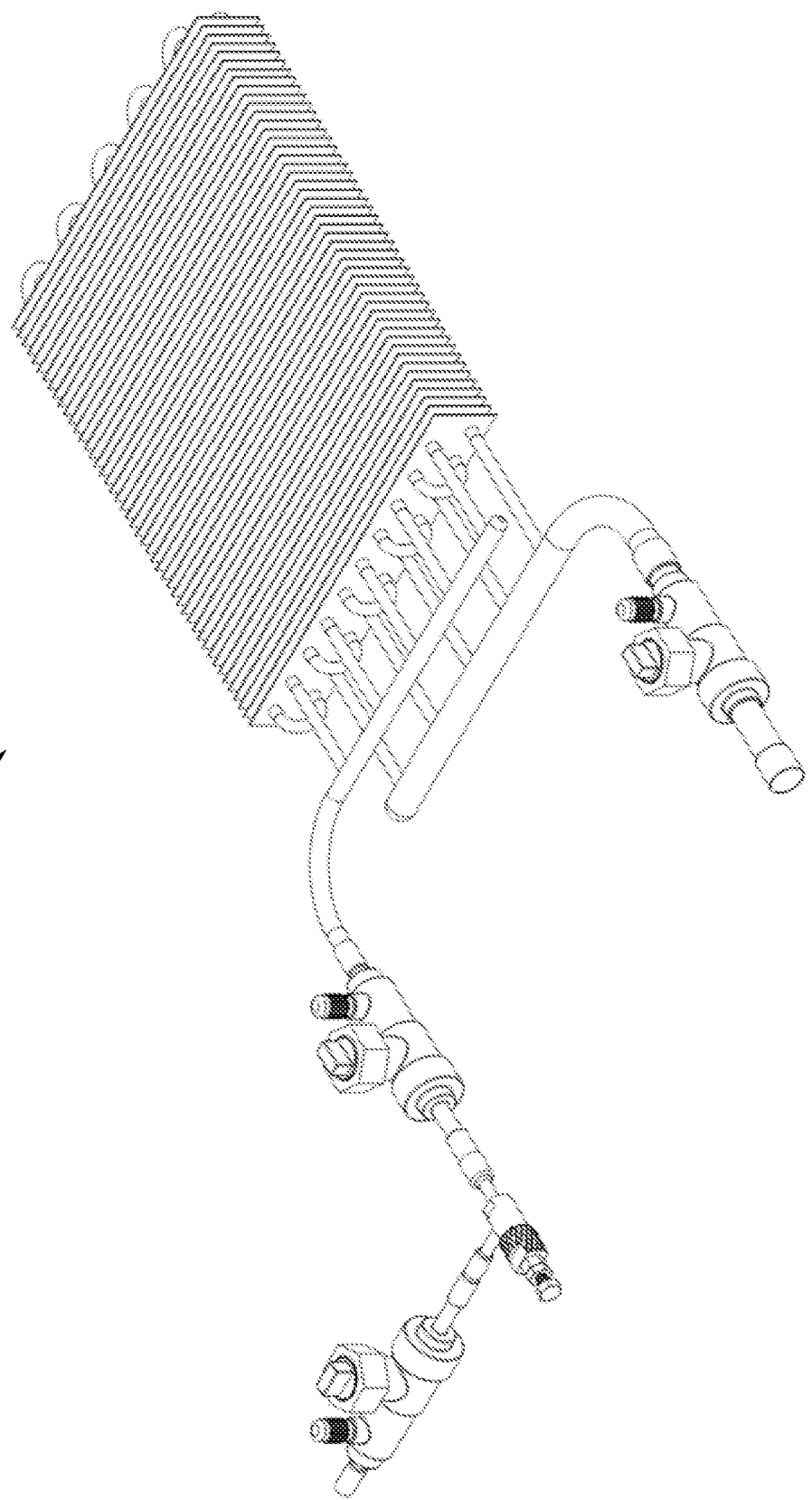
FIG. 30 illustrates a top right rear perspective view of a preferred exemplary embodiment of a present invention system in which a HVAC evaporator coil is configured with a refrigerant flow valve (RFV) controlled by a present invention manual expansion valve (MEV) and a present invention evaporator isolation valve (EIV)
Figure 31:
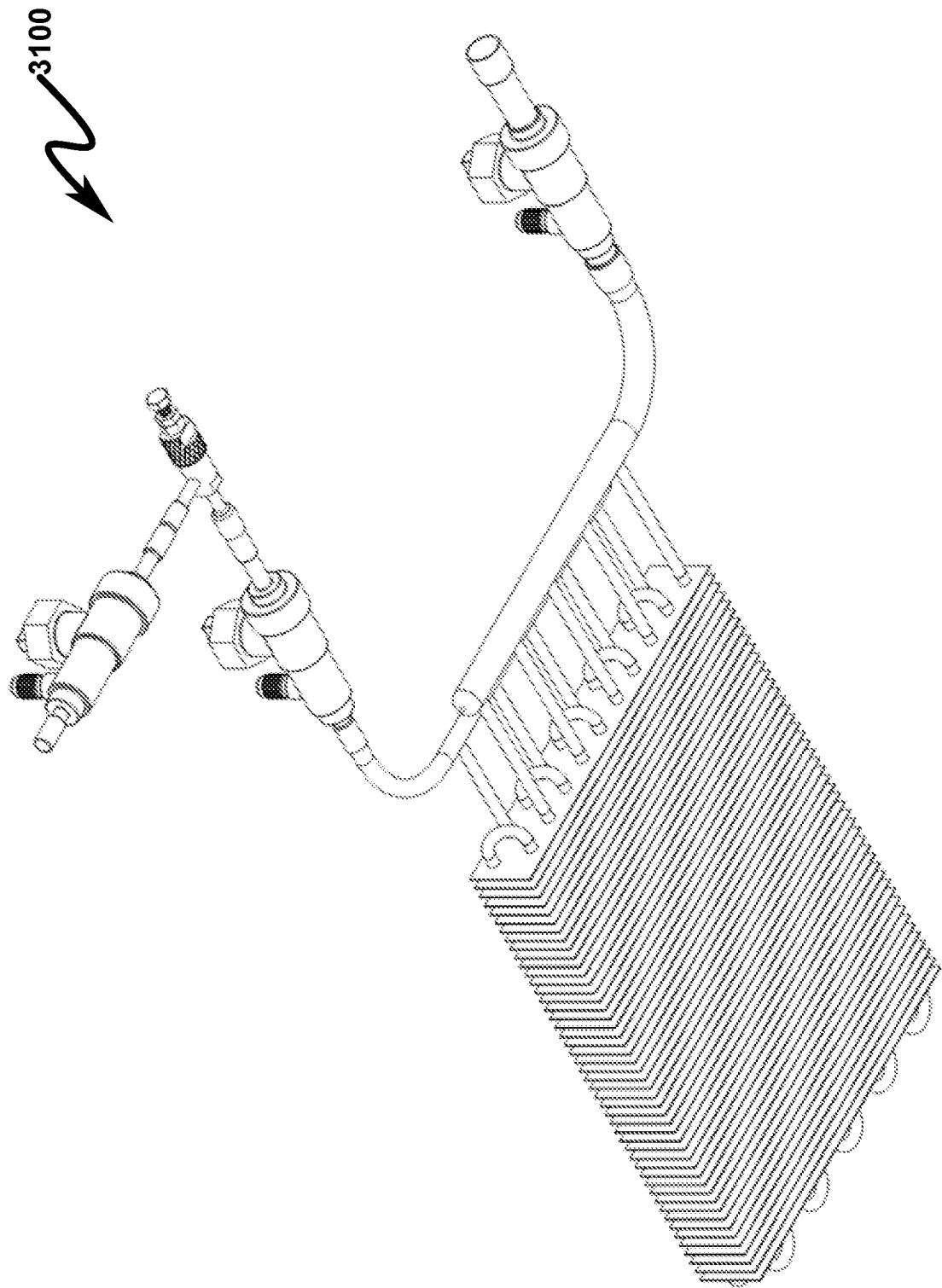
FIG. 31 illustrates a bottom right front perspective view of a preferred exemplary embodiment of a present invention system in which a HVAC evaporator coil is configured with a refrigerant flow valve (RFV) controlled by a present invention manual expansion valve (MEV) and a present invention evaporator isolation valve (EIV)
Figure 32:
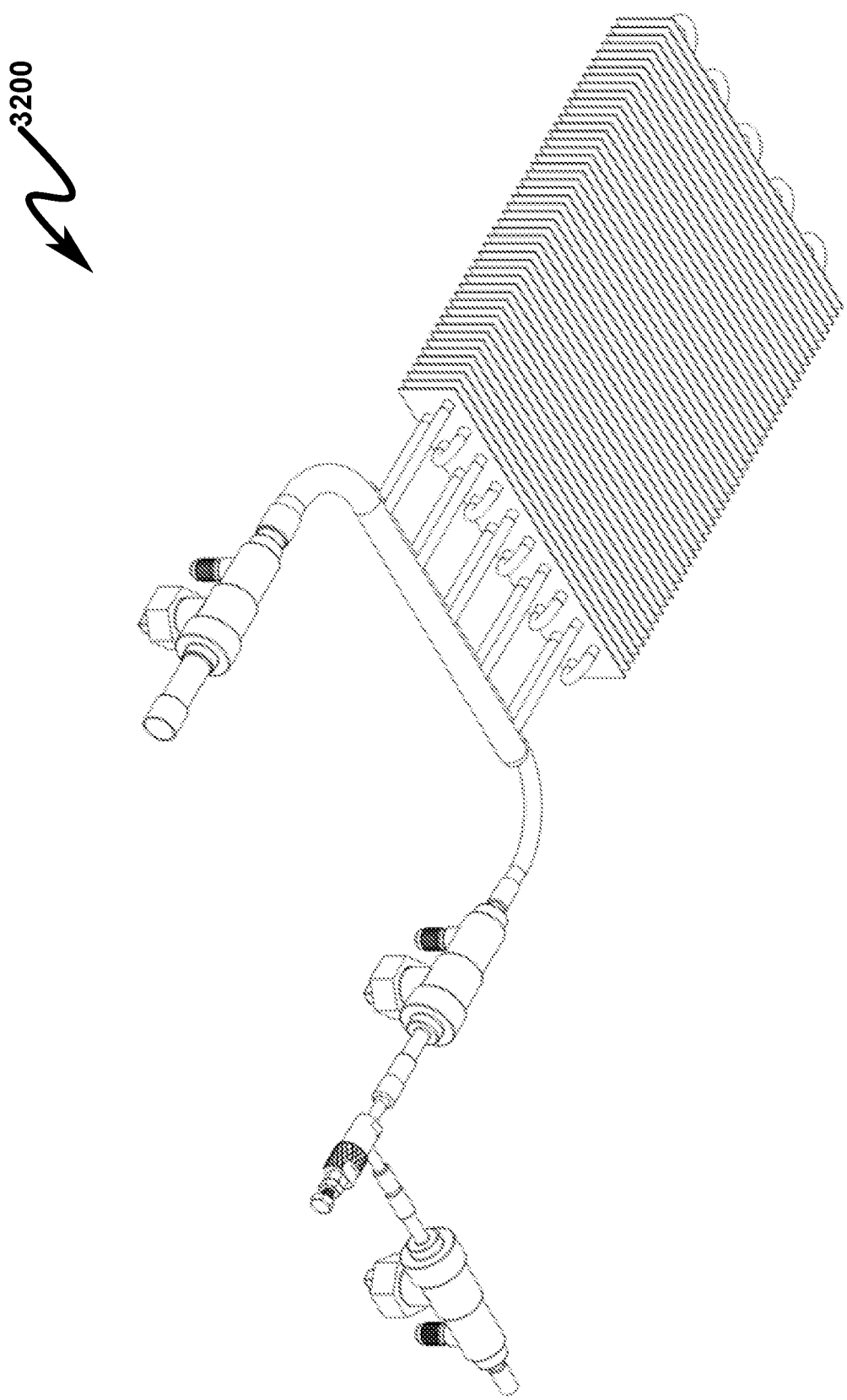
FIG. 32 illustrates a bottom right rear perspective view of a preferred exemplary embodiment of a present invention system in which a HVAC evaporator coil is configured with a refrigerant flow valve (RFV) controlled by a present invention manual expansion valve (MEV) and a present invention evaporator isolation valve (EIV)

A typical system application context for the present invention is generally depicted in FIG. 29 (2900)-FIG. 32 (3200) in which a refrigerant evaporator coil (REC) assembly (2960) is shown having coil fins (2961) through which refrigerant lines are coiled (2962), refrigerant input manifold (2963) supplying refrigerant input lines (2964), and refrigerant output manifold (2965) retrieving refrigerant from refrigerant output lines (2966). Refrigerant flow in this evaporator system starts from the refrigerant compressor (RFC) (not shown) (2901), flows through the evaporator system (2960), and is then transported via the refrigerant output manifold (2965) and then taken up by the refrigerant compressor (RFC) (not shown) (2902).

Refrigerant flow is controlled by a condenser isolation valve (CIV) (2981), a refrigerant flow valve (RFV) (2940) (controlled by a manual expansion valve (MEV) (2950) that manually controls the mechanical operation of the RFV (2940)), a flow isolation valve (FIV) (2982), and an evaporator isolation valve (EIV) (2983).

Replacement of a failing AEV by the MEV (2950) is accomplished by closing the CIV (2981) and FIV (2982) that allow isolation of the RFV (2940) from the HVAC system and permit replacement of the AEV by the MEV (2950) without loss of refrigerant in the HVAC system. Once the MEV (2950) is installed, the CIV (2981) and FIV (2982) can be opened and the HVAC system operated in a nominal mode until an AEV replacement can be obtained. The CIV (2981) and/or FIV (2982) may incorporate a Schrader valve (2987, 2988, 2989) to allow evacuation of the RCC (2960) and/or insertion of refrigerant into the refrigerant loop as needed.

In addition to the replacement of the AEV with the MEV (2950), the system incorporates a flow isolation valve (FIV) (2982) between the RFV (2940) and the REC (2960) and an evaporator isolation valve (EIV) (2983) between the refrigerant output manifold (2965) of the REC (2960) and the RFC (not shown) that allows the REC (2960) to be isolated from the RFC for maintenance and/or repair. The FIV (2982) and/or EIV (2983) may incorporate a Schrader valve (2987, 2988, 2989) to allow evacuation of the REC (2960) and/or insertion of refrigerant into the refrigerant loop as needed.

MEV Detail (3300)-(4800)

Figure 33:
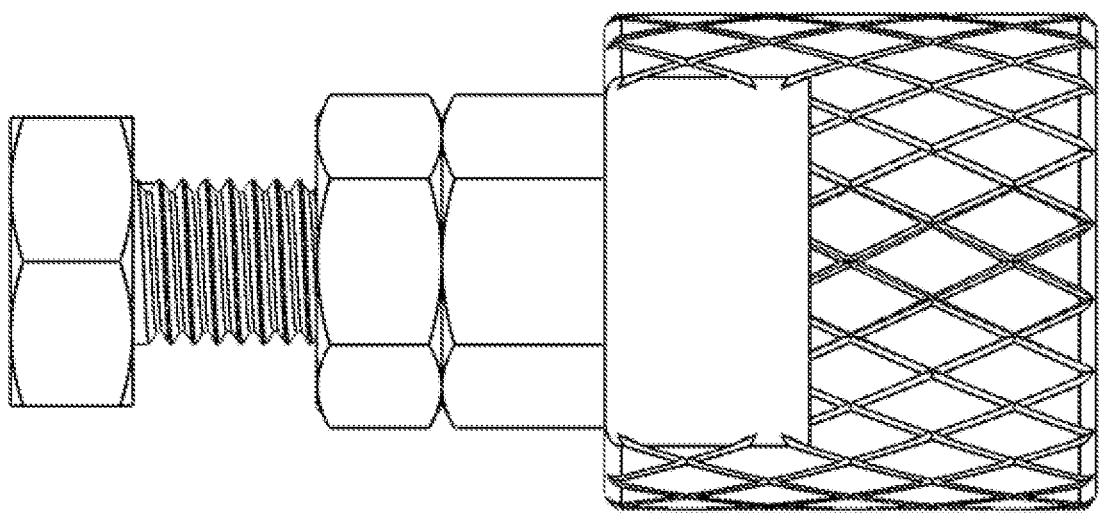
FIG. 33 illustrates a front view of a preferred exemplary embodiment of a present invention manual expansion valve (MEV)
Figure 35:
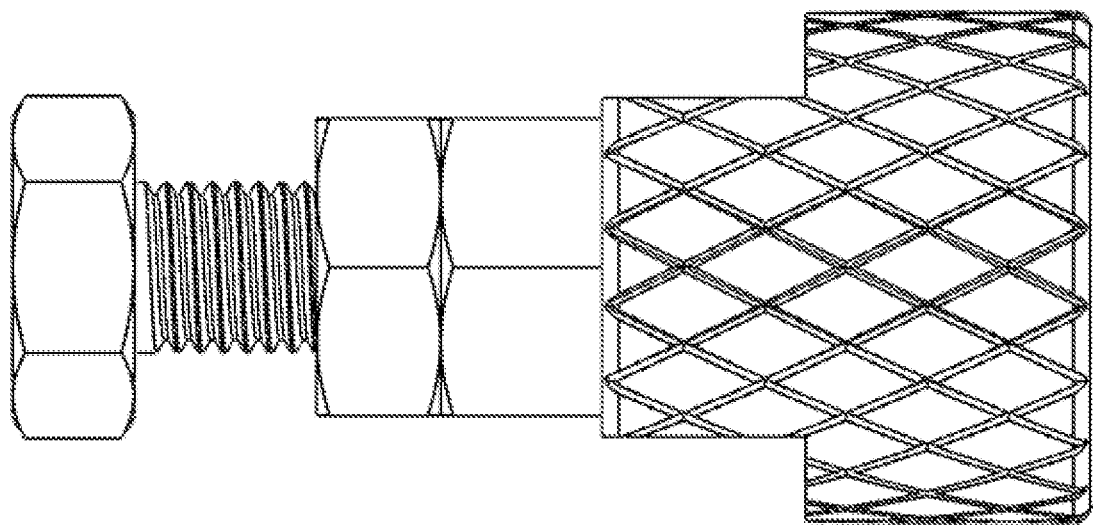
FIG. 35 illustrates a left side view of a preferred exemplary embodiment of a present invention manual expansion valve (MEV)
Figure 36:
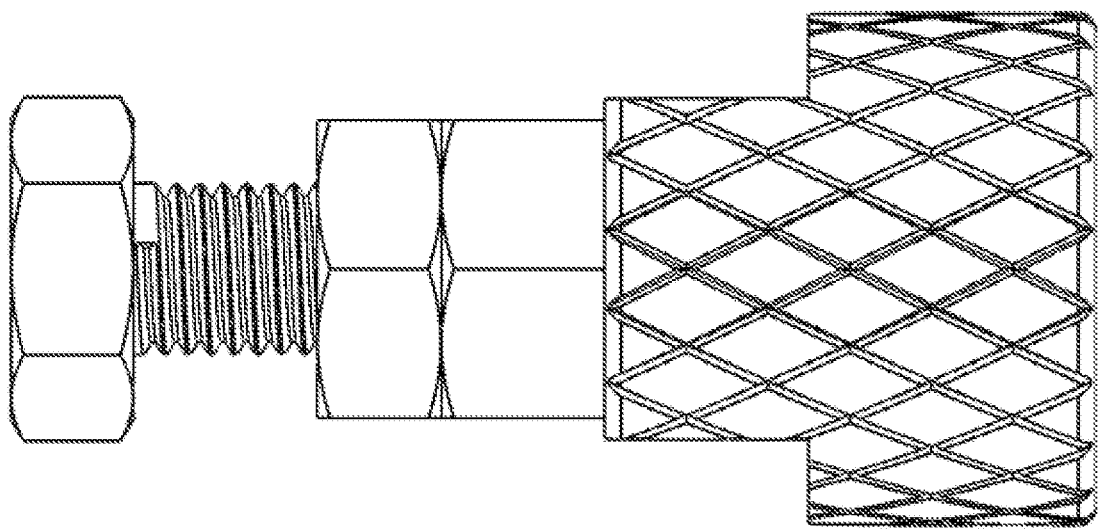
FIG. 36 illustrates a right side view of a preferred exemplary embodiment of a present invention manual expansion valve (MEV)
Figure 37:
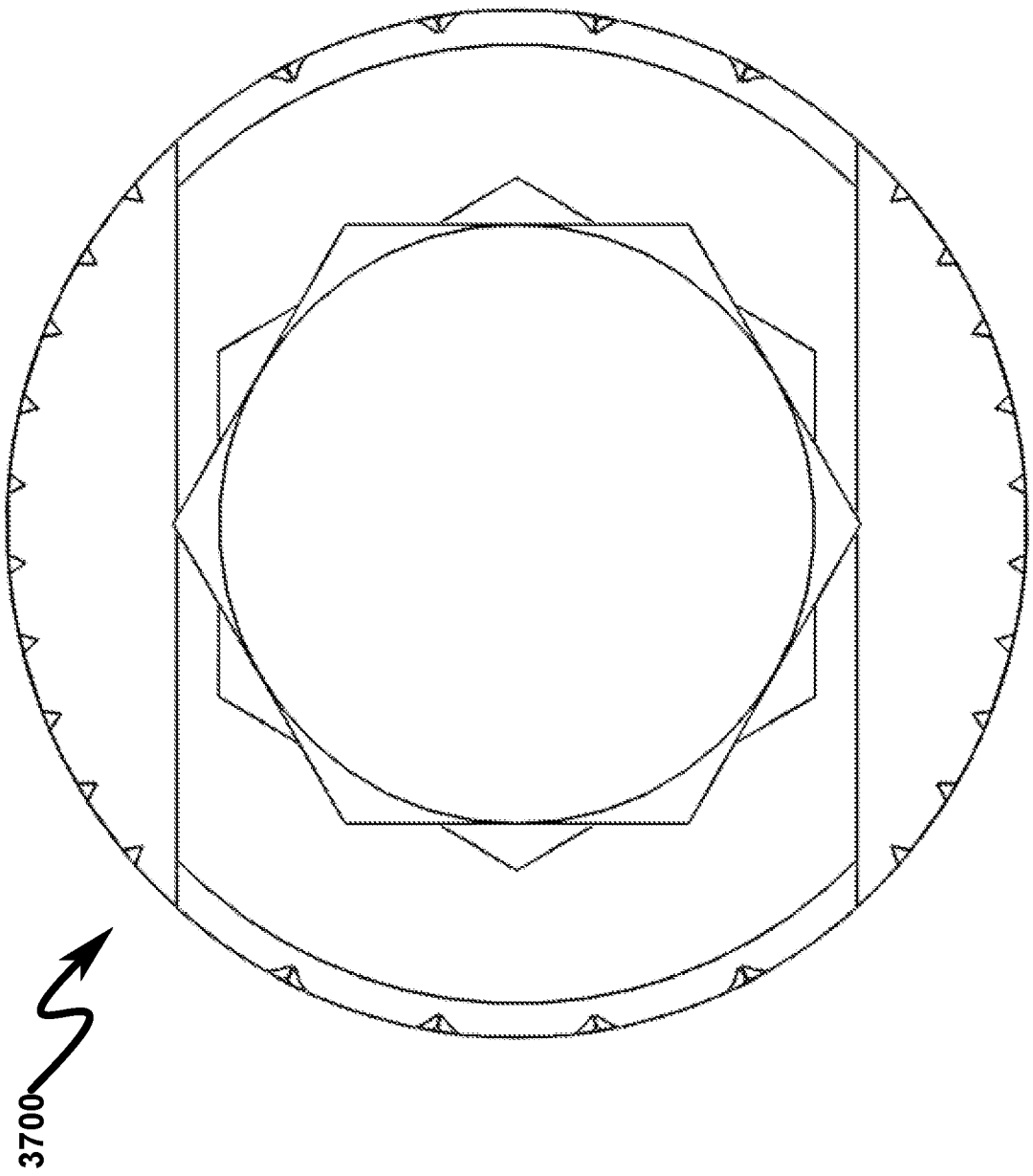
FIG. 37 illustrates a top view of a preferred exemplary embodiment of a present invention manual expansion valve (MEV)
Figure 38:
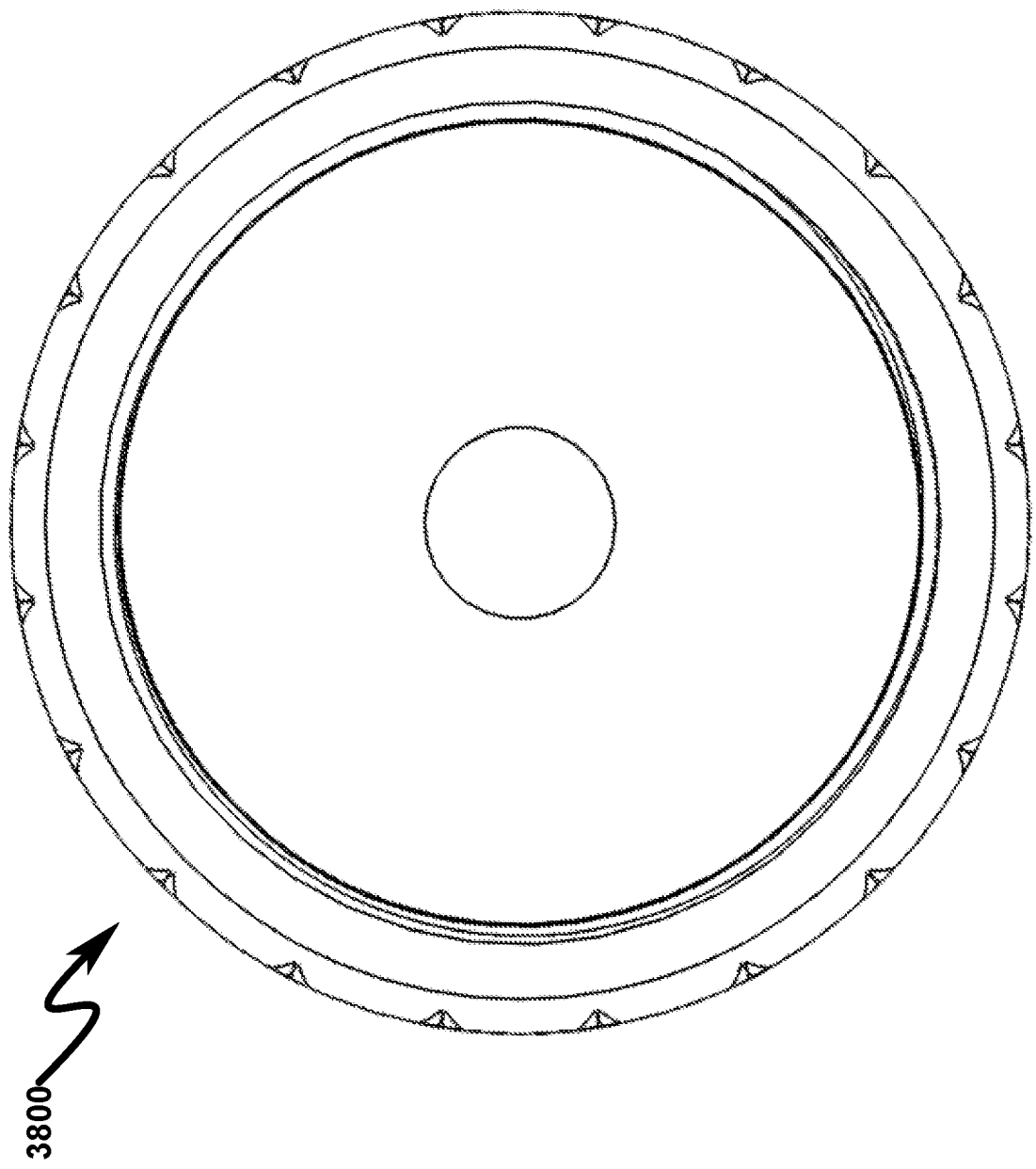
FIG. 38 illustrates a bottom view of a preferred exemplary embodiment of a present invention manual expansion valve (MEV)
Figure 39:
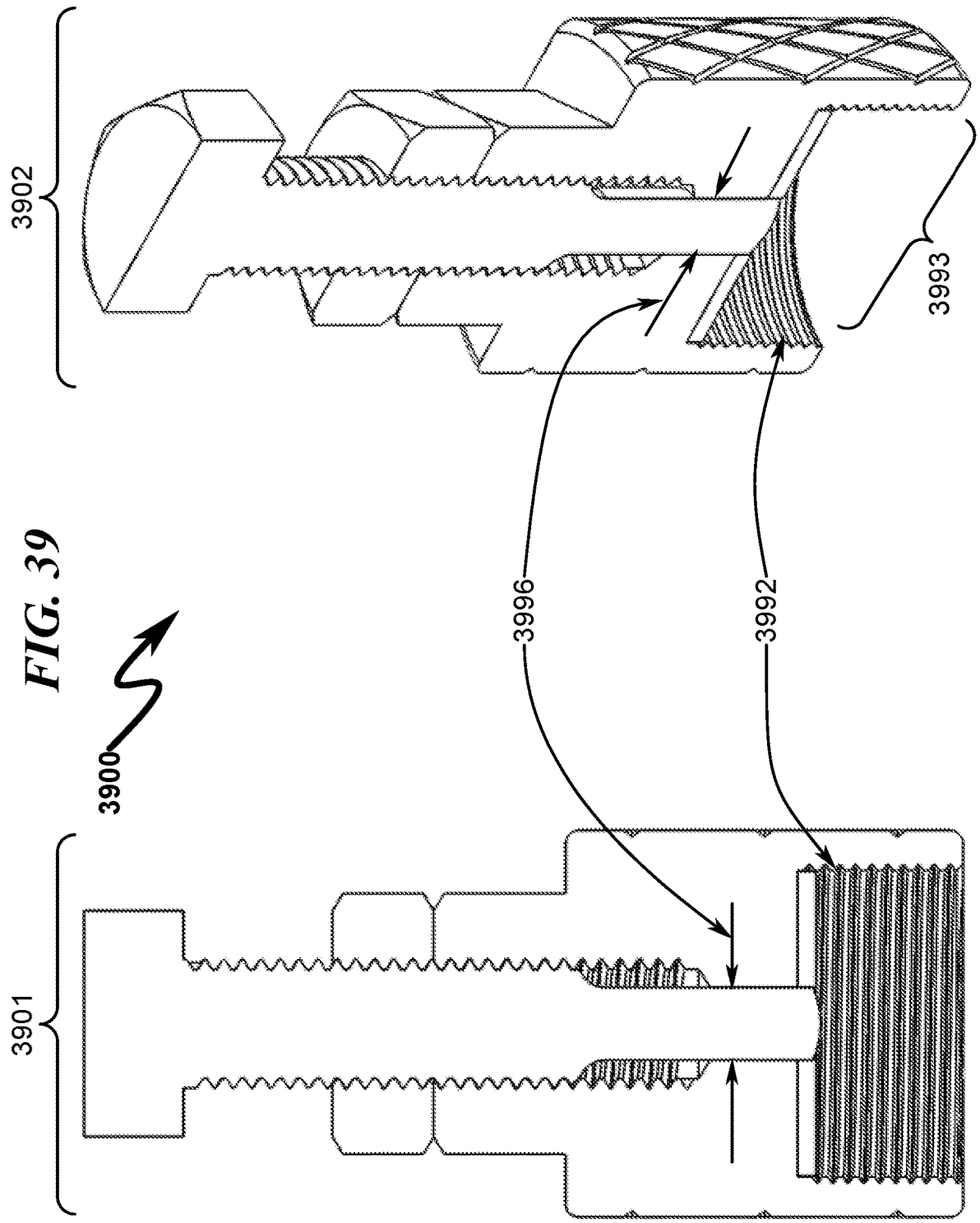
FIG. 39 illustrates a side section view and a side section perspective view of a preferred exemplary embodiment of a present invention manual expansion valve (MEV)
Figure 40:
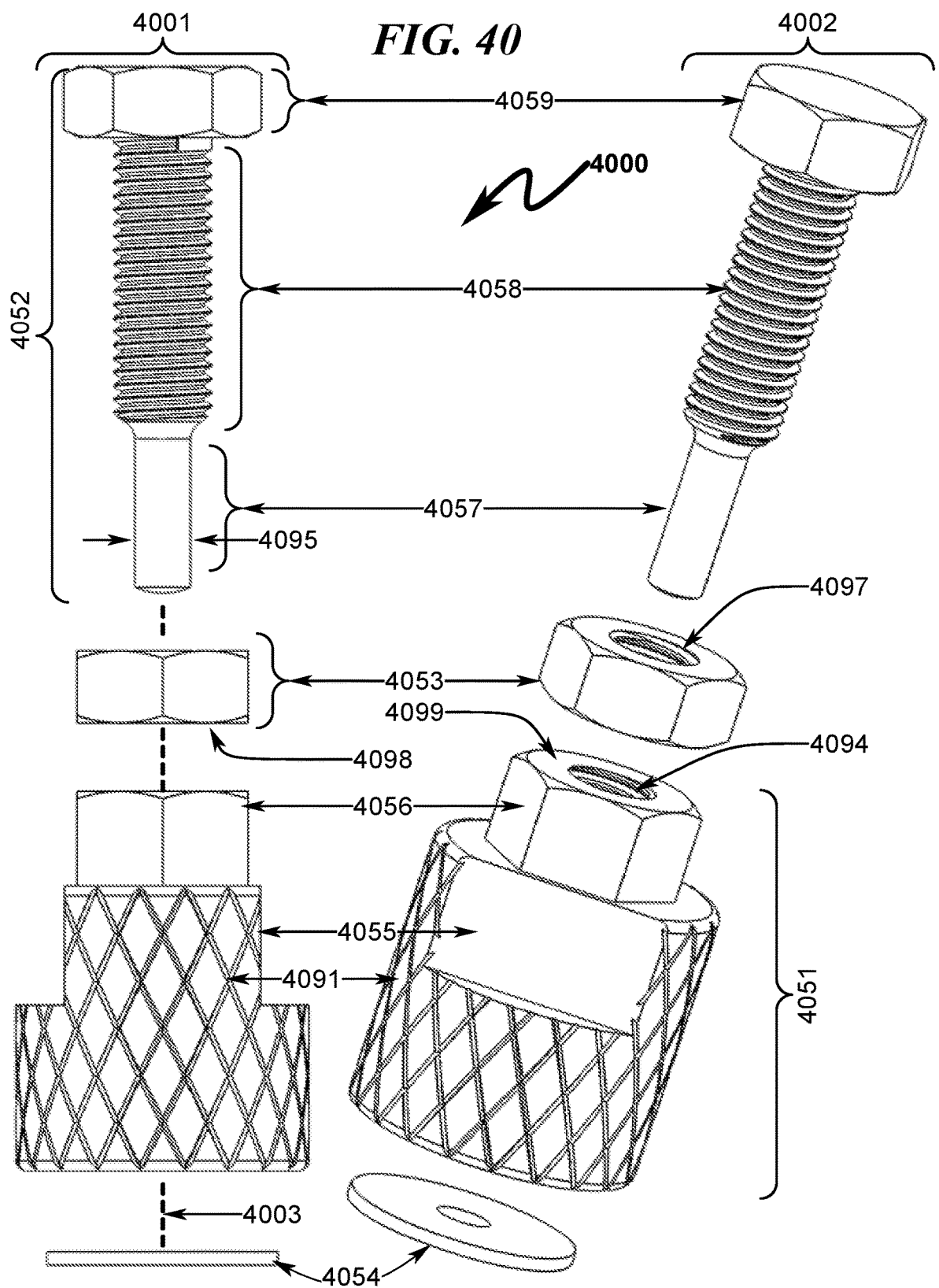
FIG. 40 illustrates a side and perspective assembly view of a preferred exemplary embodiment of a present invention manual expansion valve (MEV)
Figure 42:
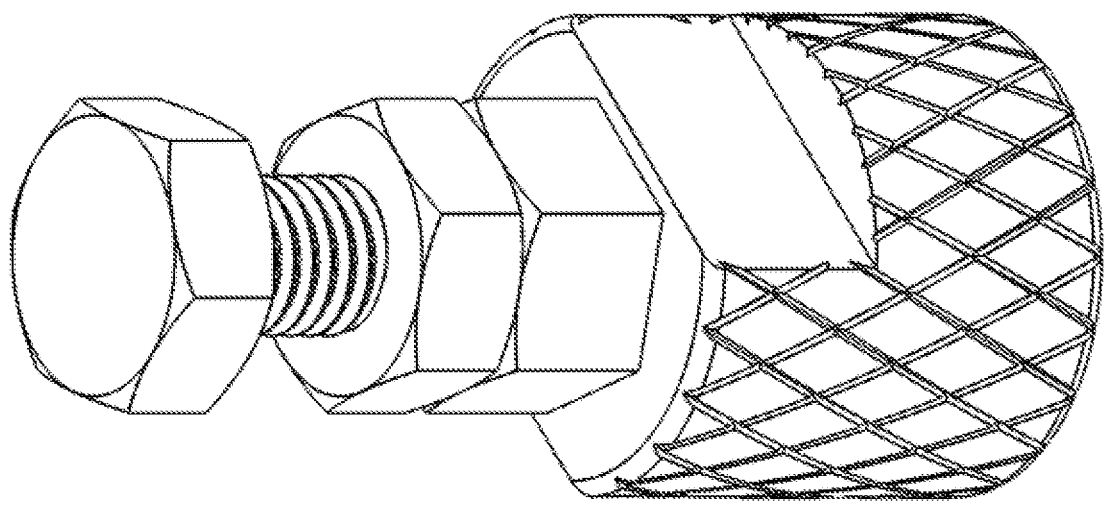
FIG. 42 illustrates a top right rear perspective view of a preferred exemplary embodiment of a present invention manual expansion valve (MEV)
Figure 43:
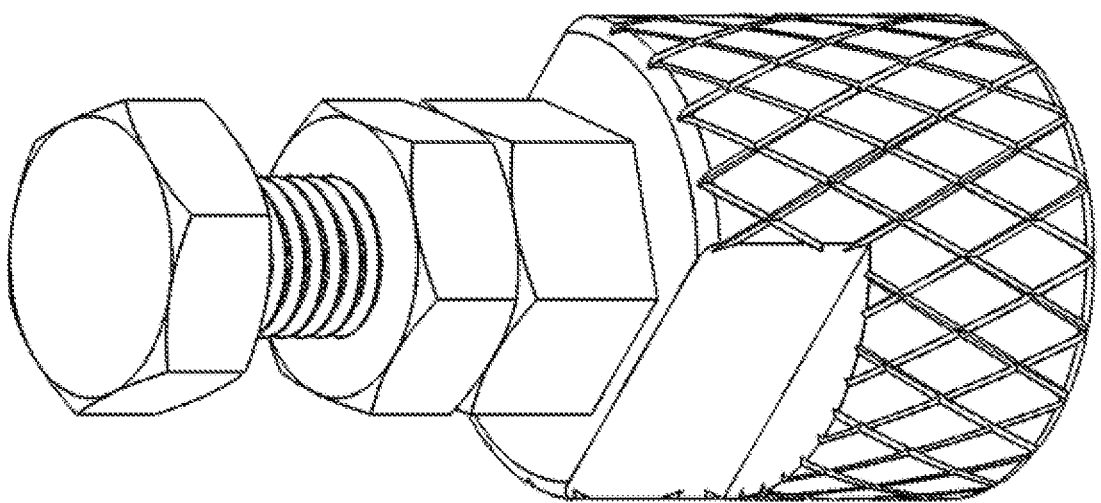
FIG. 43 illustrates a top left rear perspective view of a preferred exemplary embodiment of a present invention manual expansion valve (MEV)
Figure 46:
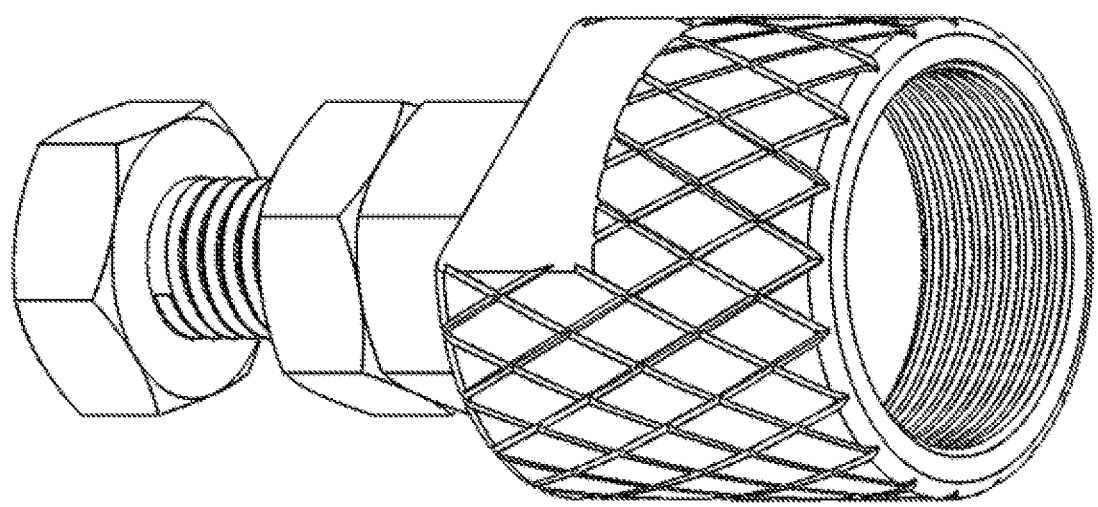
FIG. 46 illustrates a bottom right rear perspective view of a preferred exemplary embodiment of a present invention manual expansion valve (MEV)
Figure 47:
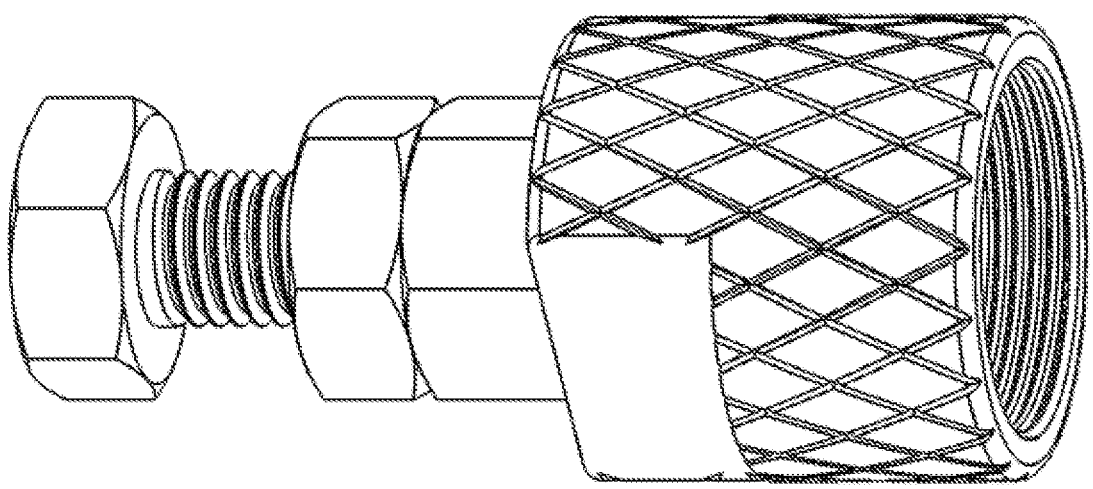
FIG. 47 illustrates a bottom left rear perspective view of a preferred exemplary embodiment of a present invention manual expansion valve (MEV)
Figure 48:
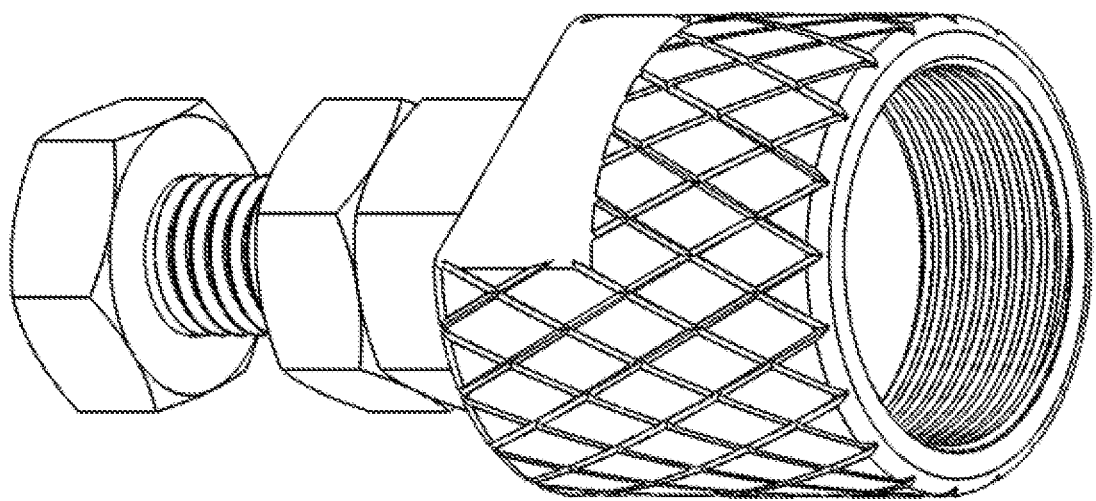
FIG. 48 illustrates a bottom left front perspective view of a preferred exemplary embodiment of a present invention manual expansion valve (MEV)
Figure 51:
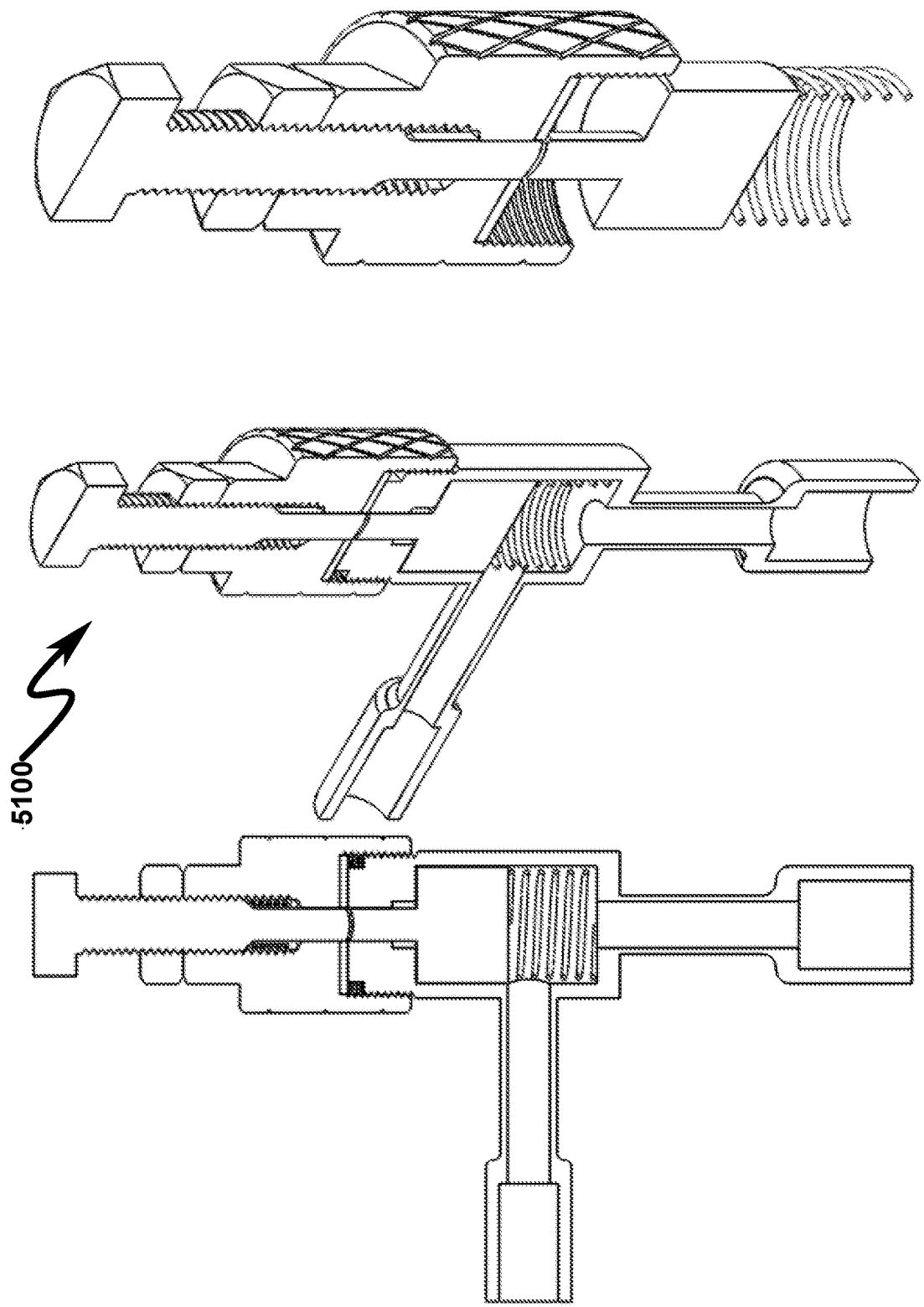
FIG. 51 illustrates front side section view, front side section perspective view, and front side section perspective view (hiding RFV housing) of a preferred exemplary embodiment of a present invention manual expansion valve (MEV) mated with a conventional refrigerant flow valve (RFV) with the MEV configured for unmetered refrigerant flow.

Details of the manual expansion valve (MEV) are generally depicted in FIG. 33 (3300)-FIG. 48 (4800). Referencing the FIG. 39 (3900) section views (3901, 3902) and the FIG. 40 (4000) perspective assembly views (4001, 4002), the MEV is typically composed of three (or optionally four) components: manual retention cap (MRC) (4051), manual control rod (MCR) (4052), manual locking fastener (MLF) (4053), and an optional cylindrical sealing gasket (CSG) (4054).

The manual retention cap (MRC) (4051) typically incorporates one or more outer surfaces conforming to a mechanical fastener profile, the mechanical fastener profile (MFP) typically selected from a group consisting of: wrench flat (4055); hex nut (4056); and knurling (4091) of the outer surface of the MRC as shown. These mechanical fastener profiles are provided to allow the MRC (4051) to engage female threads (3992) within its control interior cavity (CIT) (3993) with male threads (1549, 1649) corresponding to a RFV threaded valve control port (VCP). The MRC female threads (3992) that conform to male threads of VCP are presented within a control interior cavity (CIT) (3993) of the MRC and are typically formed having a fine threads-per-inch (TPI) range of 18 TPI to 40 TPI or (or an equivalent metric range of 0.05 mm thread pitch to 0.15 mm thread pitch). Many preferred embodiments will utilize a 34 TPI thread profile that conforms to commonly available RFV threaded valve control ports (VCP).

The MRC (4051) comprises a threaded control port (TCP) (4094) along a longitudinal axis of the CIT. The TCP (4094) is configured to accept a manual control rod (MCR) (4052) having threads that conform to that of the TCP (4094). The MCR (4052) comprises a cylindrical control rod (CCR) (4057), a threaded adjustment shaft (TAS) (4058), and an adjustment control head (ACH) (4059). The CCR (4057) comprises a cylinder having a control rod diameter (CRD) (4095) conforming to a control rod port (CRP) (3996) within the body of the MRC (4051). As seen from the figures, the CCR (4057), the TAS (4058), and the ACH (4059) are mechanically connected in a linear combination along a common longitudinal radial axis (LRA) (4003). Adjustment of the MCR (4052) serves to move the CCR (4057) along the LRA (4003) and thus move the CCR (4057) up and down the body of the MRC (4051). Once properly positioned along the LRA (4003), the MCR (4052) may be locked into place via use of a manual locking fastener (MLF) (4053) that comprises a female fastening member (FFM) having a central threaded interior (CTI) (4097). The TAS (4058) comprises threads that conform to the CTI (4097) that allow the bottom face (4098) of the MLF (4053) to form a jam fit to the mechanical fastener profile (MFP) surface (4099) of the MRC (4051). The MEV may contain an optional sealing gasket (4054) that serves to seal the inner surface of the MRC (4051) to the top surface of the RFV threaded valve control port (VCP).

The threaded adjustment shaft (TAS) (4058) may be constructed with a wide range of thread profiles, but many preferred invention embodiments utilize a fine threads-per-inch (TPI) range of 18 TPI to 40 TPI or (or an equivalent metric range of 0.05 mm thread pitch to 0.15 mm thread pitch). Many preferred embodiments will utilize a 28 TPI thread profile.

MEV Operation with RFV (4900)-(5600)

Figure 56:
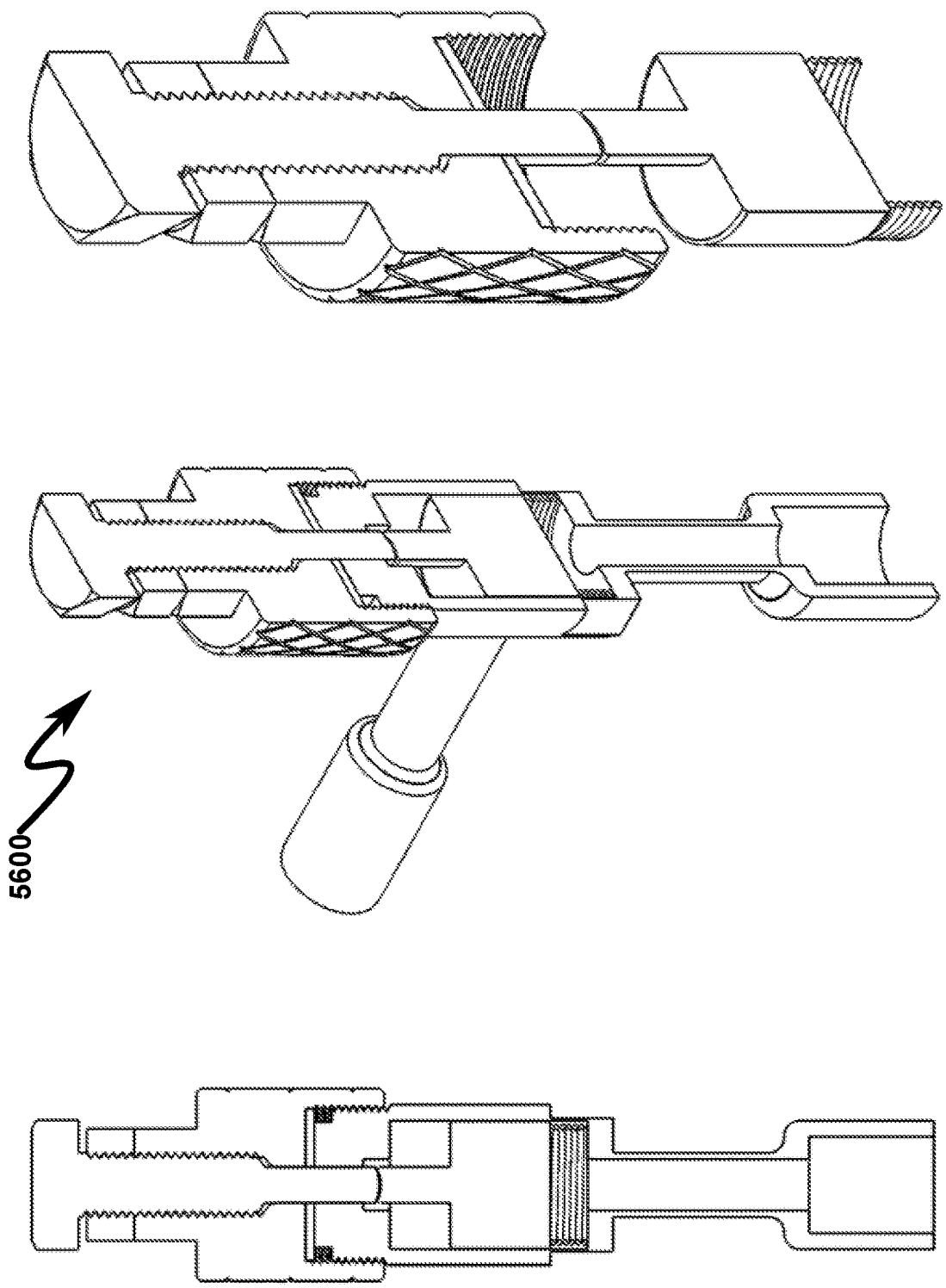
FIG. 56 illustrates right side section view, right side section perspective view, and right side section perspective view (hiding RFV housing) of a preferred exemplary embodiment of a present invention manual expansion valve (MEV) mated with a conventional refrigerant flow valve (RFV) with the MEV configured for inhibited (0% metered) refrigerant flow.

The operation of the MEV with respect to a typical RFV is generally depicted in FIG. 49 (4900)-FIG. 56 (5600). Here it can be seen that the MCR is configured to allow adjustment of the VMP through pressure applied to the VCR by the CCR to overcome pressure applied to the VMP by the VSC. Additionally, the adjustment of the VMP is configured to permit refrigerant flow from the VIP to the VOP to be adjusted from unmetered refrigerant flow through the RFV to zero refrigerant flow through the RFV.

FIG. 49 (4900)-FIG. 52 (5200) depict a MEV coupled with a RFV in which the MEV has been adjusted for unmetered (full) refrigerant flow from the valve input port (VIP) to the valve output port (VOP). As can be seen from the figures, when the MEV MCR adjustment control head (ACH) is turned to the fully open position the cylindrical control rod (CCR) is retracted by virtue of the threaded adjustment shaft (TAS). Spring pressure within the RFV then retracts the valve metering piston (VMP) and allows refrigerant to flow unobstructed from the VIP to the VOP.

Figure 53:
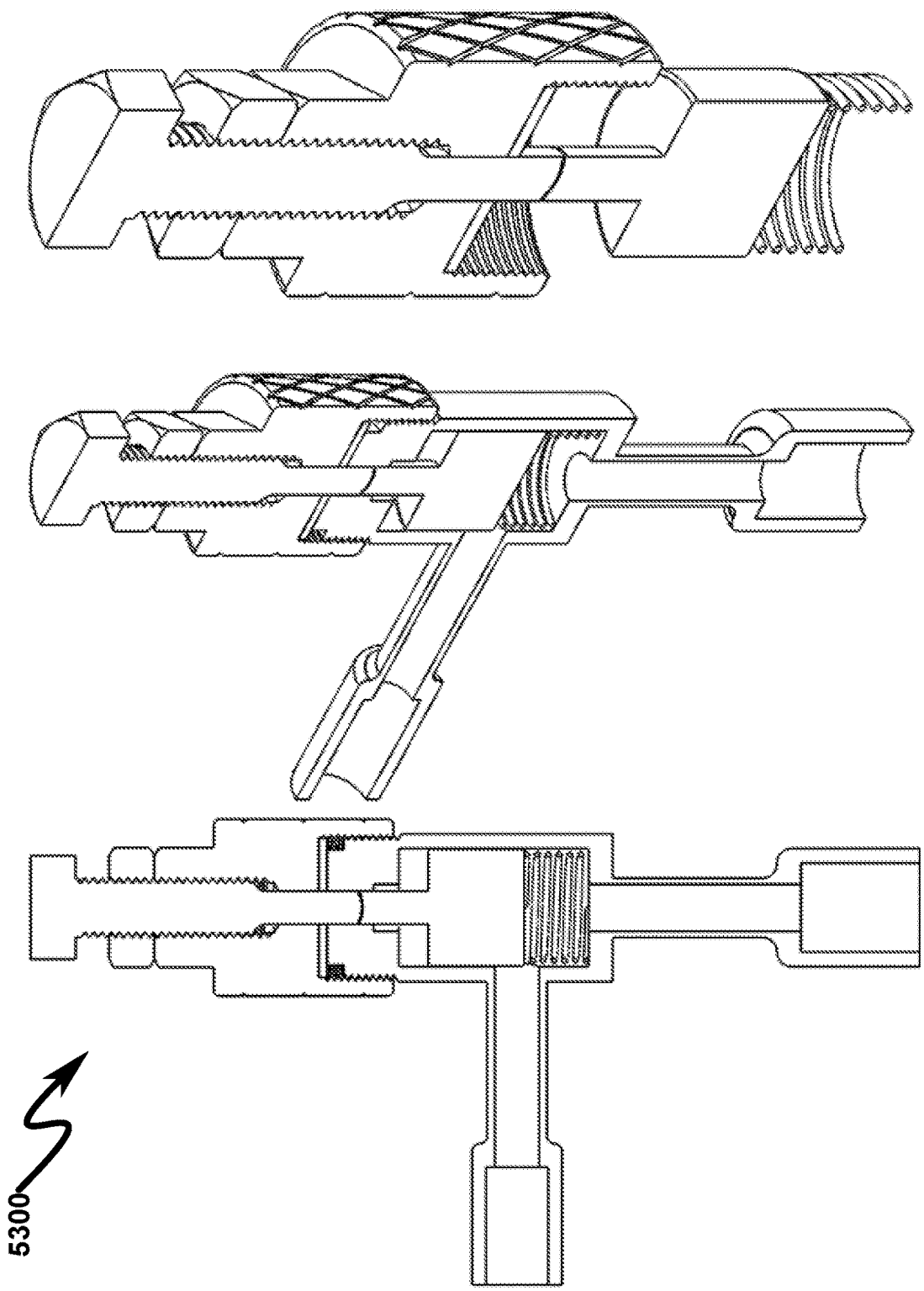
FIG. 53 illustrates front side section view, front side section perspective view, and front side section perspective view (hiding RFV housing) of a preferred exemplary embodiment of a present invention manual expansion valve (MEV) mated with a conventional refrigerant flow valve (RFV) with the MEV configured for 50% metered refrigerant flow.

FIG. 53 (5300)-FIG. 54 (5400) depict a MEV coupled with a RFV in which the MEV has been adjusted for approximately 50% (half) metered refrigerant flow from the valve input port (VIP) to the valve output port (VOP). As can be seen from the figures, when the MEV MCR adjustment control head (ACH) is turned to the half open position the cylindrical control rod (CCR) is mid-point positioned by virtue of the threaded adjustment shaft (TAS). Spring pressure within the RFV then retains the valve metering piston (VMP) and allows refrigerant to flow at the selected metering rate from the VIP to the VOP.

Figure 55:
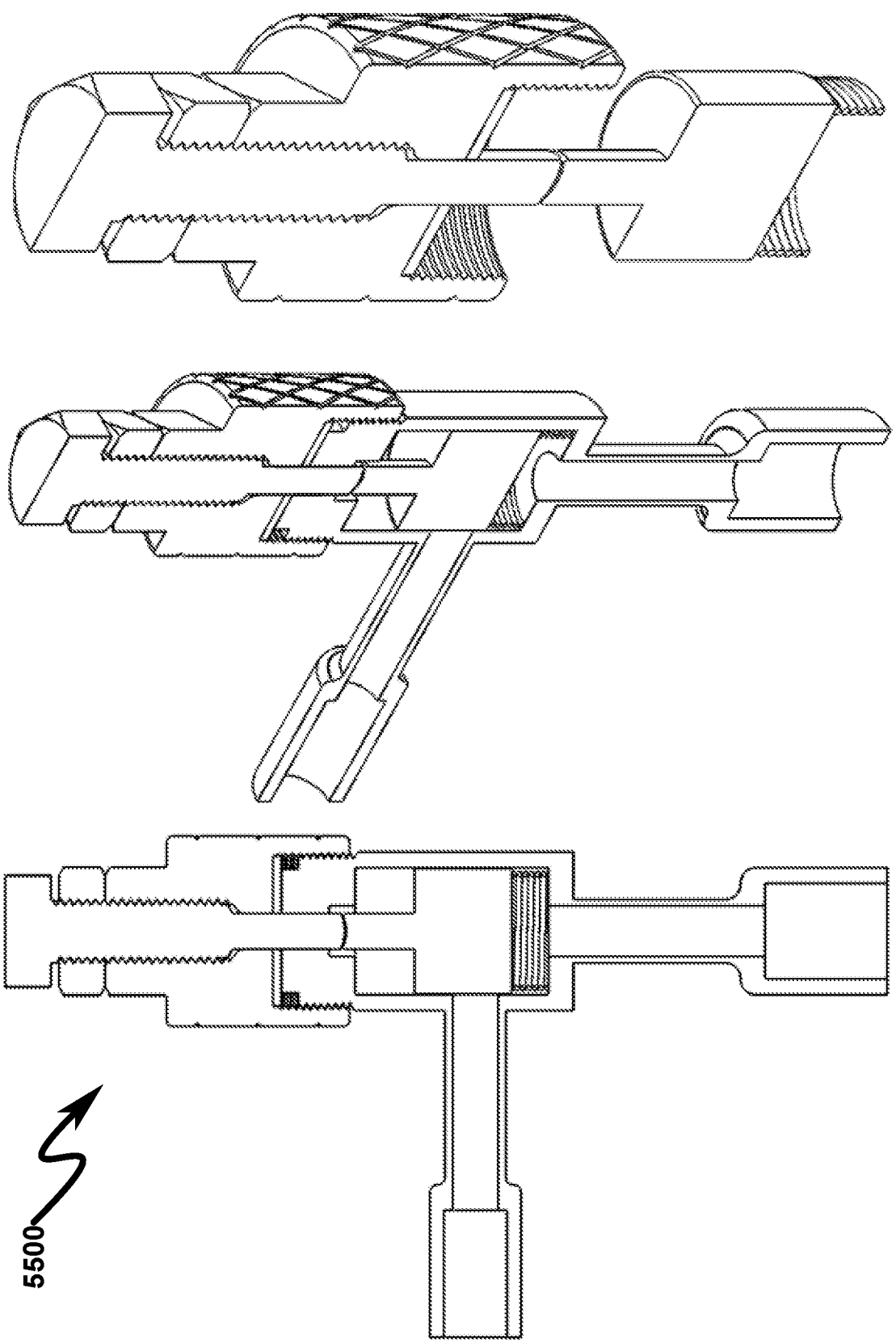
FIG. 55 illustrates front side section view, front side section perspective view, and front side section perspective view (hiding RFV housing) of a preferred exemplary embodiment of a present invention manual expansion valve (MEV) mated with a conventional refrigerant flow valve (RFV) with the MEV configured for inhibited (0% metered) refrigerant flow.

FIG. 55 (5500)-FIG. 56 (5600) depict a MEV coupled with a RFV in which the MEV has been adjusted for zero (inhibited) metered refrigerant flow from the valve input port (VIP) to the valve output port (VOP). As can be seen from the figures, when the MEV MCR adjustment control head (ACH) is turned to the fully closed position the cylindrical control rod (CCR) is bottomed-out by virtue of the threaded adjustment shaft (TAS). This in conjunction with spring pressure within the RFV then closes the valve metering piston (VMP) and inhibits refrigerant flow from the VIP to the VOP.

The ability of the MEV to both meter refrigerant flow through the RFV as well as completely cutoff refrigerant flow through the RFV is an important distinction between the present invention and the prior art. Generally speaking, the LEV/EEV/AEV controls on the market lack any methodology of completely isolating the RCC from the REC if power is not present in the HVAC system. For this reason it is important to be able to perform this refrigerant isolation to allow maintenance, repair, and/or replacement of the REC. By using the MEV in this context, refrigerant flow can be manually stopped from the RCC to the REC to perform these maintenance, repair, and/or replacement operations on the HVAC system.

EIV Detail (5700)-(6400)

Figure 64:
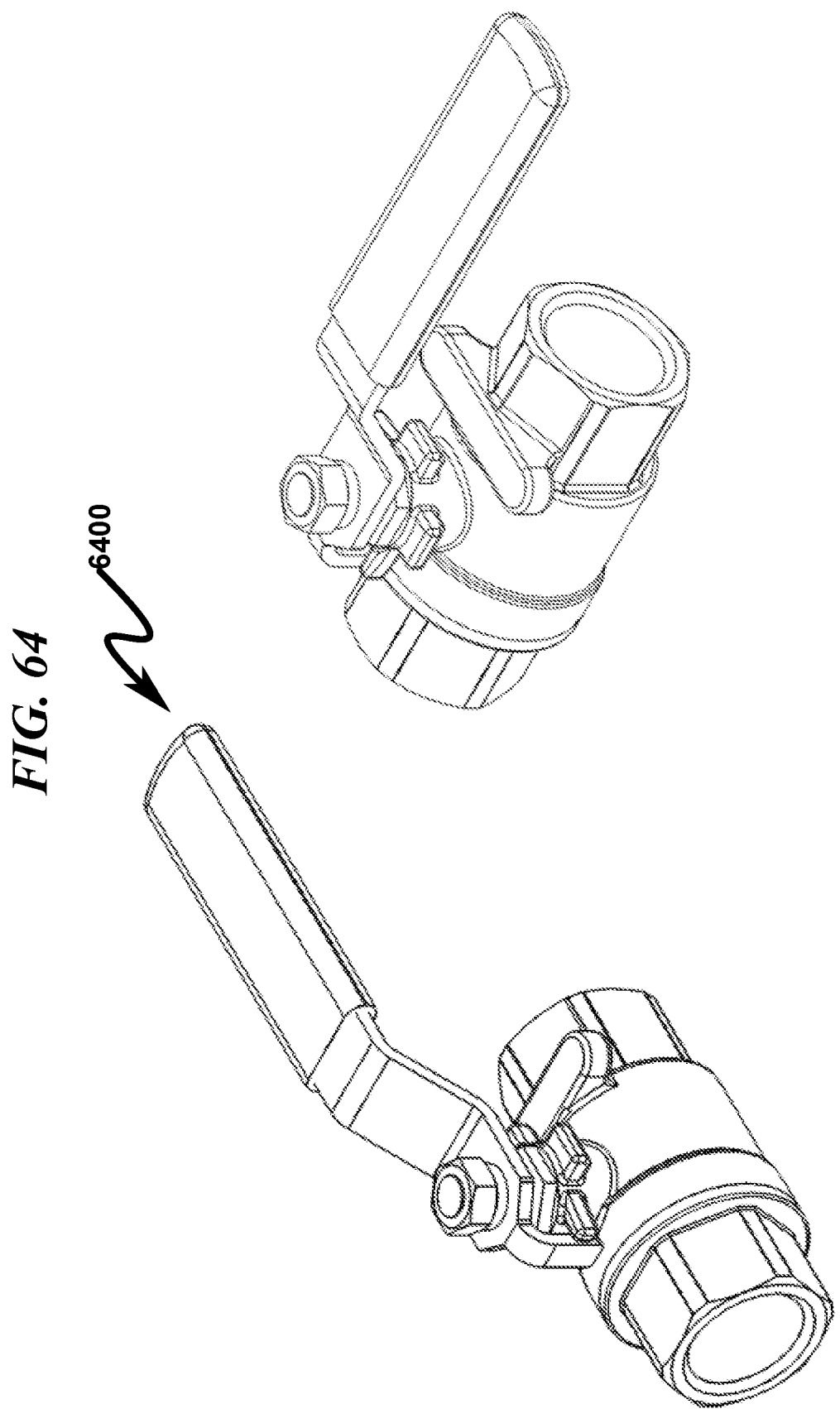
FIG. 64 illustrates top left front and top right front perspective views of an alternate preferred exemplary embodiment of a present invention evaporator isolation valve (EIV).

The present invention anticipates a wide variety of evaporator isolation valves that may be used in various invention application contexts. An example of a typical EIV embodiment is generally depicted in FIG. 57 (5700)-FIG. 60 (6000) with an alternate embodiment employing NPT fittings depicted in FIG. 61 (6100)-FIG. 64 (6400).

Figure 57:
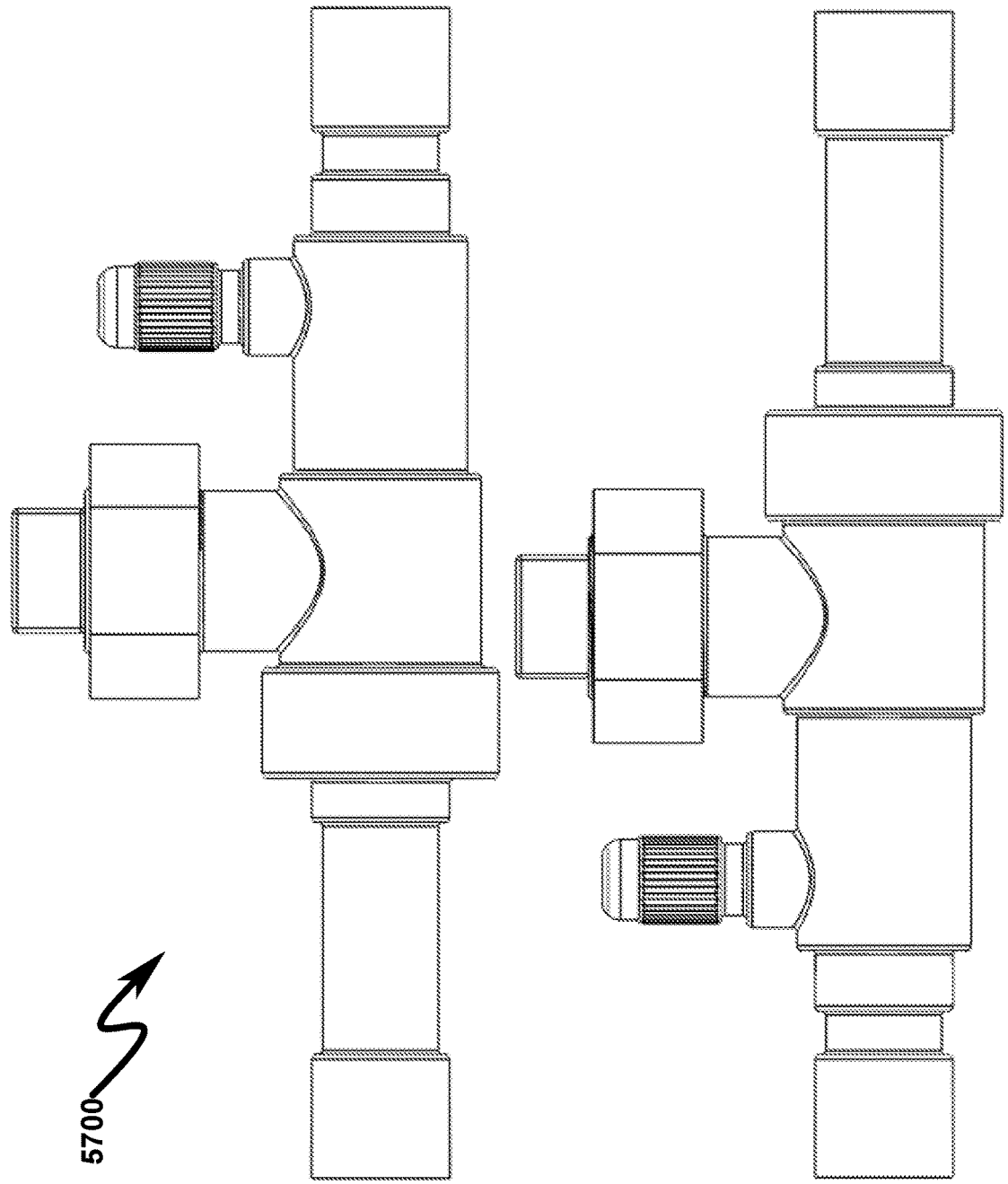
FIG. 57 illustrates front and rear views of a preferred exemplary embodiment of a present invention evaporator isolation valve (EIV)
Figure 59:
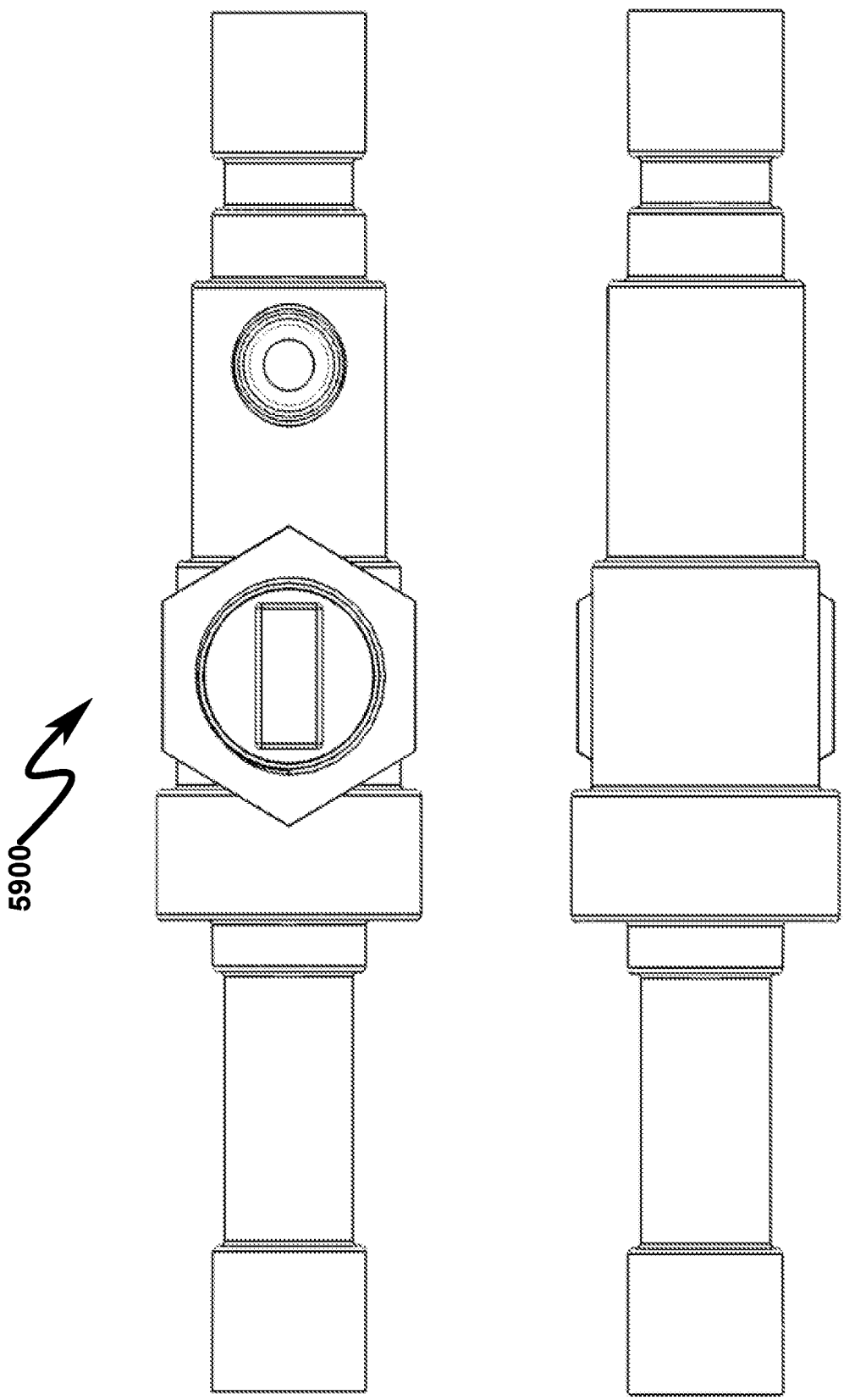
FIG. 59 illustrates top and bottom views of a preferred exemplary embodiment of a present invention evaporator isolation valve (EIV)
Figure 60:
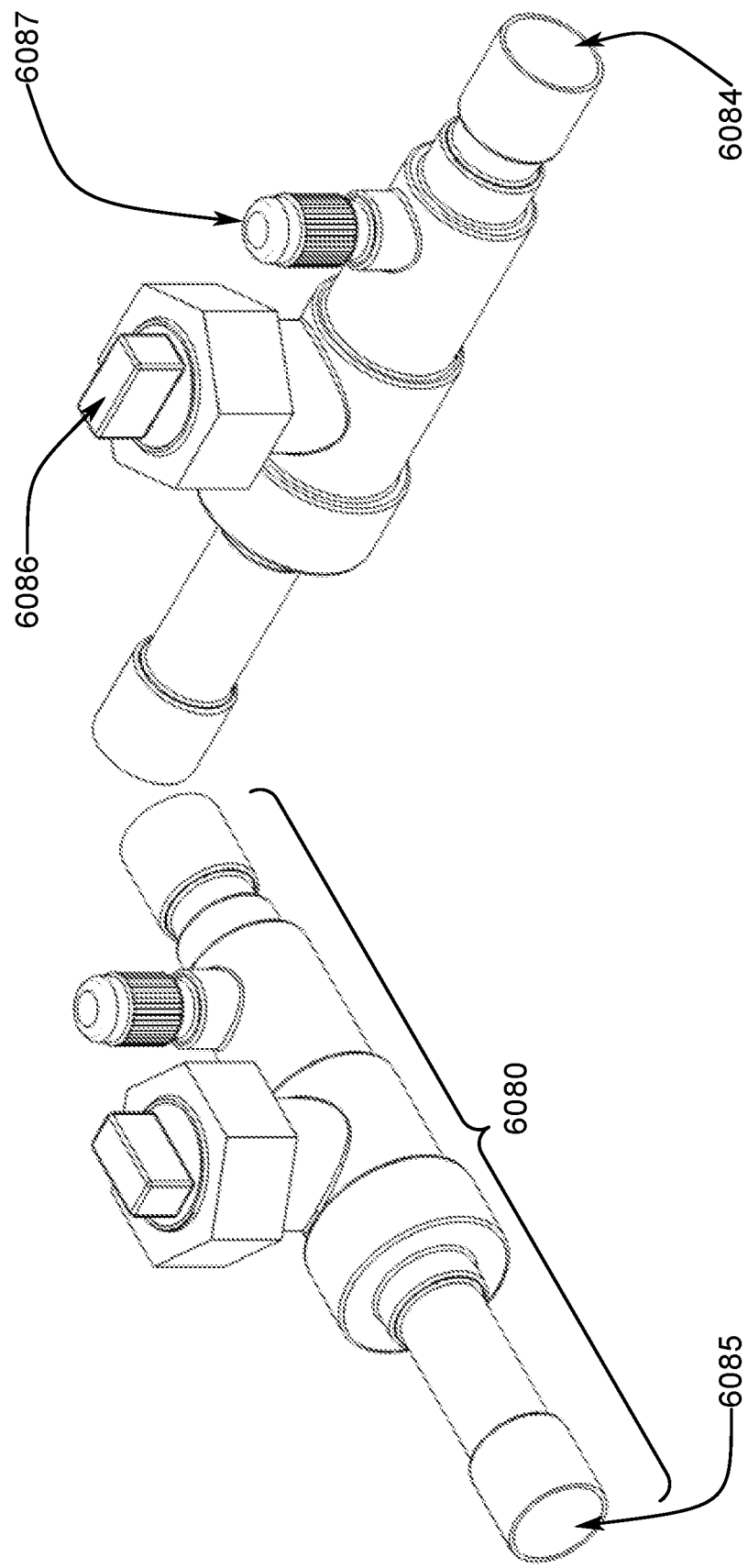
FIG. 60 illustrates top left front and top right front perspective views of a preferred exemplary embodiment of a present invention evaporator isolation valve (EIV)
Figure 61:
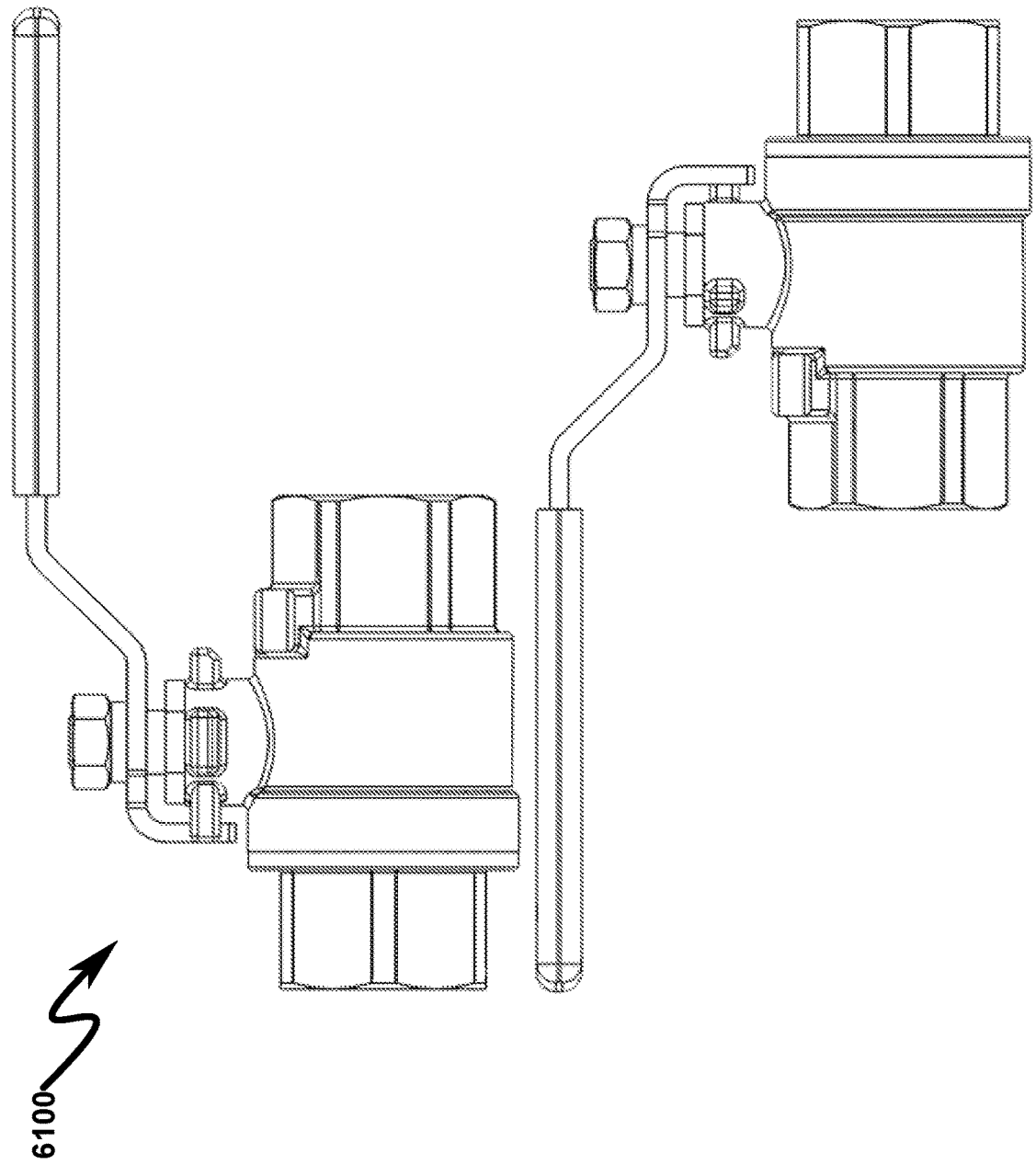
FIG. 61 illustrates front and rear views of an alternate preferred exemplary embodiment of a present invention evaporator isolation valve (EIV)
Figure 63:
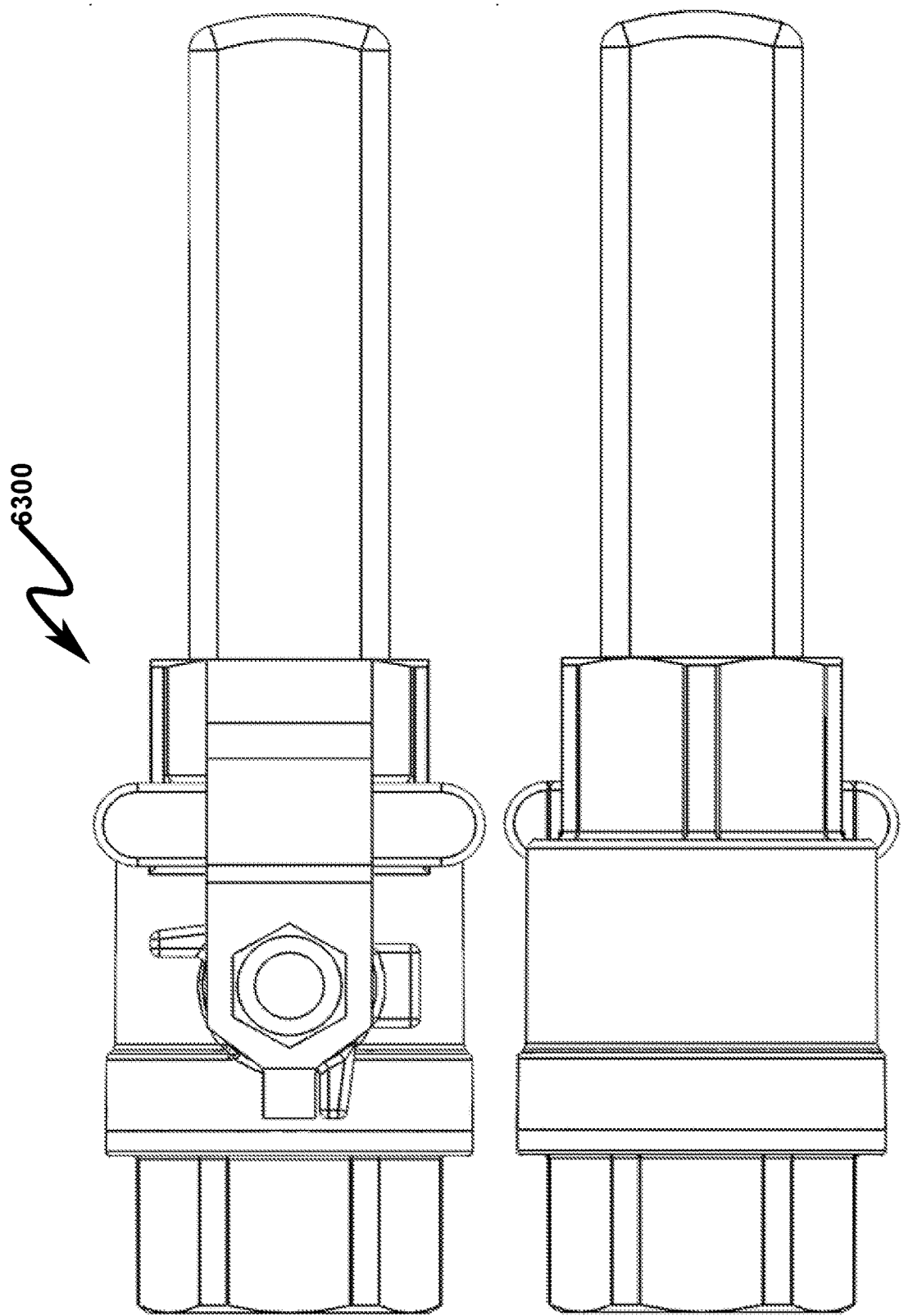
FIG. 63 illustrates top and bottom views of an alternate preferred exemplary embodiment of a present invention evaporator isolation valve (EIV)

As generally depicted in FIG. 57 (5700)-FIG. 60 (6000), the EIV (6080) generally comprises a valve assembly having a refrigerant input port (RIP) (6084), a refrigerant output port (ROP) (6085) between which is positioned a refrigerant control valve (RCV) (6086). The RCV (6086) is configured to allow unmetered flow of refrigerant from the RIP (6084) to the ROP (6085) or to isolate flow of refrigerant from the RIP (6084) to the ROP (6085) depending on the rotation of the RCV (6086) control lever. The RIP (6084) is configured to mechanically couple to the evaporator output port (EOP) and the ROP (6085) is configured to mechanically couple to a refrigerant compressor (RFC).

In some EIV configurations a Schrader valve port (6087) may be positioned between the RIP (6084) and the RCV (6086), thus allowing the REC to be isolated from the RFC for purposes of evacuating the REC and/or recharging the REC with refrigerant. In some EIV configurations a Schrader valve port (6087) as depicted will be placed on either side of the RCV (6086), thus allowing the RCV (6086) to be closed and either the RFC and/or REC side of the RCV (6086) to be evacuated and/or recharged with refrigerant. This dual Schrader valve configuration is not depicted but one skilled in the art will recognize that this is a simple modification of the depicted single-Schrader valve configuration and well within the scope of one skilled in the art to implement.

System Summary

The present invention system may be broadly generalized as a refrigerant metering system comprising:
(a) manual expansion valve (MEV) comprising:
 (1) manual retention cap (MRC);
 (2) manual control rod (MCR);
 (3) manual locking fastener (MLF);
wherein:
the MEV is configured to mechanically couple to a refrigerant flow valve (RFV);
the RFV comprises a valve input port (VIP) and valve output port (VOP) coupled together by a valve transfer port (VTP);
the VIP, the VOP, and the VTP are mechanically coupled in a unitary valve containment structure (VCS);
the RFV comprises a valve metering piston (VMP) that is positioned within the VTP and meters refrigerant flow between the VIP and the VOP;
the VMP comprises a valve control rod (VCR) that is positioned within a control rod port (CRP) within the VCS;
the RFV comprises a threaded valve control port (VCP) having male threads;
the CRP is contained within the perimeter of the VCP;
the RFV comprises a valve spring control (VSC) acting against the VMP to resist movement of the VMP;
the MRC comprises an control interior cavity (CIT) having female threads that conform to male threads of the VCP;
the MRC comprises a threaded control port (TCP) along a longitudinal axis of the CIT;
the MCR comprises a cylindrical control rod (CCR), a threaded adjustment shaft (TAS), and an adjustment control head (ACH);
the CCR comprises a cylinder having a control rod diameter (CRD) conforming to the CRP;
the CCR, the TAS, and the ACH are mechanically connected in a linear combination along a common longitudinal radial axis (LRA);
the MLF comprises a female fastening member (FFM) having a central threaded interior (CTI);
the TAS comprises threads that conform to the CTI;
the MCR is configured to allow adjustment of the VMP through pressure applied to the VCR by the CCR to overcome pressure applied to the VMP by the VSC; and
the adjustment of the VMP is configured to permit refrigerant flow from the VIP to the VOP to be adjusted from unmetered refrigerant flow through the RFV to zero refrigerant flow through the RFV.

This general system summary may be augmented by the various elements described herein to produce a wide variety of invention embodiments consistent with this overall design description.

Alternative System Summary

An alternative present invention system may be broadly generalized as a refrigerant metering system comprising:
(a) condenser isolation valve (CIV);
(b) flow isolation valve (FIV);
(c) evaporator isolation valve (EIV); and
(b) manual expansion valve (MEV) comprising:
 (1) manual retention cap (MRC);
 (2) manual control rod (MCR); and
 (3) manual locking fastener (MLF);
wherein:
the MEV is configured to mechanically couple to a refrigerant flow valve (RFV);
the RFV comprises a valve input port (VIP) and valve output port (VOP) coupled together by a valve transfer port (VTP);
the VIP, the VOP, and the VTP are mechanically coupled in a unitary valve containment structure (VCS);
the RFV comprises a valve metering piston (VMP) that is positioned within the VTP and meters refrigerant flow between the VIP and the VOP;
the VMP comprises a valve control rod (VCR) that is positioned within a control rod port (CRP) within the VCS;
the RFV comprises a threaded valve control port (VCP) having male threads;
the CRP is contained within the perimeter of the VCP;
the RFV comprises a valve spring control (VSC) acting against the VMP to resist movement of the VMP;
the MRC comprises an control interior cavity (CIT) having female threads that conform to male threads of the VCP;
the MRC comprises a threaded control port (TCP) along a longitudinal axis of the CIT;
the MCR comprises a cylindrical control rod (CCR), a threaded adjustment shaft (TAS), and an adjustment control head (ACH);

the CCR comprises a cylinder having a control rod diameter (CRD) conforming to the CRP;

the CCR, the TAS, and the ACH are mechanically connected in a linear combination along a common longitudinal radial axis (LRA);

the MLF comprises a female fastening member (FFM) having a central threaded interior (CTI);

the TAS comprises threads that conform to the CTI;

the MCR is configured to allow adjustment of the VMP through pressure applied to the VCR by the CCR to overcome pressure applied to the VMP by the VSC;

the adjustment of the VMP is configured to permit refrigerant flow from the VIP to the VOP to be adjusted from unmetered refrigerant flow through the RFV to zero refrigerant flow through the RFV;

the CIV comprises a refrigerant input port (RIP) and a refrigerant output port (ROP) between which is positioned a refrigerant control valve (RCV);

the CIV RCV is configured to allow unmetered flow of refrigerant from the CIV RIP to the CIV ROP or to isolate flow of refrigerant from the CIV RIP to the CIV ROP;

the CIV RIP is configured to mechanically couple to a refrigerant condenser coil (RCC) output port;

the CIV ROP is configured to mechanically couple to the VIP.

the FIV comprises a refrigerant input port (RIP) and a refrigerant output port (ROP) between which is positioned a refrigerant control valve (RCV);

the FIV RCV is configured to allow unmetered flow of refrigerant from the FIV RIP to the FIV ROP or to isolate flow of refrigerant from the FIV RIP to the FIV ROP;

the FIV RIP is configured to mechanically couple to the VOP;

the FIV ROP is configured to mechanically couple to a refrigerant evaporator coil (REC) input port;

the EIV comprises a refrigerant input port (RIP) and a refrigerant output port (ROP) between which is positioned a refrigerant control valve (RCV);

the EIV RCV is configured to allow unmetered flow of refrigerant from the EIV RIP to the EIV ROP or to isolate flow of refrigerant from the EIV RIP to the EIV ROP;

the EIV RIP is configured to mechanically couple to a refrigerant evaporator coil (REC) output port; and the EIV ROP is configured to mechanically couple to a refrigerant compressor (RFC).

This general system summary may be augmented by the various elements described herein to produce a wide variety of invention embodiments consistent with this overall design description.

Refrigerant Metering AEV Replacement Method Summary

A present invention refrigerant metering AEV replacement method may be broadly generalized as a method comprising:

(1) Closing the CIV and FIV valves to isolate the RFV from the RCC and REC (2601);

(2) Removing the failing LEV/EEV/AEV from the RFV control stem (2602);

(3) Installing the MEV on RFV control stem (2603);

(4) Opening the CIV and FIV valves to connect the RFV to the RCC and REC (2604);

(5) Activating the HVAC refrigerant flow (2605);

(6) Unlocking the MEV manual adjustment (2606);

(7) Adjusting refrigerant flow on the RFV using the MEV manual adjustment (2607);

(8) Locking the MEV manual adjustment (2608);

(9) Monitoring the HVAC refrigerant temperatures at the REC (2609);

(10) Determining if the REC refrigerant temperatures are within limits, and if not, proceeding to step (6) (2610); and

(11) Terminating the refrigerant metering replacement method (2611).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Refrigerant Metering REC Repair Method Summary

A present invention refrigerant metering REC repair method may be broadly generalized as a method comprising:

(1) Deactivating refrigerant flow in a HVAC system (2701);

(2) Closing a flow isolation valve (FIV) at an output port of a refrigerant flow valve (RFV) in the HVAC system (2702);

(3) Closing an evaporator isolation valve (EIV) at an output port of a refrigerant evaporator coil (REC) in the HVAC system (2703);

(4) Replacing or repairing the REC (2704);

(5) Evacuating the REC using a Schrader port on the FIV and/or the EIV (2705);

(6) Recharging refrigerant in the REC using the Schrader port on the FIV and/or the EIV (2706);

(7) Opening the FIV at the output port of the RFV (2707);

(8) Opening the EIV at the output port of the REC (2708);

(9) Activating refrigerant flow in the HVAC system (2709); and

(10) Terminating the refrigerant metering REC repair method (2710).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Refrigerant Metering Maintenance Method Summary

A present invention refrigerant metering maintenance method may be broadly generalized as a method comprising:

(1) Deactivating HVAC system refrigerant flow (2801);

(2) Installing the CIV between the RCC refrigerant outlet port and refrigerant flow valve (RFV) (2802);

(3) Installing the FIV between the RFV refrigerant outlet port and refrigerant evaporator coil (REC) input port (2803);

(4) Installing the EIV between the REC refrigerant outlet port and refrigerant compressor (RFC) (2804);

(5) Evacuating refrigerant from the REC using the Schrader ports on the CIV and/or the FIV and/or the EIV (2805);

(6) Opening the CIV on the RCC to connect the RCC to the RFV (2806);
(7) Opening the FIV on the RFV to connect the RFV to the REC (2807);
(8) Opening the EIV on the REC to connect the REC to the RFC (2808);
(9) Recharging the REC with refrigerant using the Schrader ports on the CIV and/or FIV and/or EIV (2809);
(10) Activating HVAC refrigerant flow (2810); and
(11) Terminating the refrigerant metering maintenance method (2811).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:
- An embodiment wherein the RFV comprises connection fittings selected from a group consisting of: soldered; brazed; flared; compression; and national pipe thread (NPT).
- An embodiment wherein the ACH comprises a hexagonal nut profile (HNP).
- An embodiment wherein the MEV further comprises a cylindrical sealing gasket (CSG) having a central hole conforming to the CRD and a gasket diameter conforming to the RFV positioned within the CIT and configured to seal the MRC with the RFV.
- An embodiment wherein the MRC comprises an outer surface conforming to a mechanical fastener profile, the mechanical fastener profile selected from a group consisting of: wrench flat; hex nut; and knurled surface.
- An embodiment wherein the CIV, the FIV, and the EIV comprise a Schrader valve positioned between the RIP and a refrigerant control valve (RCV) contained within the CIV, the FIV, and the EIV.
- An embodiment wherein the CIV, the FIV, and the EIV comprise a Schrader valve positioned between the ROP and a refrigerant control valve (RCV) contained within the CIV, the FIV, and the EIV.
- An embodiment wherein the CIV, the FIV, and the EIV comprise a first Schrader valve positioned between the RIP and a refrigerant control valve (RCV) contained within the CIV, the FIV, and the EIV and a second Schrader valve positioned between the ROP and the RCV in the CIV, the FIV, and the EIV.
- An embodiment wherein the CIV, the FIV, and the EIV comprise a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI.
- An embodiment wherein the CIV, the FIV, and the EIV comprise connection fittings selected from a group consisting of: soldered; brazed; flared; compression; and national pipe thread (NPT).

One skilled in the art will recognize that other embodiments are possible based on combinations of elements taught within the above invention description.

CONCLUSION

A refrigerant metering system/method incorporating a manual expansion valve (MEV), condenser isolation valve (CIV), flow isolation valve (FIV), and evaporator isolation valve (EIV) has been disclosed. The MEV is configured to replace a conventional automated expansion valve (AEV) that controls a refrigerant flow valve (RFV) that is positioned in a heating, ventilation, and air conditioning (HVAC) system between a refrigerant condenser coil (RCC) and a refrigerant evaporator coil (REC) and permits manual metering of refrigerant by the RFV from the RCC to the REC and also allows complete shutoff of refrigerant flow by the RFV from the RCC to the REC. The MEV allows rapid HVAC repair and restoration of service where a replacement AEV is not readily available. The CIV/FIV/EIV are positioned in the refrigerant flow lines to permit the AEV and/or REC to be isolated from HVAC refrigerant flow for repairs to the AEV and/or REC.

The following rules apply when interpreting the CLAIMS of the present invention:
- The CLAIM PREAMBLE should be considered as limiting the scope of the claimed invention.
- "WHEREIN" clauses should be considered as limiting the scope of the claimed invention.
- "WHEREBY" clauses should be considered as limiting the scope of the claimed invention.
- "ADAPTED TO" clauses should be considered as limiting the scope of the claimed invention.
- "ADAPTED FOR" clauses should be considered as limiting the scope of the claimed invention.
- The term "MEANS" specifically invokes the means-plus-function claims limitation recited in 35 U.S.C. § 112(f) and such claim shall be construed to cover the corresponding structure, material, or acts described in the specification and equivalents thereof.
- The phrase "MEANS FOR" specifically invokes the means-plus-function claims limitation recited in 35 U.S.C. § 112(f) and such claim shall be construed to cover the corresponding structure, material, or acts described in the specification and equivalents thereof.
- The phrase "STEP FOR" specifically invokes the step-plus-function claims limitation recited in 35 U.S.C. § 112(f) and such claim shall be construed to cover the corresponding structure, material, or acts described in the specification and equivalents thereof.
- The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".
- The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A refrigerant metering automated expansion valve (AEV) replacement method comprising:
   (1) Closing a condenser isolation valve (CIV) and a flow isolation valve (FIV) to isolate a refrigerant flow valve (RFV) from a refrigerant condenser coil (RCC) and a refrigerant evaporator coil (REC) in a HVAC system (2601);
   (2) Removing a failing AEV control assembly from a control stem on said RFV (2602);
   (3) Installing a manual expansion valve (MEV) on said RFV control stem (2603);
   (4) Opening said CIV valve and said FIV valve to connect said RFV to said RCC and said REC (2604);
   (5) Activating refrigerant flow in said HVAC system (2605);
   (6) Unlocking manual adjustment on said MEV (2606);
   (7) Adjusting refrigerant flow on said RFV using said MEV manual adjustment (2607);
   (8) Locking said MEV manual adjustment (2608);
   (9) Monitoring refrigerant temperatures in said HVAC system at said REC (2609);
   (10) Determining if said REC refrigerant temperatures are within limits, and if not, returning to said step (6) (2610); and
   (11) Terminating said refrigerant metering AEV replacement method (2611);
   wherein:
   said manual expansion valve (MEV) comprises:
      (1) manual retention cap (MRC);
      (2) manual control rod (MCR); and
      (3) manual locking fastener (MLF); and
   said MCR comprises a cylindrical control rod (CCR), a threaded adjustment shaft (TAS), and an adjustment control head (ACH).

2. The refrigerant metering automated expansion valve replacement method of claim 1 wherein said RFV comprises connection fittings selected from a group consisting of: soldered; brazed; flared; compression; and national pipe thread (NPT).

3. The refrigerant metering automated expansion valve replacement method of claim 1 wherein said ACH comprises a hexagonal nut profile (HNP).

4. The refrigerant metering automated expansion valve replacement method of claim 1 wherein said MEV further comprises a cylindrical sealing gasket (CSG) having a central hole conforming to a diameter of the CCR and a gasket diameter conforming to said RFV positioned within a control interior cavity (CIT) of said MRC and configured to seal said MRC with said RFV.

5. The refrigerant metering automated expansion valve replacement method of claim 1 wherein said MRC comprises an outer surface conforming to a mechanical fastener profile, said mechanical fastener profile selected from a group consisting of: wrench flat; hex nut; and knurled surface.

* * * * *